United States Patent
Plotnikov et al.

(10) Patent No.: US 10,191,740 B2
(45) Date of Patent: Jan. 29, 2019

(54) DEINTERLEAVE STRIDED DATA ELEMENTS PROCESSORS, METHODS, SYSTEMS, AND INSTRUCTIONS

(71) Applicant: Intel Corporation, Santa Clara, CA (US)

(72) Inventors: Mikhail Plotnikov, Nizhny Novgorod (RU); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/445,577

(22) Filed: Feb. 28, 2017

(65) Prior Publication Data
US 2018/0246722 A1 Aug. 30, 2018

(51) Int. Cl.
*G06F 9/30* (2018.01)

(52) U.S. Cl.
CPC ...... *G06F 9/30036* (2013.01); *G06F 9/30018* (2013.01); *G06F 9/30138* (2013.01); *G06F 9/30145* (2013.01); *G06F 9/30196* (2013.01)

(58) Field of Classification Search
None
See application file for complete search history.

(56) References Cited

U.S. PATENT DOCUMENTS

| | | | |
|---|---|---|---|
| 9,348,601 B2 | 5/2016 | Forsyth et al. | |
| 2003/0023960 A1* | 1/2003 | Khan | H04L 29/06027 717/152 |
| 2011/0153983 A1* | 6/2011 | Hughes | G06F 9/30018 712/22 |
| 2012/0144089 A1* | 6/2012 | Hall | G06F 12/08 711/3 |
| 2012/0254591 A1* | 10/2012 | Hughes | G06F 9/30018 712/205 |

OTHER PUBLICATIONS

ARM, "ARM® Architecture Reference Manual", ARMv8, for ARMv8-A architecture profile Errata markup, 2013, 14 Pages.

* cited by examiner

*Primary Examiner* — Corey S Faherty
(74) *Attorney, Agent, or Firm* — Nicholson De Vos Webster & Elliott, LLP

(57) ABSTRACT

A method performed by a processor includes receiving an instruction. The instruction indicating a source operand, indicating a stride, indicating at least one set of strided data element positions out of all sets of strided data element positions for the indicated stride, and indicating at least one destination packed data register. The method also includes storing, in response to the instruction, for each of the indicated at least one set of strided data element positions, a corresponding result packed data operand, in a corresponding destination packed data register of the processor. Each result packed data operand including a plurality of data elements, which are from the corresponding indicated set of strided data element positions of the source operand. The strided data element positions of the set are separated from one another by integer multiples of the indicated stride. Other methods, processors, systems, and machine readable media are also disclosed.

25 Claims, 26 Drawing Sheets

FIG. 3

METHOD OF PERFORMING
SELECTIVE DEINTERLEAVE
STRIDED DATA ELEMENTS
INSTRUCTION
326

RECEIVE SELECTIVE DEINTERLEAVE STRIDED DATA ELEMENTS INSTRUCTION INDICATING SOURCE OPERAND, STRIDE, AT LEAST ONE SET OF STRIDED DATA ELEMENT POSITIONS OUT OF ALL SETS OF STRIDED DATA ELEMENT POSITIONS FOR STRIDE, AND AT LEAST ONE DESTINATION PACKED DATA REGISTER — 327

STORE, IN RESPONSE TO INSTRUCTION, FOR EACH OF INDICATED AT LEAST ONE SET OF STRIDED DATA ELEMENT POSITIONS, CORRESPONDING RESULT PACKED DATA OPERAND, IN CORRESPONDING DESTINATION PACKED DATA REGISTER, EACH RESULT PACKED DATA OPERAND INCLUDING PLURALITY OF DATA ELEMENTS, WHICH ARE FROM CORRESPONDING INDICATED SET OF STRIDED DATA ELEMENT POSITIONS OF SOURCE OPERAND, IN WHICH STRIDED DATA ELEMENT POSITIONS OF SET ARE SEPARATED FROM ONE ANOTHER BY INTEGER MULTIPLES OF INDICATED STRIDE — 328

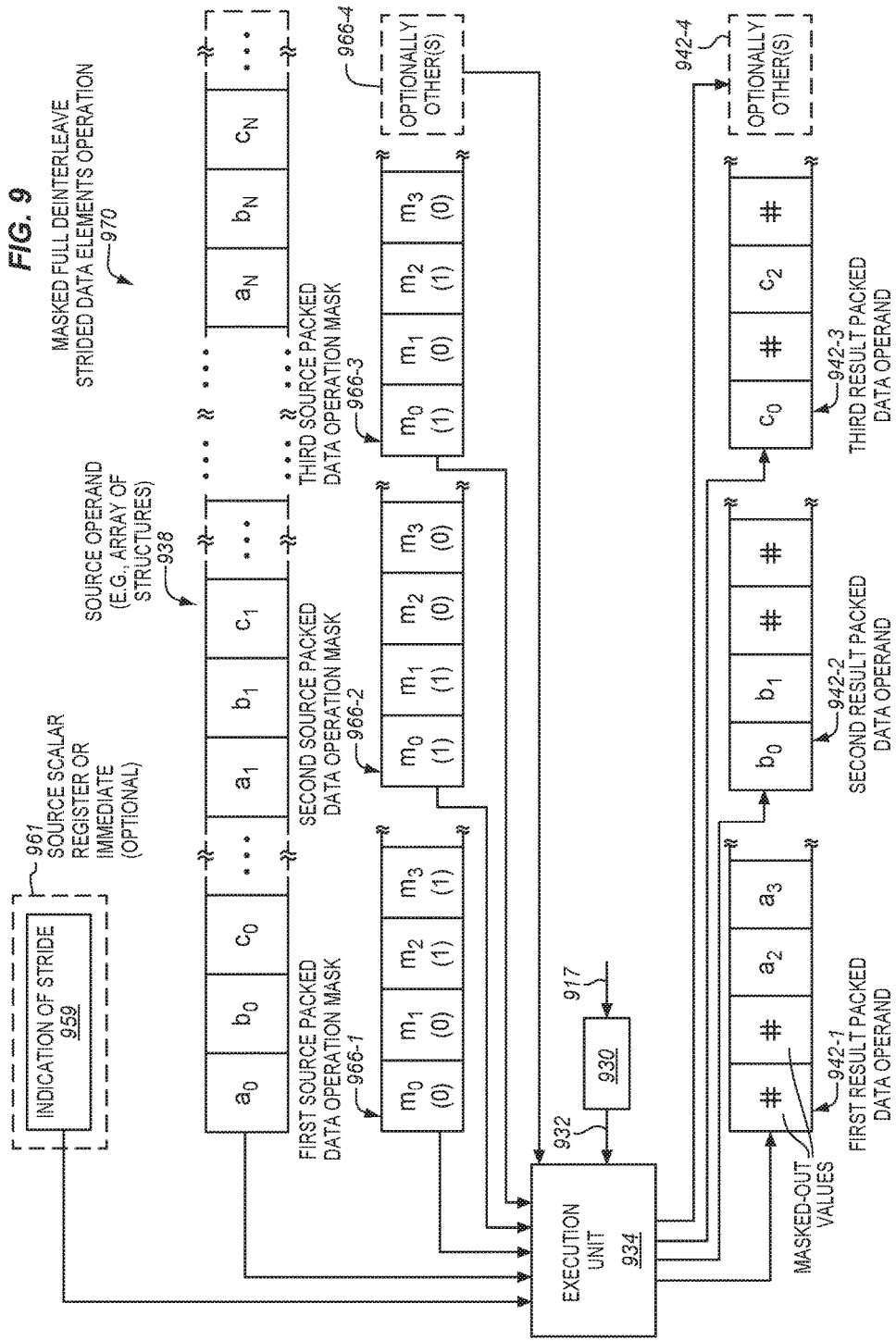

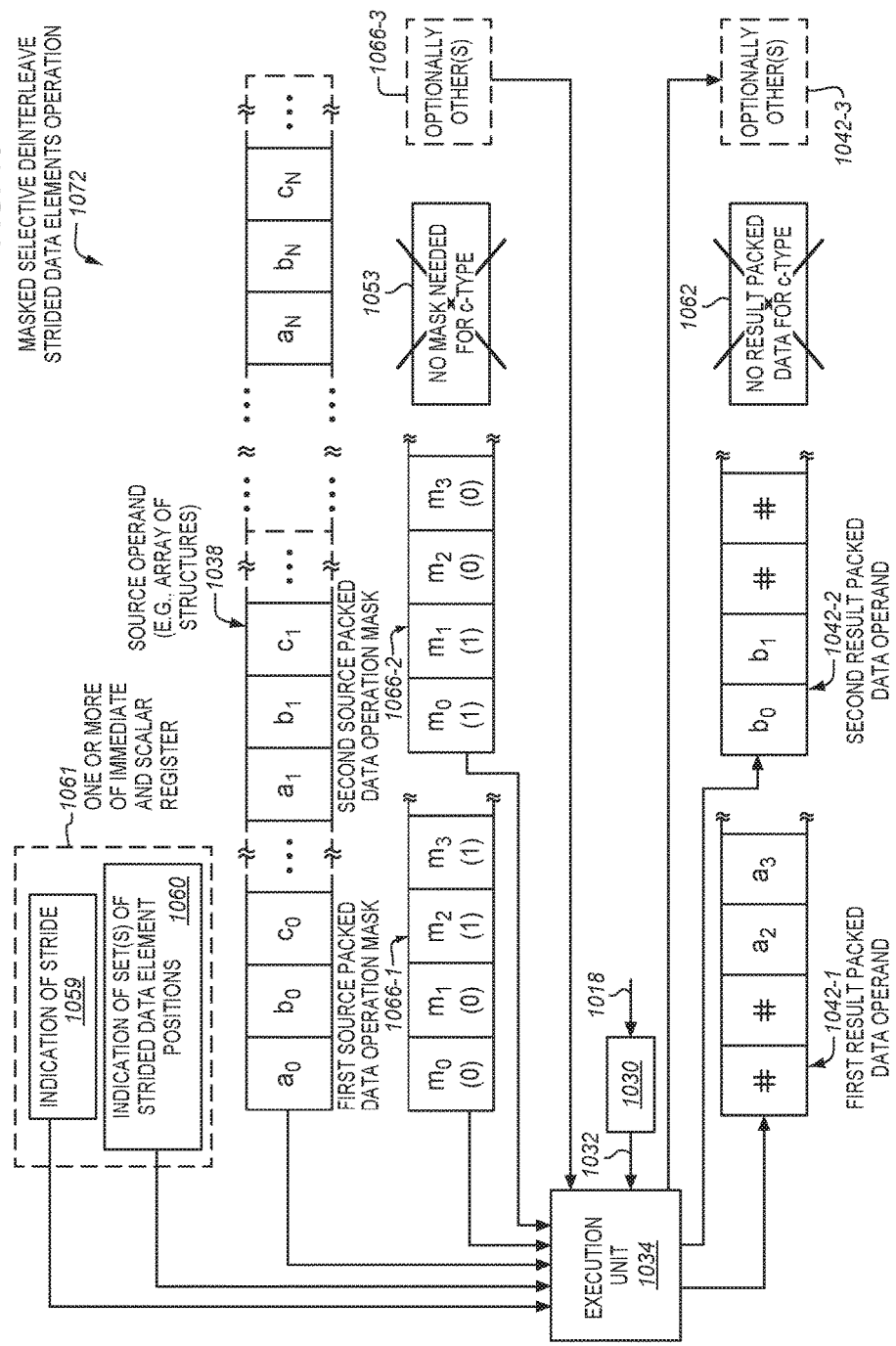

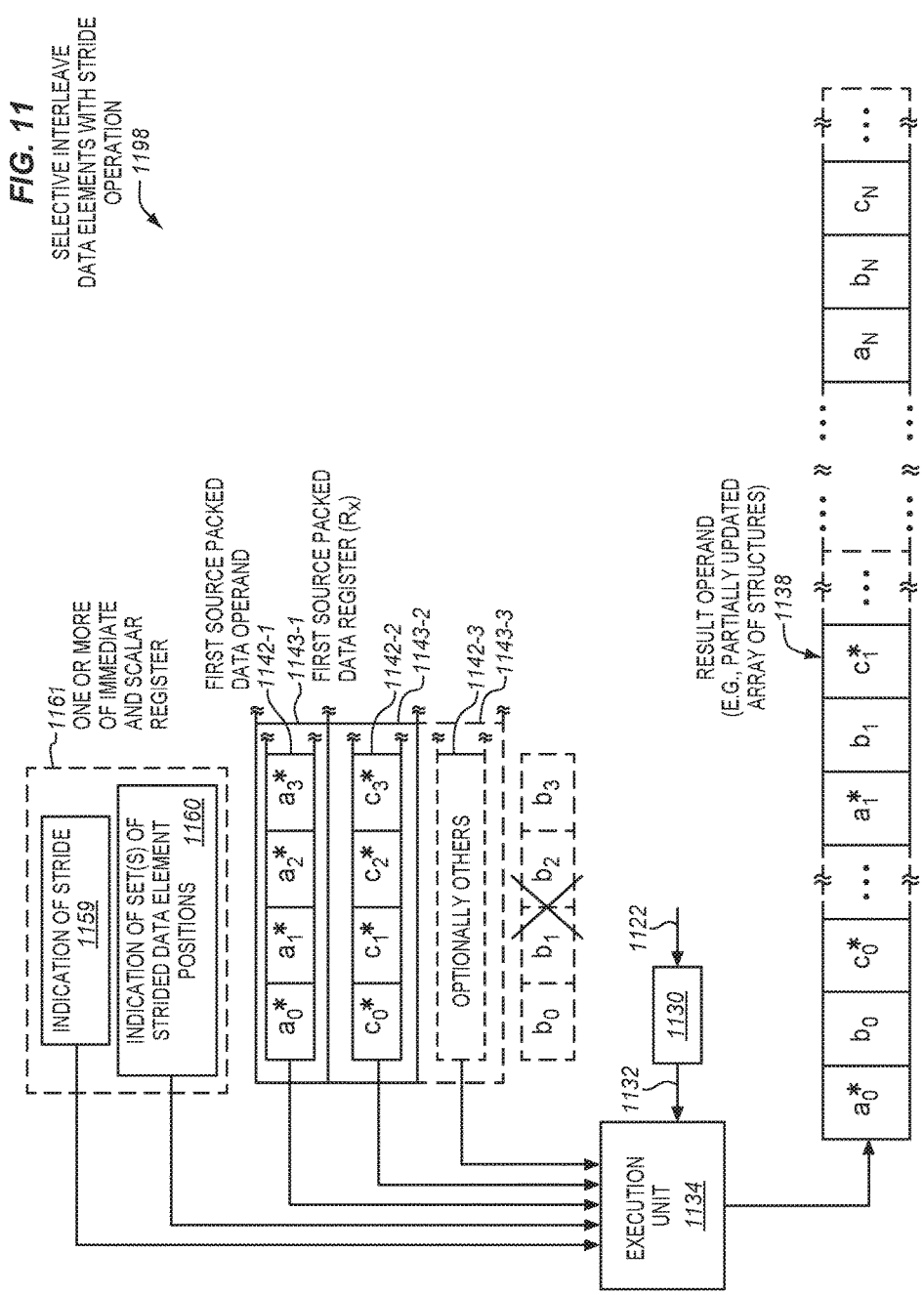

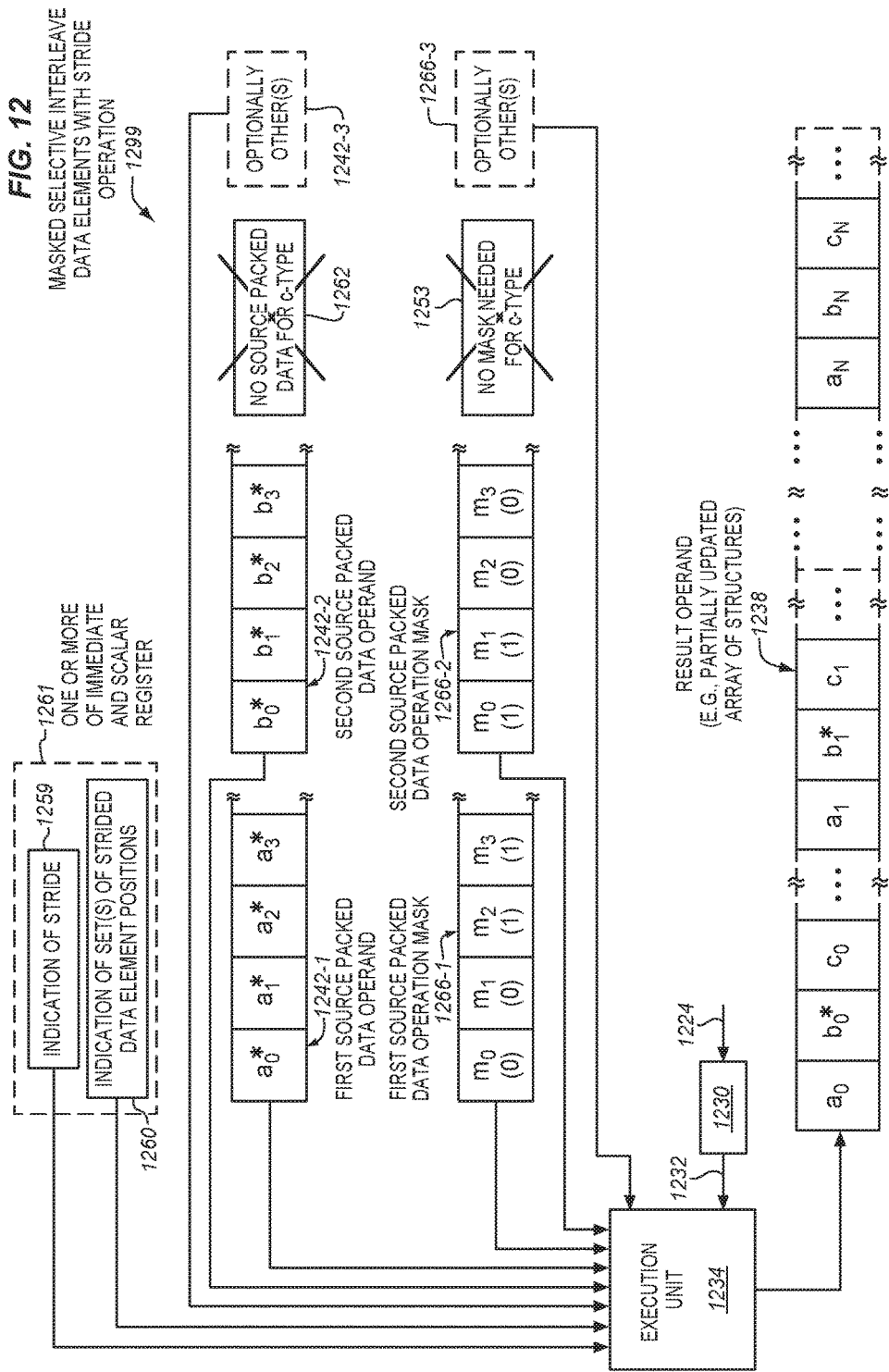

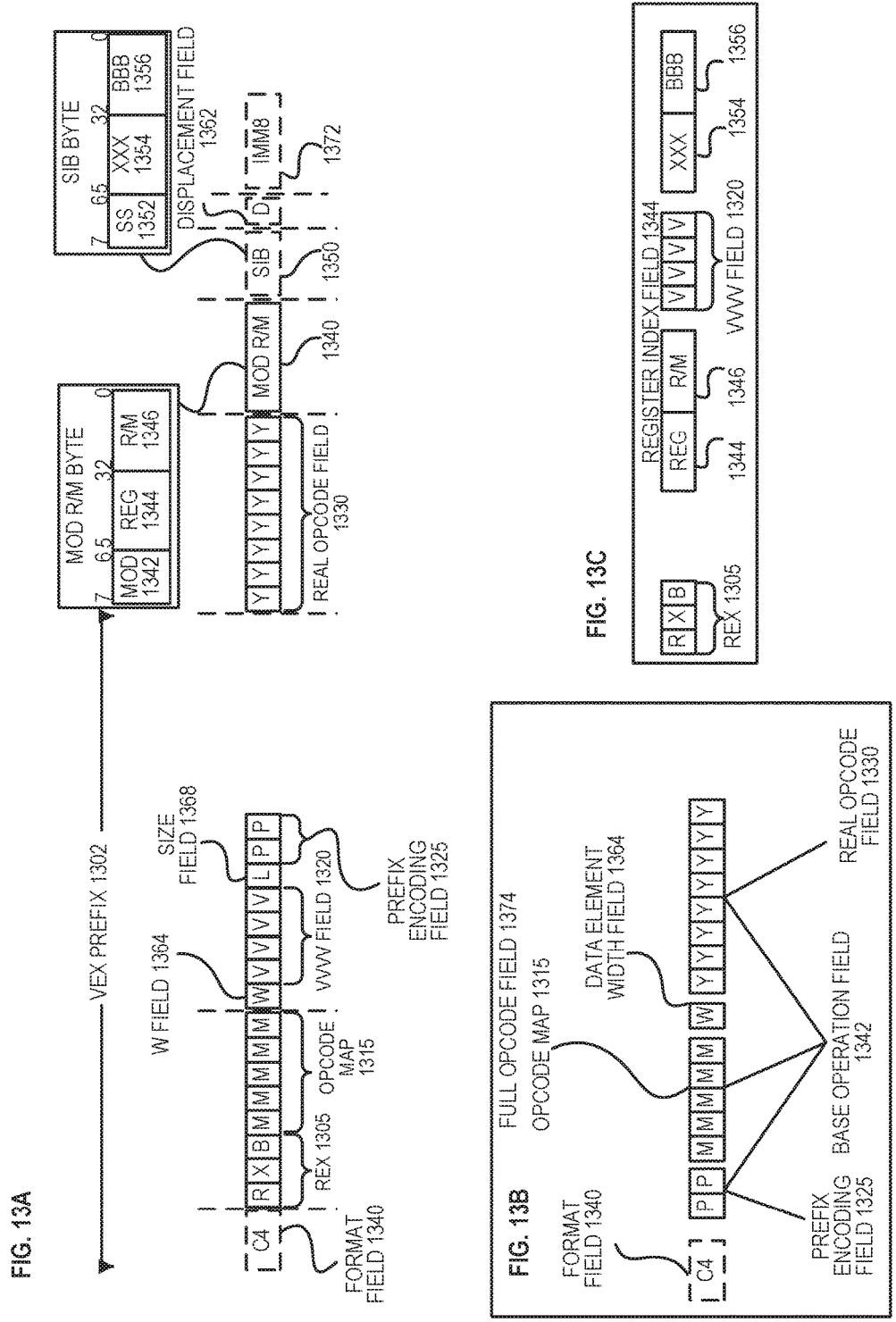

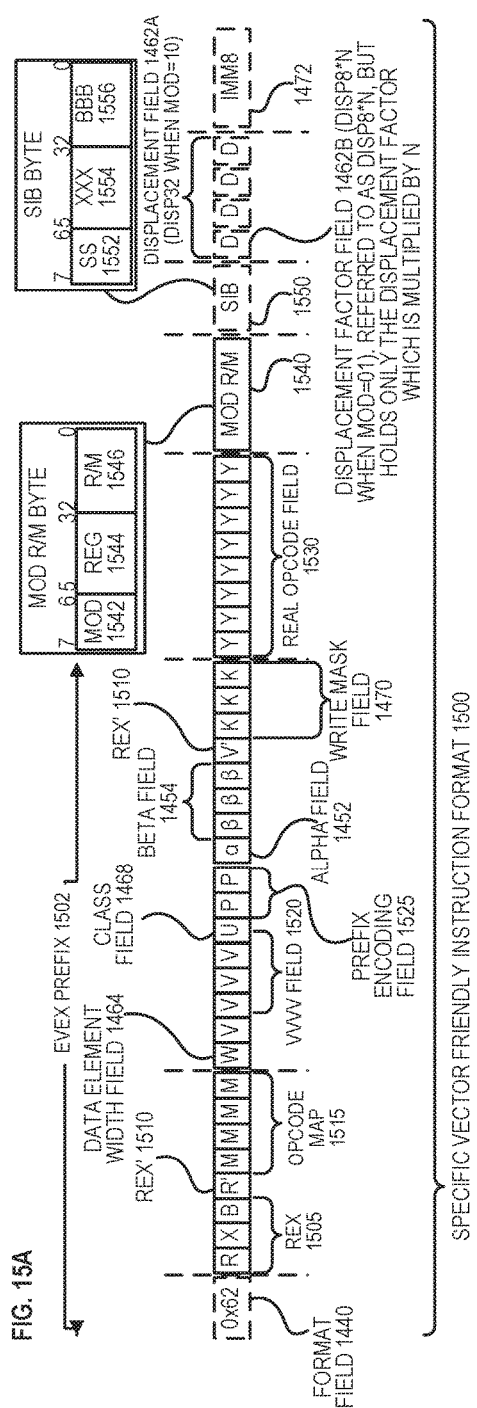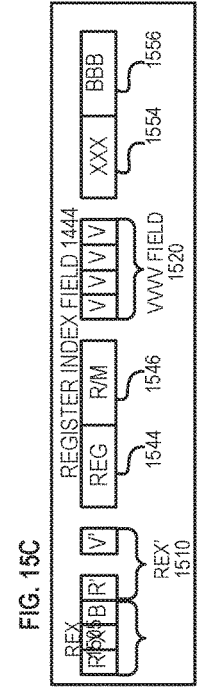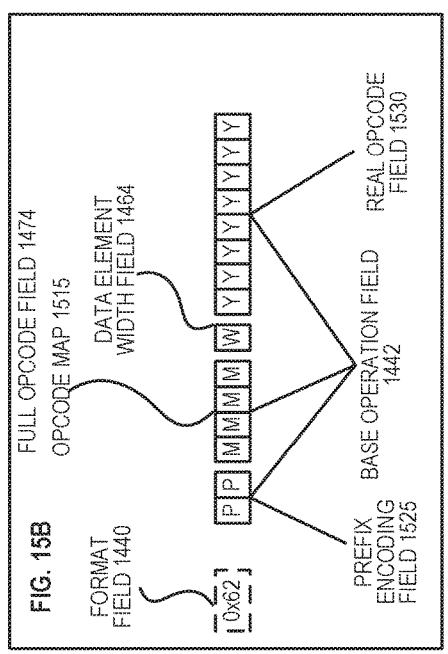

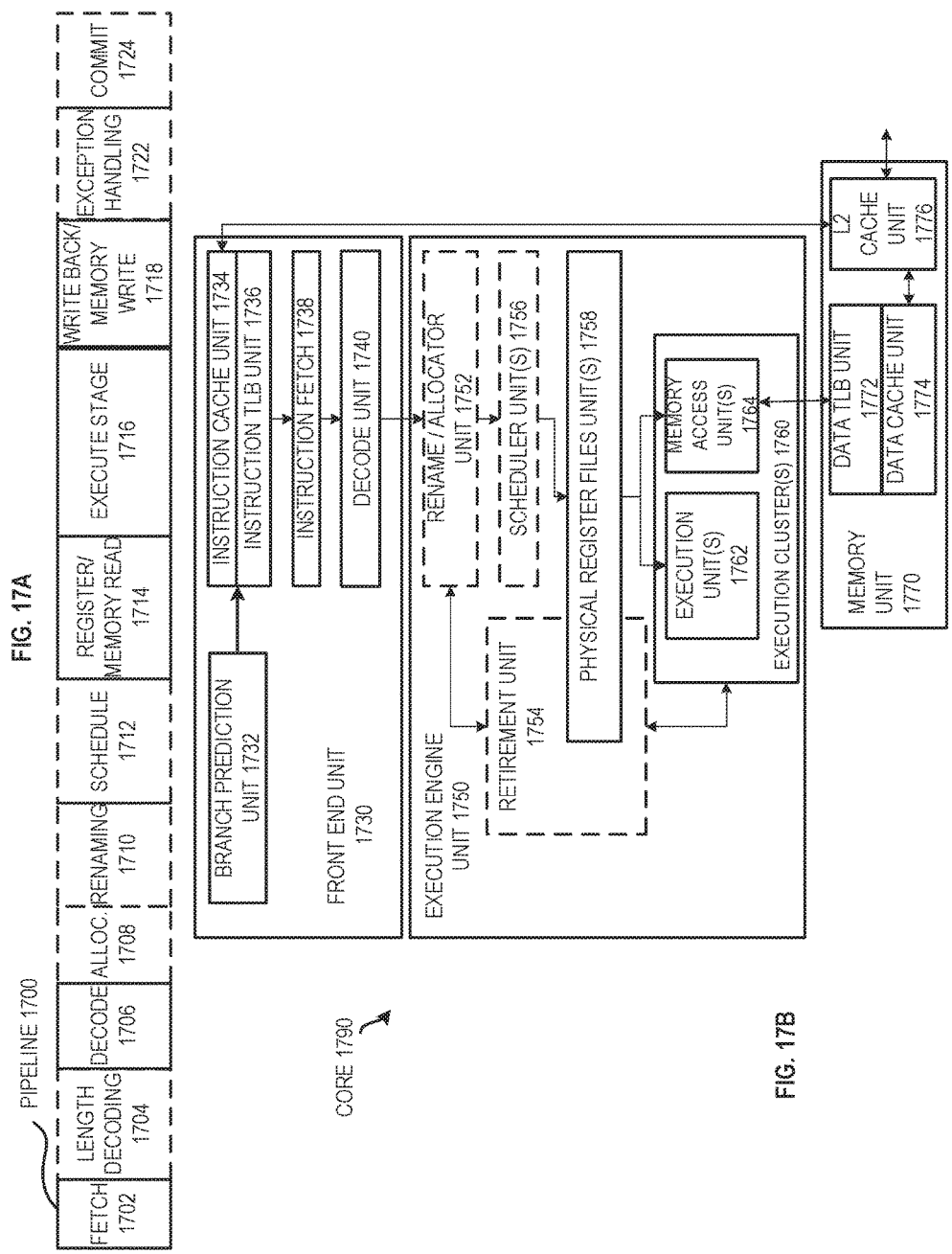

DEINTERLEAVE STRIDED DATA ELEMENTS PROCESSORS, METHODS, SYSTEMS, AND INSTRUCTIONS

BACKGROUND

Technical Field

Embodiments described herein generally relate to processors. Specifically, embodiments described herein generally relate to processors that are operative to process data having strided layouts or arrangements.

Background Information

An array of structures (AoS) is a commonly utilized data structure or arrangement. As its name implies, the AoS typically includes an array or sequence of structures that each include multiple data elements. The data elements of each structure generally represent different types of quantities, values, or things. As one illustrative example, the data elements of each structure may represent the different types of color components (e.g., the red (R), green (G), and blue (B) color components) of a corresponding pixel. Typically, each of the structures has the same number of data elements, and the data elements that represent the different types of quantities, values, or things are arranged in the same order in each of the structures. This causes the AoS to have a "strided" data arrangement or pattern in which the data elements that represent the different types of quantities, values, or things reside at equally spaced or "strided" data element positions.

Such AoS are often stored in memory. To process the data elements, a processor may load the data elements from the AoS into its internal registers. One type of instruction that may be used to load the data elements of the AoS from memory into internal processor registers is a vector load instruction. When performed, the vector load instruction may load a vector's worth of contiguous data elements of the AoS, and store them in a vector or packed data register without rearranging or reordering the data elements. Another type of instruction that may be used to load the data elements of the AoS from memory into internal processor register is a gather instruction. Commonly, the gather instruction may indicate a packed data register that stores a gather index or offset for each of the data elements to be gathered. Each of the gather indices may represent memory address information, and each may indicate a potentially non-contiguous position of a corresponding data element to be gathered. When performed the gather instruction may cause the processor to perform separate gather or load operations, to gather each of the data elements from the corresponding positions that are indicated by the gather indices. The gathered data elements may then be stored in a vector or packed data register.

BRIEF DESCRIPTION OF THE DRAWINGS

The present disclosure may best be understood by referring to the following description and accompanying drawings that are used to illustrate embodiments. In the drawings:

FIG. 3 is a block flow diagram of an embodiment of a method of performing an embodiment of a selective deinterleave strided data elements instruction.

FIG. 9 is a block diagram of an example embodiment of a masked full deinterleave strided data elements operation.

FIG. 10 is a block diagram of an example embodiment of a masked selective deinterleave strided data elements operation.

FIG. 11 is a block diagram of an example embodiment of a selective interleave data elements with stride operation.

FIG. 12 is a block diagram of an example embodiment of a masked selective interleave data elements with stride operation.

FIG. 13A illustrates an exemplary embodiment of an AVX instruction format including a VEX prefix, real opcode field, Mod R/M byte, SIB byte, displacement field, and IMM8.

FIG. 13B illustrates which fields from FIG. 13A make up a full opcode field and a base operation field.

FIG. 13C illustrates which fields from FIG. 13A make up a register index field.

FIG. 15A is a block diagram of an embodiment of a specific vector friendly instruction format.

FIG. 15B is a block diagram illustrating the fields of the specific vector friendly instruction format that make up the full opcode field, according to one embodiment of the present disclosure.

FIG. 15C is a block diagram illustrating the fields of the specific vector friendly instruction format that make up the register index field, according to one embodiment of the present disclosure.

FIG. 17A is a block diagram illustrating both an embodiment of an in-order pipeline and an embodiment of a register renaming, out-of-order issue/execution pipeline.

FIG. 17B is a block diagram illustrating both an embodiment of an in-order architecture core and an embodiment of a register renaming, out-of-order issue/execution architecture core.

DETAILED DESCRIPTION OF EMBODIMENTS

Disclosed herein are embodiments of deinterleave strided data element instructions, and embodiments of interleave data elements with stride instructions. Also disclosed are embodiments of processors to perform these instructions, embodiments of methods performed by the processors when performing these instructions, embodiments of systems incorporating one or more processors to perform these instructions, and embodiments of programs or machine-readable mediums storing or otherwise providing these instructions. In some embodiments, a processor may have logic to perform at least one of these instructions (e.g., a decode unit, or other unit or logic, to decode the instruction, and an execution unit, or other unit or logic, to execute or perform the instruction). In the following description, numerous specific details are set forth (e.g., specific data arrangements, instruction operations, processor configurations, microarchitectural details, sequences of operations, etc.). However, embodiments may be practiced without these specific details. In other instances, well-known circuits, structures, and techniques have not been shown in detail to avoid obscuring the understanding of the description.

Figure 1:
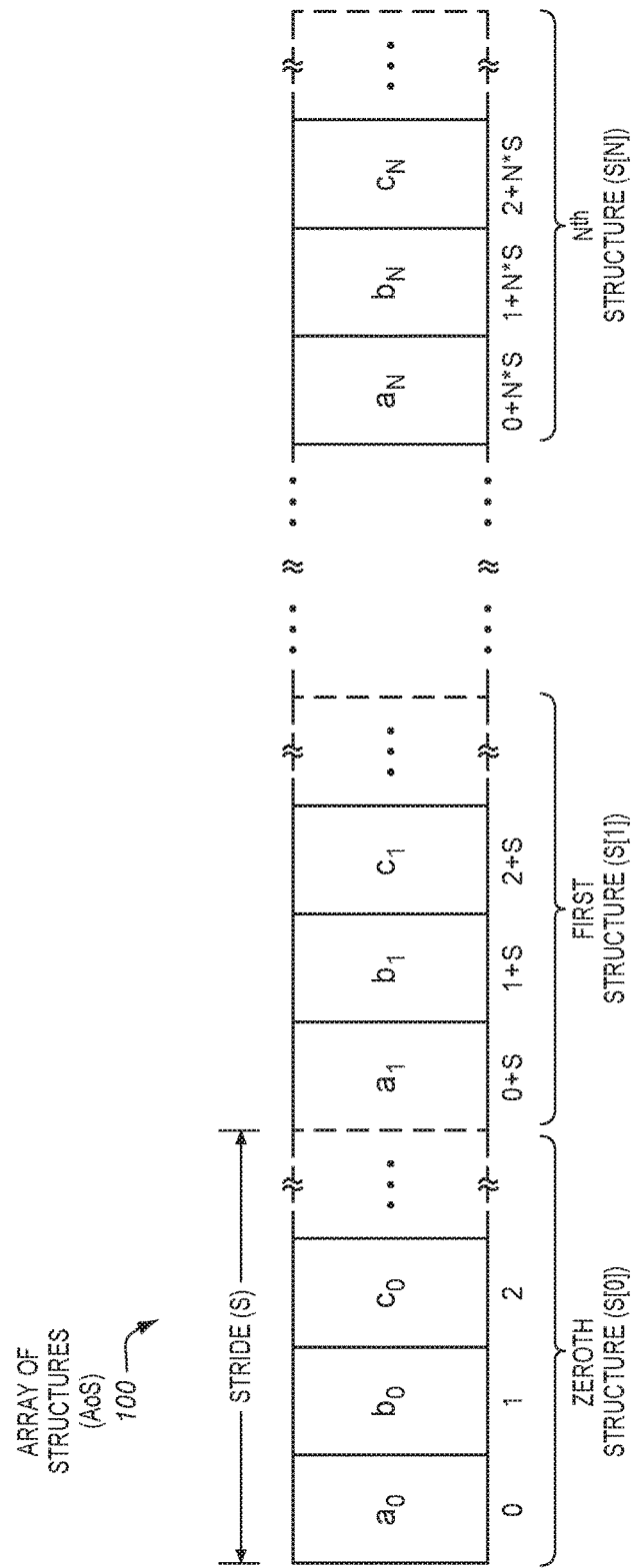
FIG. 1 is a block diagram of an example embodiment of a suitable array of structures (AoS).

FIG. 1 is a block diagram of an example embodiment of a suitable array of structures (AoS) 100. The AoS includes a zeroth structure S[0], a first structure S[1], and so on, through an Nth structure S[N]. The scope of the present disclosure is not limited to any known number of structures, although often the number of structures may be quite large. In this example, each of the structures includes at least three data elements, and may optionally include zero or more additional data elements. Specifically, the zeroth structure S[0] includes the data elements $a_0$, $b_0$, $c_0$, and may optionally include zero or more other data elements. Likewise, the first structure S[1] includes the data elements $a_1$, $b_1$, $c_1$, and may optionally include zero or more other data elements. Further, the Nth structure S[N] includes the data elements $a_N$, $b_N$, $c_N$, and may optionally include zero or more other data elements. The scope of the present disclosure is not limited to any known number of data elements per structure. In various embodiments, each structure may have two, three, four, five, six, seven, eight, nine, ten, more than ten, more than twenty, or more than one hundred data elements, to name just a few examples.

The a-type data elements (e.g., $a_0$, $a_1$, $a_N$), the b-type data elements (e.g., $b_0$, $b_1$, $b_N$), and the c-type data elements (e.g., $c_0$, $c_1$, $c_N$) may represent different types of quantities, values, or things. As one illustrative example, the a-type, b-type, and c-type data elements may represent the red (R), green (G), and blue (B) color components of different corresponding pixels. In such a case, the AoS may include the data elements $R_0$, $G_0$, $B_0$, $R_1$, $G_1$, $B_1$, $R_2$, $G_2$, $B_2$, $R_3$, $G_3$, $B_3$, and so on. As another illustrative example, each of the structures may include an additional alpha (A) transparency/opacity component. In such a case, the AoS may include the data elements $R_0$, $G_0$, $B_0$, $A_0$, $R_1$, $G_1$, $B_1$, $A_1$, $R_2$, $G_2$, $B_2$, $A_2$, $R_3$, $G_3$, $B_3$, $A_3$, and so on. RGB and RGBA data are often used in computers and other electronic devices having displays/screens to represent the appearance of pixels. In yet another illustrative example, each of the structures may instead be a two-data element structure that contains a real number (r) and an imaginary number (i) that together represent a complex number. In such a case, the AoS may include the data elements $r_0$, $i_0$, $r_1$, $i_1$, $r_2$, $i_2$, $r_3$, $i_3$, and so on. In a still further illustrative example, each of the structures of the AoS may be an X-data element structure that contains data from X columns of a table, X entries of a record, or the like. The X-data elements may represent a wide variety of different types of data, such as, for example, financial data, accounting data, scientific data, high performance computing data, personnel data, or other types of data.

Referring again to FIG. 1, as shown, the different types of data elements (e.g., the a-type, b-type, and c-type data elements) are interleaved with one another in the AoS. Also, the different types of data elements have the same order or arrangement within each of the structures. For example, $a_0$ is to the left of (e.g., more or less significant than) $b_0$ which is itself to the left of $c_0$, $a_1$ is to the left of $b_1$ which is itself to the left of $c_1$, and $a_N$ is 1 to the left of $b_N$ which is itself to the left of $c_N$. This repetitive layout or arrangement, in which each of the structures has the same number of data elements, and in which the data elements are arranged in the same order, represents a "strided" data layout or arrangement. In the strided data layout or arrangement, the data elements of the different types reside at equally spaced or "strided" data element positions. Each of the different data element positions of a single structure may correspond to a different set of strided data element positions. Each data element of a given type (e.g., a-type) is separated from its nearest neighboring data element of the same given type (e.g., a-type) by a constant stride (S). In the illustrated example, the stride (S) is expressed as a number of data element positions, although the stride may instead be expressed in other ways (e.g., as a number of bits, nibbles, bytes, or otherwise). For example, assuming each of the structures includes only the a-type, b-type, and c-type data elements, $a_0$ will be separated from $a_1$ by a stride of three intervening data element positions, $a_1$ will be separated from $a_2$ (not shown) by the same stride of three intervening data element positions, and so on. In this way, the a-type data elements occupy a first set of strided data element positions (e.g., positions 0, 0+S, 0+2S, 0+3 S, . . . 0+N*S), the b-type data elements occupy a second set of strided data element positions (e.g., positions 1, 1+S, 1+2S, 1+3S, . . . 1+N*S), the c-type data elements occupy a third set of strided data element positions (e.g., positions 2, 2+S, 2+2S, 2+3S, . . . 2+N*S), and so on for the other optional types of data elements.

The AoS represents one possible data structure or arrangement in which the data elements of the different types (e.g., the a-type, b-type, and c-type data elements) are interleaved with one another at corresponding sets of strided data element positions. Such a data structure or arrangement may be efficient and/or otherwise desirable for some purposes and/or in some instances. For example, such a data structure or arrangement may compactly keep together color component data for a pixel, data from a row of a table, data from a single record, or the like. However, there are other instances where it may be more efficient and/or otherwise desirable to use an alternate data structure or arrangement in which the data elements of one or more given single types are deinterleaved or otherwise isolated from data elements of different types, and collected or stored by themselves in adjacent data element positions of an array or storage location. The term structure of arrays (SoA) is often used to refer to two or more such arrays that each have data elements of the same single type. The SoA may potentially include a different corresponding array for each different type of data element of an AoS, or only a subset of such a full set of arrays. Representatively, such an alternate data structure or arrangement may potentially allow more efficient processing through single instruction, multiple data (SIMD) instructions or operations, or may be more efficient or otherwise desirable for an algorithm, or the like. For example, such an alternate arrangement may be used in conjunction with vectorization of loops in different types of algorithms.

In any event, there are situations where it would be useful and/or beneficial to be able to deinterleave or otherwise rearrange the data elements of a first data arrangement or layout (e.g., an AoS, interleaved, or strided data arrangement) and store them in a second data arrangement or layout (e.g., a SoA, deinterleaved, or unstrided data arrangement). Conversely, there are other situations where it would be useful and/or beneficial to be able to interleave or otherwise rearrange the data elements of a first data arrangement or layout (e.g., a SoA, deinterleaved, or un-strided data arrangement) and store them in a second data arrangement or layout (e.g., an AoS, interleaved, or strided data arrangement). In some embodiments, one or more instructions may be included in an instruction set of a processor to be able to assist with or accelerate one or more such data rearrangements.

Figure 2:
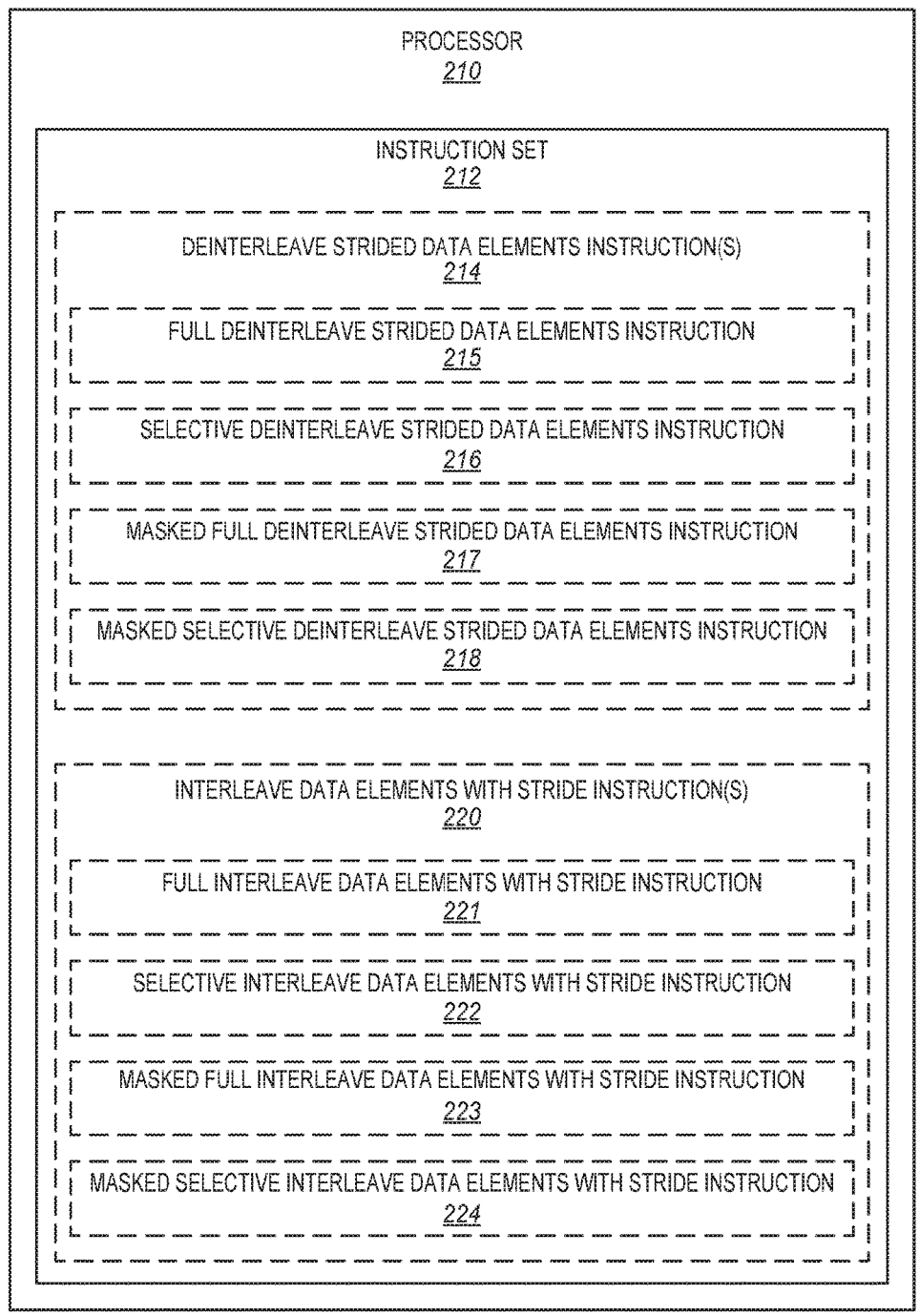
FIG. 2 is a block diagram of an embodiment of a processor that has an instruction set that includes at least one of an embodiment of a deinterleave strided data elements instruction and/or an embodiment of an interleave data elements with stride instruction.

FIG. 2 is a block diagram of an embodiment of a processor 210 that has an instruction set 212 that includes, along with various other types of instructions, at least one of an embodiment of a deinterleave strided data elements instruction 214 and an embodiment of an interleave data elements with stride instruction 220. The instructions of the instruction set may represent macroinstructions, machine language instructions, machine code instructions, or other instructions that the processor is natively able to decode.

In some embodiments, the instruction set may optionally include an embodiment of a full deinterleave strided data elements instruction 215. In some embodiments, the instruction 215 may be operative to specify or otherwise indicate a flexible/variable/configurable stride (e.g., the instruction and/or its opcode may allow different strides). In some embodiments, the stride may be able to encompass two, three, four, or more than four and/or at least five data element positions (e.g., five, six, seven, eight, nine, ten, more than ten, or more than twenty data element positions).

In some embodiments, the instruction 215 when performed may be operative to cause the processor to deinterleave data elements of all sets of strided data element positions for a stride (e.g., all data element positions of a structure of an AoS), and store the data elements for each of all sets of strided data element positions in a different corresponding destination packed data register. By way of example, in some embodiments, such an instruction may be used to load the data elements of multiple 3-element, 4-element, 5-element, or more than 5-element structures, into three, four, five, or more than five, corresponding destination packed data registers.

In some embodiments, the instruction set may optionally include an embodiment of a selective deinterleave strided data elements instruction 216. In some embodiments, like the instruction 215, the instruction 216 may be operative to specify or otherwise indicate a stride. In some embodiments, the stride may be able to be flexible/variable/configurable, and may be allowed to encompass in some embodiments more than four and/or at least five data element positions. In some embodiments, the instruction 216 may be operative to flexibly, variably, or configurably indicate or select one or more sets of strided data element positions (e.g., the instruction and/or its opcode may allow different combinations of sets of strided data element positions). In some embodiments, the instruction may allow any one or more, or optionally any subset, or optionally all sets of strided data element positions, to be selected or indicated. In some embodiments, the instruction 216 when performed may be operative to cause the processor to deinterleave data elements of the selected/indicated sets of strided data element positions (e.g., in some cases only a subset of all sets of strided data element positions), and store the data elements for each of the selected sets of strided data element positions in a different corresponding destination packed data register.

In some embodiments, the instruction set may optionally include an embodiment of a masked full deinterleave strided data elements instruction 217. In some embodiments, like the instruction 215, the instruction 217 may be operative to specify or otherwise indicate a stride. In some embodiments, the stride may be able to be flexible/variable/configurable, and may be allowed to include in some embodiments at least five data element positions. In addition, in some embodiments, the instruction 217 when performed may be operative to cause the processor to maskedly deinterleave data elements of all sets of strided data element positions, subject to the masking or predication in one or more packed data operation masks, and store the data elements for each of all sets of strided data element positions in a different corresponding destination packed data register, subject to the masking or predication in the one or more packed data operation masks. In some embodiments, a different corresponding packed data operation mask may be used for each of all sets of strided data element positions. Alternatively, a single mask may optionally be used, and may optionally be used for only one of the sets of strided data element positions, or may optionally be reused for all of the sets of strided data element positions.

In some embodiments, the instruction set may optionally include an embodiment of a masked selective deinterleave strided data elements instruction 218. In some embodiments, the instruction 218 may be operative to specify or otherwise indicate a stride. In some embodiments, the stride may be able to be flexible/variable/configurable, and may be allowed to include in some embodiments at least five data element positions. In some embodiments, the instruction 218 may be operative to flexibly, variably, or configurably indicate or select one or more sets of strided data element positions. In some embodiments, the instruction may allow any one or more, or optionally any subset, or optionally all sets of strided data element positions, to be selected or indicated. In some embodiments, the instruction 218 when performed may be operative to cause the processor to maskedly deinterleave data elements of the selected/indicated sets of strided data element positions, subject to the masking or predication in one or more packed data operation masks, and store the data elements for each of the selected/indicated sets of strided data element positions in a different corresponding destination packed data register, subject to the masking or predication in one or more packed data operation masks. In some embodiments, a different corresponding packed data operation mask may be used for each of the indicated/selected sets of strided data element positions.

In some embodiments, the instruction set may optionally include an embodiment of an interleave data elements with stride instruction 220. For example, the instruction set may optionally include one or more of a full interleave data elements with stride instruction 221, a selective interleave data elements with stride instruction 222, a masked full interleave data elements with stride instruction 223, and a masked selective interleave data elements with stride instruction 224. In some embodiments, the full, selective, masked full, and masked selective variants of the interleave data elements with stride instructions may, respectively, be similar to the full, selective, masked full, and masked selective variants of the deinterleave strided data elements instructions, except that the direction of the operation may be generally reversed. For example, in some embodiments an operand like the source operand (e.g., an AoS) of the deinterleave instruction(s) 214 may serve the role of a result operand (e.g., an AoS) of the interleave instruction(s) 220, and packed data registers like the destination packed data registers of the deinterleave instruction(s) 214 may instead serve the role of source packed data registers of the interleave instruction(s) 220. In addition, an interleave operation may be performed for the interleave instruction(s) 220, instead of the deinterleave operation for the deinterleave instruction(s) 214.

As few as only any one of these instructions may optionally be included in the instruction set. Alternatively, any two or more, or any combination, of such instructions may optionally be included in the instruction set.

FIG. 3 is a block flow diagram of an embodiment of a method 326 of performing an embodiment of a selective deinterleave strided data elements instruction. In various embodiments, the method may be performed by a processor, instruction processing apparatus, digital logic device, or integrated circuit.

The method includes fetching or otherwise receiving the selective deinterleave strided data elements instruction, at block 327. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory or an interconnect), or from an on-processor and/or on-die source (e.g., at a decode unit from an instruction cache). The instruction may specify or otherwise indicate each of a source operand, a stride, at least one set of strided data element positions out of all sets of strided data element positions for the indicated stride, and at least one destination packed data register of the processor.

The method includes storing, in response to and/or due to the instruction, for each of the indicated at least one set of strided data element positions, a corresponding result packed data operand, in a corresponding destination packed data register of the processor, at block 328. In some embodiments, each result packed data operand may include at least two data elements, which are from the corresponding indicated set of strided data element positions of the source operand. In some embodiments, the strided data element positions of the set may be separated from one another by integer multiples of the indicated stride.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc.

Figure 4:
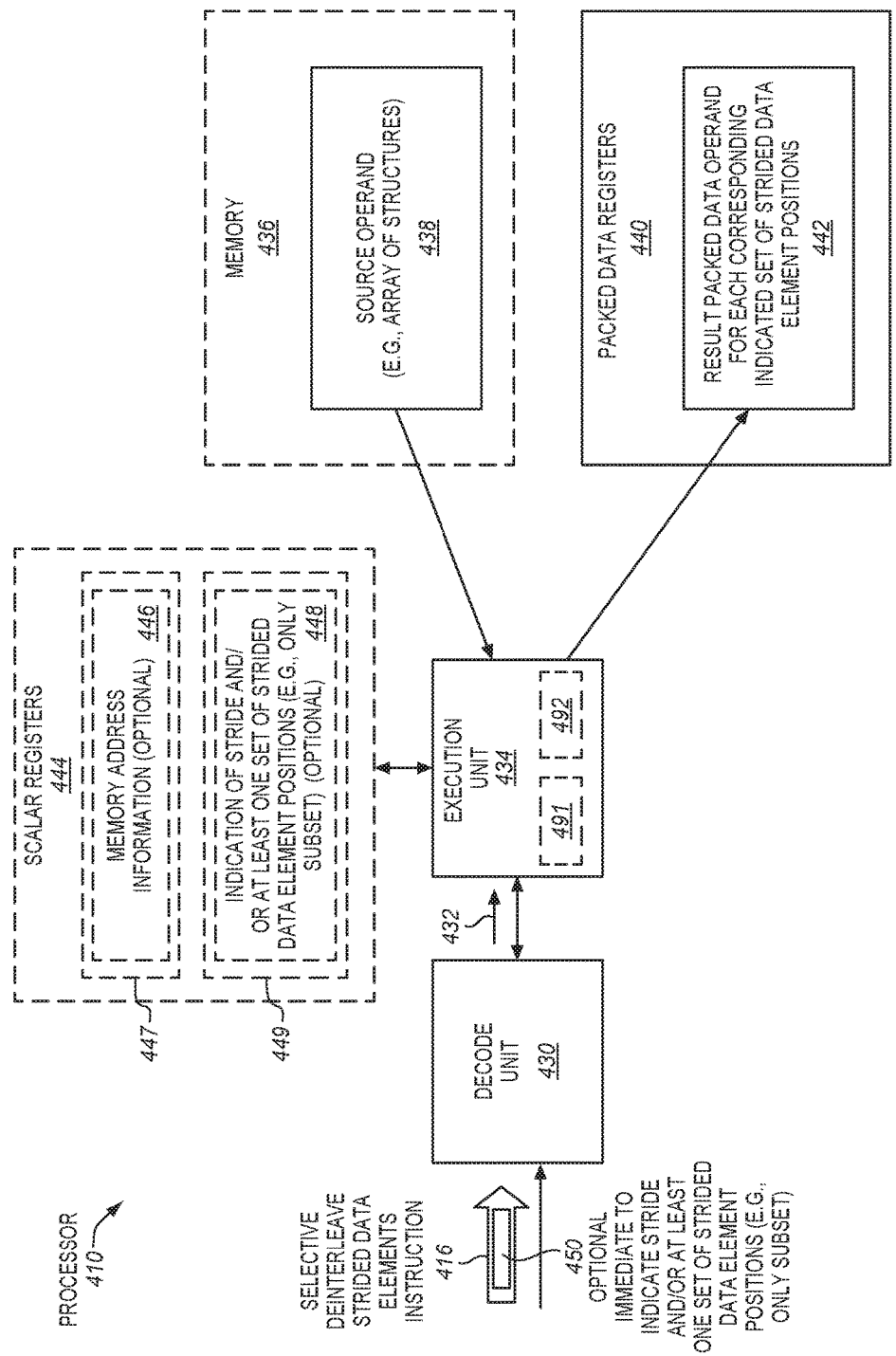
FIG. 4 is a block diagram of an embodiment of a processor that is operative to perform an embodiment of a selective deinterleave strided data elements instruction.

FIG. 4 is a block diagram of an embodiment of a processor 410 that is operative to perform an embodiment of a selective deinterleave strided data elements instruction 416. In some embodiments, the processor 410 may be operative to perform the method 326 of FIG. 3. The components, features, and specific optional details described herein for the processor 410, also optionally apply to the method 326. Alternatively, the method 326 may be performed by and/or within a similar or different processor or apparatus. Moreover, the processor 410 may perform methods the same as, similar to, or different than the method 326.

In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, graphics processors, network processors, communications processors, cryptographic processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have any such different architectures). In some embodiments, the processor may include (e.g., be disposed on) at least one integrated circuit or semiconductor die. In some embodiments, the processor may include at least some hardware (e.g., transistors, circuitry, non-volatile memory storing circuit-level instructions/control signals, or the like).

The processor includes a set of scalar registers 444 (e.g., a general-purpose register file), and a set of packed data registers 440. Each of these registers may represent an on-die or on-integrated circuit storage location, which is operative to store data. The packed data registers may be operative to store packed data, vector data, or Single instruction, multiple data (SIMD) data. The packed data registers may also be referred to as vector registers or single instruction, multiple data (SIMD) registers. The scalar and packed data registers may represent architecturally-visible or architectural registers that are visible to software and/or a programmer and/or are the registers indicated by instructions of the instruction set to identify operands. These architectural registers are contrasted to other non-architectural registers in a given microarchitecture (e.g., temporary registers, reorder buffers, retirement registers, etc.). The scalar and packed data registers may be implemented in different ways in different microarchitectures, and are not limited to any particular design. Examples of suitable types of registers include, but are not limited to, dedicated physical registers, dynamically allocated physical registers using register renaming, and combinations thereof. One specific example of a suitable set of packed data registers are the registers 1610 of FIG. 16, although the scope of the present disclosure is not so limited.

Referring again to FIG. 4, during operation the processor may be coupled to receive the instruction 416. For example, the processor may be coupled to receive the instruction from the memory 436 over a bus or other interconnect. The instruction may be included in an instruction set of at least one core of the processor. In some embodiments, the instruction 416 may explicitly specify (e.g., through one or more fields or sets of bits), or otherwise indicate (e.g., implicitly indicate), a source operand 438. In some embodiments, the source operand may include an array of structures (AoS), or other set of data exhibiting a strided layout or arrangement, although the scope of the present disclosure is not so limited (e.g., it could also be a homogeneous array for which strided accesses are desired). One specific example of a suitable source operand is at least a portion of the AoS 100 of FIG. 1, including any of the variations and alternatives mentioned therefor, although the scope of the present disclosure is not so limited. As shown, commonly the source operand may be stored in a memory 436 (e.g., main memory). When deployed in a system, the processor may be coupled with the memory. However, it is to be appreciated that embodiments pertain to the processor alone, before it is deployed in a system and/or coupled with the memory. Alternatively, the source operand may optionally be stored in another suitable storage location (e.g., one or more packed data registers indicated by the instruction). For example, data from a plurality of source packed data registers indicated by the instruction may at least logically be concatenated as a source operand (or may optionally actually be concatenated in an internal temporary register).

When the source operand 438 is stored in the memory 436, the instruction 416 may specify (e.g., explicitly specify) or indicate (e.g., implicitly indicate) a pointer or other memory address information, which may be used (potentially with other memory address information depending upon the memory addressing mode being used) to address or identify the location of the source operand in the memory. As shown, in some embodiments, such memory address information 446 may optionally be stored in a first source scalar register 447 of the processor. Alternatively, the memory address information may instead be specified or indicated through an immediate of the instruction, or otherwise provided. Depending upon the memory addressing mode being used, the memory address information provided by the instruction may optionally be combined with additional memory address information in order to fully address or identify the location of the source operand. By way of example, such additional memory address information may be stored in a data segment register, extended segment register, or other memory address register, or otherwise provided.

In some embodiments, the instruction 416 may be operative to indicate a stride. The stride may broadly represent a fixed spacing or distance between two data elements (e.g., between nearest neighbor data elements of the same type in an AoS (e.g., a-type data elements, red color components, etc.)). In some cases, the stride may be expressed as an integer number of data element positions. By way of example, assuming an AoS includes five-data element structures including $a_0$, $b_0$, $c_0$, $d_0$, $e_0$, $a_1$, $b_1$, $c_1$, $d_1$, $e_1$, and so on, the nearest neighbor data elements of a given type (e.g., $a_0$ and $a_1$) may be separated by a stride of five data element positions. Alternatively, the stride may be expressed in other ways, such as, for example, through a number of bits, a number of nibbles, a number of bytes, or otherwise. In some embodiments, the instruction may allow the stride to be a flexible, configurable, or variable value such that different strides may be used with the same instruction (e.g., the same opcode). In some embodiments, the stride may be indicated by a single flexible, configurable, or variable value (e.g., as opposed to gather indices or another sequence of integers that are spaced apart from one another by a fixed amount but which would generally need to be generated through significant effort). In some cases, the indication of the stride may be equal to the stride, whereas in other cases the indication of the stride may not be equal to the stride, but the stride may be determinable from the indication of the stride (e.g., a value of one data element position may be added to the indication of the stride to arrive at the stride, or the indication of the stride may have another relation to the stride). Alternatively, in other embodiments, a fixed stride value may optionally be fixed or implicit to the instruction (e.g., to its opcode). For example, an instruction set may include different instructions (e.g., different opcodes) that each have a different fixed implicit stride value (e.g., one opcode has a stride of 4, another instruction has a stride of 5, etc.).

In some embodiments, the instruction 416 may be operative to flexibly, adaptively, configurably, or variably specify, or otherwise select or indicate, one or more sets of strided data element positions. In some embodiments, the instruction may allow any one or more, or optionally any subset, or optionally all sets of strided data element positions for a stride (e.g., all data element positions of a structure of an AoS), to be selected or indicated. Advantageously, as will be explained further below, in some cases this may allow only a subset of all sets of strided data element positions (e.g., only those needed or not needed) to be indicated/selected, which may help to avoid unnecessarily tying up one or more packed data registers with unneeded data.

The one or more sets of strided data element positions may be selected or indicated in different ways in different embodiments. In some embodiments, the instruction may indicate a mask (e.g., a bitmask) that has a different portion (e.g., a different bit) that may be configured to indicate or select, or not, a different corresponding set of strided data element positions. One illustrative example of such an approach is shown and described further below for FIG. 6. In other embodiments, the instruction may indicate a vector, sequence, list, or other set of one or more values that may be used to provide one or more offsets, indices, or other values each operative to indicate or select the one or more corresponding sets of strided data element positions (e.g., any of the data element positions of a structure of an AoS). One illustrative example of such an approach is shown and described further below for FIG. 7. In still other embodiments, the instruction may indicate a value that the processor understands is mapped arbitrarily and/or per an adopted convention (e.g., as hardwired in logic, programmed in a table, etc.) to a predetermined one or more sets of strided data element positions. Regardless of how indicated/selected, the selected/indicated sets of strided data element positions may either be those that are needed (e.g., the data elements stored at those sets of strided data element positions are to be stored in corresponding result packed data operands), or those that are not needed.

Referring again to FIG. 4, in some embodiments, the instruction may explicitly specify (e.g., through one or more fields or a set of bits), or otherwise indicate (e.g., implicitly indicate), an optional second source scalar register 449 that may be used to store one or more 448 of the indication of the stride and/or the indication of the one or more sets of strided data element positions. In some embodiments, the instruction may have an optional immediate 450 that may specify or indicate one or more of the indication of the stride and/or the indication of the one or more sets of strided data element positions. The immediate may be included (e.g., as a field) in the encoding of the instruction, and may be configured (e.g., by a compiler) at runtime and/or based on runtime variables or data. Either the second source scalar register, or the immediate, or both, may be used to convey the indication of the stride and the indication of the one or more sets of strided data element positions.

In some embodiments, the selective deinterleave strided data elements instruction may also explicitly specify (e.g., through one or more fields or a set of bits), or otherwise indicate (e.g., implicitly indicate), one or more destination packed data registers 443, where one or more corresponding result packed data operands 442 are to be stored. Alternatively, one or more other storage locations (e.g., one or more memory locations) may optionally be used to store the one or more result packed data operands.

The first source scalar register 447, the second source scalar register 449, one or more of the destination packed data registers 443, and other registers disclosed herein (e.g., packed data operation mask registers to be discussed further below) may be specified (e.g., explicitly specified) or indicated (e.g., implicitly indicated) in different ways in different embodiments. In some embodiments, the instruction 416 may have one or more sets of bits in its instruction encoding (e.g., a dedicated register specification field) to explicitly specify the register (e.g., as a register index). In other embodiments, the register (e.g., a fixed register) may optionally be implicit (e.g., inherent or implied) for the instruction (e.g., implicit to its opcode). For example, the processor may implicitly understand that the fixed register is to be used for a given operand when it recognizes the instruction (e.g., when it decodes its opcode) without the instruction needing to have any non-opcode bits to explicitly specify the fixed register. Also, in some embodiments, in the case of the destination packed data registers (or in the case of the packed data operation mask registers discussed further below) it may optionally be implicit to use as many sequential destination packed data registers as needed that sequentially follow a given specified or indicated destination packed data register (or packed data operation mask register).

Referring again to FIG. 4, the processor includes a decode unit or decoder 430. The decode unit may be coupled to receive, and may be operative to decode, the selective deinterleave strided data elements instruction. The decode unit may output one or more relatively lower-level instructions or other control signals 432 (e.g., one or more micro-instructions, micro-operations, micro-code entry points, decoded instructions or control signals, etc.), which reflect, represent, and/or are derived from the relatively higher-level instruction decoded. In some embodiments, the decode unit may include at least one input structure (e.g., a port, interconnect, or interface) coupled to receive the instruction, an instruction recognition and decode logic coupled therewith to recognize and decode the instruction, and at least one output structure (e.g., a port, interconnect, or interface) coupled therewith to output the lower-level instruction(s) or control signal(s). The decode unit and/or its instruction recognition and decode logic may be implemented using various mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may include at least some hardware (e.g., one or more of transistors, integrated circuitry, on-die read-only memory or other non-volatile memory storing microcode or other hardware-level instructions, etc.). In some embodiments, the decode unit may be included on a die, integrated circuit, or semiconductor substrate.

In other embodiments, instead of the instruction 416 being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the instruction 416, which may be of a first instruction set, and may emulate, translate, morph, interpret, or otherwise convert it into one or more corresponding intermediate instructions or control signals, which may be of a second different instruction set. The one or more intermediate instructions or control signals of the second instruction set may be provided to a decode unit (e.g., decode unit 430), which may decode them into one or more lower-level instructions or control signals executable by native hardware of the processor (e.g., one or more execution units).

Referring again to FIG. 4, the execution unit 434 is coupled with the decode unit 430 to receive the one or more decoded or otherwise converted instructions or control signals 432 that represent and/or are derived from the selective deinterleave strided data elements instruction. In some embodiments, the execution unit may be on a die or integrated circuit with the decode unit. In some cases, the execution unit may be coupled with the scalar registers 444 to receive the optional memory address information 446 and/or one or more 448 of the indication of the stride and/or the indication of the one or more sets of strided data element positions. During operation, when the processor is deployed in a system, the execution unit may be operative to be coupled with the memory 436 to receive data from the source operand 438. The execution unit is also coupled with the set of packed data registers 440. The execution unit may be operative in response to and/or due to the selective deinterleave strided data elements instruction (e.g., in response to one or more control signals 432 and/or in response to the instruction being decoded and/or in response to the instruction being provided to a decoder) to execute or otherwise perform the operations of the selective deinterleave strided data elements instruction. In some embodiments, the operation may be similar to or the same as any of those shown or described for any of FIGS. 5-7, although the scope of the present disclosure is not so limited.

In some embodiments, the execution unit, in response to the instruction, may be operative to store a corresponding result packed data operand 442, for each of the indicated at least one set of strided data element positions. In some embodiments, each result packed data operand may be stored in a corresponding destination packed data register of the plurality of packed data registers 440. In some embodiments, each result packed data operand may include a plurality of data elements, which are to be from the corresponding indicated set of strided data element positions of the source operand 438. In some embodiments, the set of strided data element positions are to be separated from one another by integer multiples of the indicated stride.

In some embodiments, the execution unit, in response to the instruction, may be operative to load multiple N-element structures (e.g., a same number as the number of data elements in a result packed data) of an AoS from the memory. In some embodiments, the execution unit, in response to the instruction, may be operative to deinterleave and store M sets of strided data elements, from M corresponding indicated or selected sets of strided data element positions, of the N-element structures, in M corresponding destination packed data registers, where M and N are integers and M is less than N. In some embodiments, each of the M destination packed data registers may store data elements from a single corresponding one of the M strided data element positions. In some embodiments, the M destination packed data registers may represent M sequential destination packed data registers (e.g., $R_x$, $R_{x+1}$, $R_{x+2}$, etc.). In some embodiments, only one of the M registers may be specified by the instruction (e.g., the first register of the sequence), and it may be implicit to the instruction (e.g., implicit to the opcode) to use the registers sequentially following the specified register.

Instead of indicating or selecting the one or more sets of strided data element positions needed, another possible approach would be for an instruction (e.g., the full interleave strided data elements instruction 215) to implicitly, inherently, or inflexibly indicate that all sets of strided data element positions (e.g., all data element positions of a structure of an AoS) are to be stored to one or more corresponding result packed data operands and/or destination packed data registers. However, sometimes only a subset and/or less than all sets of strided data element positions are needed. For example, the stride may be at least five, six, seven, or even more, but only a few of the sets of strided data element positions may be needed. In such cases, if the instruction inherently or inflexibly stores all sets of strided data element positions to corresponding destination packed data registers, then one or more destination packed data registers may be used and tied up unnecessarily to store the unneeded data. Often, the packed data registers may represent a valuable and potentially scarce resource, such that tying them up unnecessarily may tend to detract from performance. However, the selective deinterleave strided data elements instruction is operative to flexibly, adaptively, or selectively specify or otherwise indicate only the subset of all sets of strided data element positions needed, and only store the indicated sets of strided data elements to destination packed data registers, thereby avoiding unnecessarily tying up packed data registers with unneeded data.

The execution unit and/or the processor may include specific or particular logic (e.g., transistors, integrated circuitry, or other hardware potentially combined with firmware (e.g., instructions stored in non-volatile memory) and/or software) that is operative to perform the instruction and/or store the one or more result packed data operands in response to and/or due to the instruction (e.g., in response to one or more instructions or control signals decoded from the instruction). In some embodiments, the execution unit may include one or more input structures (e.g., a port, interconnect, or interface) coupled to receive the source operand(s), circuitry or logic coupled therewith to receive and process the source operand(s) and generate the one or more result packed data operands, and one or more output structures (e.g., a port, interconnect, or interface) coupled therewith to output the one or more result packed data operands. In some embodiments, the circuitry or logic coupled therewith to receive and process the source operand(s) and generate the one or more result packed data operands may optionally include an internal temporary register 491 to store data elements of a source operand, and data element rearrangement logic 492 coupled therewith to rearrange the data elements of the source operand into the format appropriate for the result operands. Examples of such data element rearrangement logic includes, but is not limited to, hardwired interconnects or other routing logic, multiplexers or other selection logic, shuffle logic, permute logic, and the like. Such selection, shuffle, or permute logic may be controlled based on the instruction (e.g., the opcode, the stride, the indicted or selected data element positions, etc.) to rearrange the data elements as shown and described herein. In some embodiments, when an operand is in memory, the execution unit may include address generation logic (not shown) and/or logic to interface with external address generation logic.

It is to be appreciated that the term "execution unit" encompasses, but is not limited to, a single discrete unit performing all the operations to implement the selective deinterleave strided data elements instruction. Rather, such operations may potentially be performed by distributed logic that is distributed in two or more units or components of the processor. For example, a memory address generation operation may be performed partly by logic of an address generation unit, a load operation may be performed partly by logic of a load data unit, and a data rearrangement operation may be performed partly by logic of a vector execution unit (e.g., a shuffle or permute unit). As another example, a load path of the processor may have logic to implement the instruction potentially combined with logic of a vector execution unit (e.g., a shuffle or permute unit). However, to conform with common usage, such logic collectively represents, and is referred to herein, as the execution unit that executes or performs the selective deinterleave strided data elements instruction.

To avoid obscuring the description, a relatively simple processor 410 has been shown and described. However, the processor may optionally include other processor components. For example, various embodiments may include various combinations and configurations of the components shown and described for any of FIGS. 16, 17A-B, 18A-B. All the components of the processor may be coupled together to allow them to operate as intended.

Figure 5:
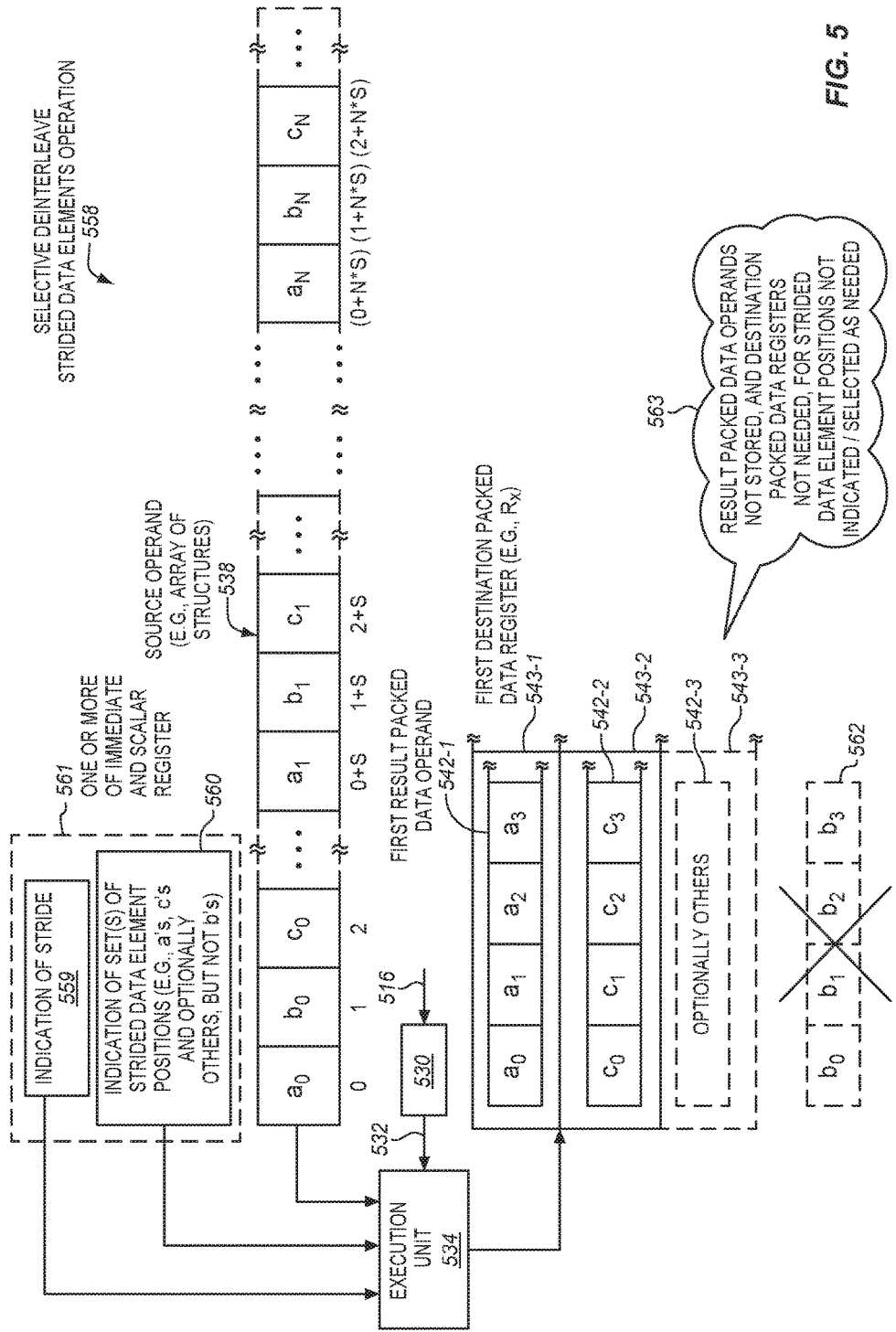
FIG. 5 is a block diagram of an example embodiment of a selective deinterleave strided data elements operation.

FIG. 5 is a block diagram of an example embodiment of a selective deinterleave strided data elements operation 558. The selective deinterleave strided data elements operation may be performed in response to an embodiment of a selective deinterleave strided data elements instruction 516 (e.g., the instruction 216 and/or the instruction 416).

A source operand 538 may be specified or otherwise indicated by the instruction. In some embodiments, the source operand may be similar to, or the same as, at least a portion of the AoS 100 of FIG. 1 and/or the source operand 438 of FIG. 4, including any of the variations and alternatives therefor. In the illustrated example, the source operand includes a zeroth structure that includes the data elements $a_0$, $b_0$, $c_0$, and optionally zero or more others, a first structure that includes the data elements $a_1$, $b_1$, $c_1$, and optionally zero or more others, through an Nth structure that includes the data elements $a_N$, $b_N$, $c_N$, and optionally zero or more others. In various embodiments, the data elements may be 8-bit, 16-bit, 32-bit, or 64-bit data elements, and may represent integer, fixed point, or floating point data elements, although the scope of the present disclosure is not so limited.

An indication of a stride (S) 559 may also be specified or otherwise indicated by the instruction. In some embodiments, the indication of a stride may be similar to, or the same as, the indication of the stride mentioned for FIG. 4, including any of the variations and alternatives therefor. As shown, in some embodiments, the indication of the stride may optionally be provided in one or more 561 (e.g., either one) of an immediate of the instruction and/or a scalar register indicated by the instruction.

An indication of one or more sets of strided data element positions 560 may also be specified or otherwise indicated by the instruction. In some embodiments, the indication of one or more sets of strided data element positions may be similar to, or the same as, the indication of one or more sets of strided data element positions mentioned for FIG. 4, including any of the variations and alternatives therefor. As shown, in some embodiments, the indication of the stride, and the indication of the one or more sets of strided data element positions, may optionally be provided in one or more 561 (e.g., either one) of an immediate of the instruction and/or a scalar register indicated by the instruction.

As previously mentioned, in some embodiments, the indication of the one or more sets of strided data element positions 560 may be able to indicate any one or more, or optionally any subset, or optionally all sets of strided data element positions. As show, in the illustrated example, the a-type (e.g., $a_0$, $a_1$, $a_2$, etc.), the c-type (e.g., $c_0$, $c_1$, $c_2$, etc.), and optionally zero or more other types of data elements are indicated as being needed, but the b-type (e.g., $b_0$, $b_1$, $b_2$, etc.) data elements are not indicated as being needed, although this is only one example. In some embodiments, the indication may represent a vector, sequence, list, or other set of one or more values to provide one or more offsets, indices, or other values to indicate or select the one or more corresponding sets of strided data element positions. In other embodiments, the indication may represent a mask (e.g., a bitmask) that may have a different portion (e.g., a different bit) that may be configured to indicate or select, or not, a different corresponding set of strided data element position. In still other embodiments, the indication may represent a value that the processor understands is mapped arbitrarily and/or according to an adopted convention to a predetermined set of one or more strided data element positions.

The source operand 538, the indication of the stride 559, and the indication of the one or more sets of strided data element positions 560, may each be provided to an execution unit 534. One or more decoded instructions or control signals 532 decoded from the selective deinterleave strided data elements instruction 516 by a decode unit 530 may also be provided to the execution unit. The execution unit may be operative to perform the embodiment of the selective deinterleave strided data elements operation 558 in response to and/or due to the embodiment of the selective deinterleave strided data elements instruction (e.g., in response to the instruction 516 being decoded and/or in response to the control signals 532). In some embodiments, the execution unit may be operative to generate and store a corresponding result packed data operand for each of the one or more indicated sets of strided data element positions 560. In some embodiments, each of these result packed data operands may be stored in a different destination packed data register or other storage location (e.g., a memory location) indicated by the instruction. In some embodiments, the instruction may explicitly specify or implicitly indicate a given destination packed data register ($R_x$), and it may be implicit to the instruction (e.g., its opcode) to use as many sequentially following destination packed data registers (e.g., $R_{x+1}$, $R_{x+2}$, etc.) as needed to store result packed data operands for all the indicated/selected sets of strided data element positions.

In the illustrated example, a first result packed data operand 542-1, having the a-type data elements, may be stored in a first destination packed data register 543-1 (e.g., $R_x$), a second result packed data operand 542-2, having the c-type data elements, may be stored in a second destination packed data register 543-2 (e.g., $R_{x+1}$), and optionally zero or more other result packed data operands 542-3, having zero or more other types of elements, may optionally be stored in zero or more other destination packed data registers 543-3 (e.g., $R_{x+2}$, $R_{x+3}$, etc.). However, for this example, as shown by the "X", a result packed data operand 562 may not be stored for the b-type data elements, and destination packed data register may not be used for such a result packed data operand for the b-type data elements. Rather, as shown by the callout 563, in some embodiments, one or more result packed data operands may not be stored, and one or more destination packed data registers may not be needed, for one or more sets of strided data element positions not indicated or selected as needed, by the indication of the one or more sets of strided data element positions 560. Advantageously, this may avoid unnecessarily tying up packed data registers with unneeded data, which may tend to help to improve performance.

In the illustrated example, each of the result packed data operands stores four data elements and may optionally store others. In various embodiments, each of the result packed data operands may represent a 64-bit, 128-bit, 256-bit, 1024-bit, or 2048-bit result packed data operand, and may optionally be stored in a packed data register of the same size, although the scope of the present disclosure is not so limited. Alternatively, other sized registers or other storage locations (e.g., memory locations) may optionally be used.

Figure 6:
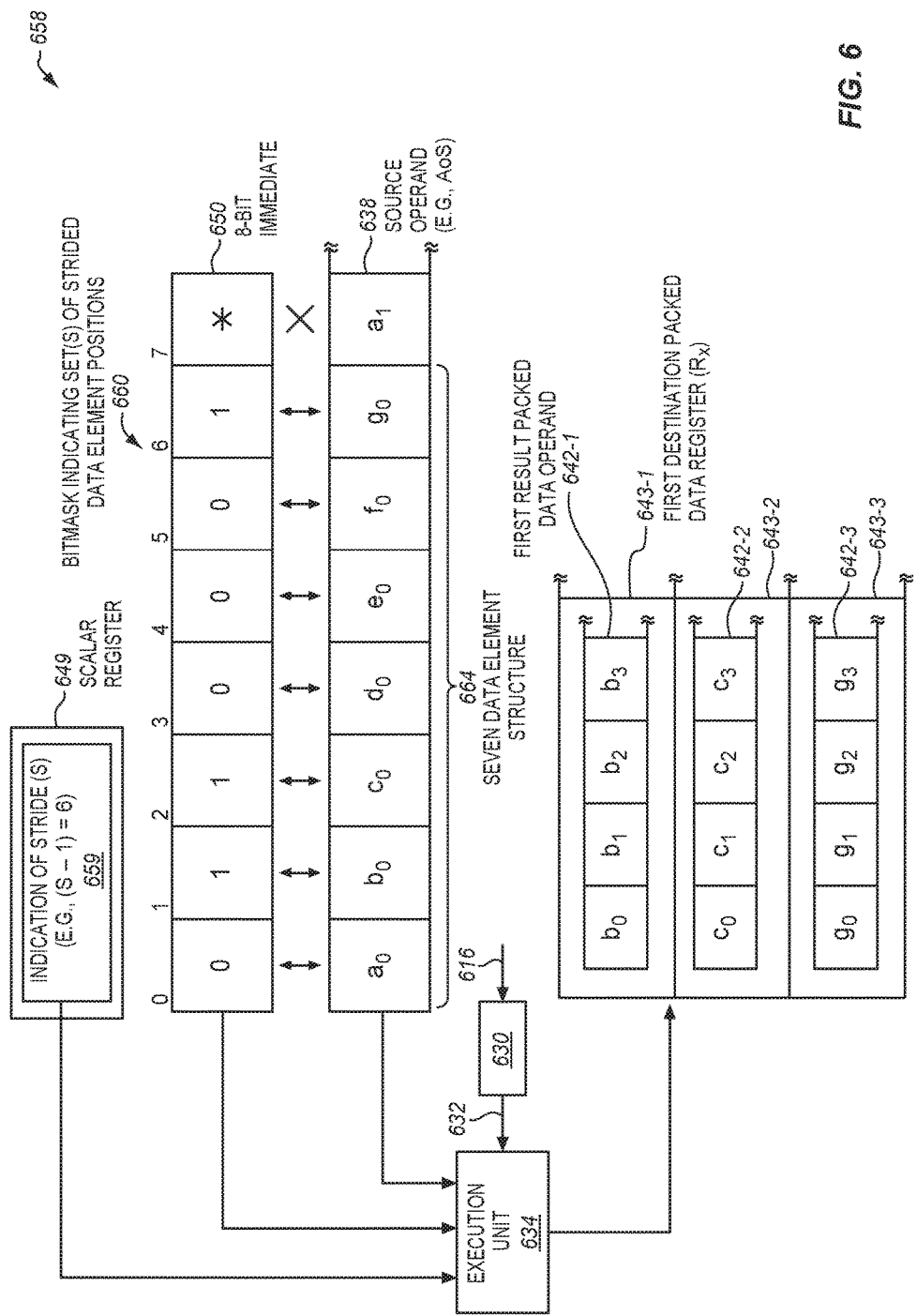
FIG. 6 is a block diagram of a first specific example embodiment of a selective deinterleave strided data elements operation with a bitmask to indicate one or more sets of strided data element positions.

FIG. 6 is a block diagram of a first specific example embodiment of a selective deinterleave strided data elements operation 658 with a bitmask 660 to indicate one or more sets of strided data element positions. The selective deinterleave strided data elements operation may be performed in response to an embodiment of a selective deinterleave strided data elements instruction 616.

A source operand 638 may be indicated by the instruction. In the illustrated example, the source operand includes seven data element structures. A first seven data element structure 664 includes the data elements $a_0$, $b_0$, $c_0$, $d_0$, $e_0$, $f_0$, and $g_0$. The data element $a_1$ of a second structure is also shown. Alternatively, other AoS and/or other source operands disclosed herein may be used instead. The data elements may have the sizes and types previously mentioned for FIGS. 4-5 including any of the variations and alternatives therefor.

An indication of a stride (S) 659 may also be indicated by the instruction. As shown, the indication of the stride may optionally be provided in a scalar register 649 indicated by the instruction, although this is not required. In the illustrated example, the indication of the stride is expressed as (S−1) and has a value of six to indicate a stride of seven. It is implicit or understood by the processor that a value of one data element position is to be added to the indication of the stride (e.g., S−1=6) to generate the stride (S=7). Alternatively, the stride may be expressed in various other ways as previously described.

A bitmask 660 indicating or selecting one or more sets of strided data element positions is also indicated by the instruction. As shown, the bitmask may optionally be provided in an immediate (e.g., an 8-bit immediate 650) of the instruction. Alternatively, the bitmask may be stored in a register indicated by the instruction. The bitmask may have a different bit for each corresponding one of all sets of strided data element positions (e.g., each data element position in the seven-data element structure 664). In some embodiments, bits and data elements in the same relative or corresponding positions in the immediate and structure may correspond with one another, although other conventions for correspondence may also optionally be adopted. In the illustrated example, a set of arrows are used to show the corresponding bits and sets of strided data element positions. In this example, bit[7] represents an extra bit beyond those needed for all sets of strided data element positions (e.g., a number of bits greater than the stride and/or number of data element positions in the structures), and may represent a don't care value (*) that may optionally be ignored and/or not used. As shown by an "X" it may not correspond to any set of strided data element positions. The value of each different portion of the mask (e.g., each different bit of the bitmask) may indicate whether the corresponding set of strided data element position is selected or not. For example, a bit may have a first value (e.g., be set to binary one per the illustrated convention) to indicate that a corresponding set of strided data element position is selected, or may have a second different value (e.g., be cleared to binary zero) to indicate that the corresponding set of strided data element position is not selected. In the specific illustrated example, bit[0] through bit[6] have the value "0110001", respectively, to indicate or select the b-type, c-type, and g-type data elements or sets of strided data element positions as being selected and in this case needed, although this is only one example. In other embodiments, bits may be cleared to binary zero to indicate the selected or needed positions.

The source operand 638, the indication of the stride 659, and the bitmask 660, may each be provided to an execution unit 634. One or more decoded instructions or control signals 632 decoded by a decode unit 630 from the instruction 616 may also be provided to the execution unit. The execution unit may be operative to perform the embodiment of the selective deinterleave strided data elements operation 658 in response to and/or due to the embodiment of the instruction 616 (e.g., in response to the decode unit 630 decoding the instruction 616 and/or in response to one or more control signals 632).

In the particular illustrated example, a first result packed data operand 642-1, having the b-type data elements, may be stored in a first destination packed data register 643-1 (e.g., $R_x$), a second result packed data operand 642-2, having the c-type data elements, may be stored in a second destination packed data register 643-2 (e.g., $R_{x+1}$), and a third result packed data operand 642-3, having the g-type data elements, may be stored in a third destination packed data register 643-2 (e.g., $R_{x+2}$). Notice that in this example, result data operands are not stored, and destination packed data registers are not used, for the a-type, d-type, e-type, and f-type data elements. Advantageously, in this example, this may avoid unnecessarily tying up four packed data registers with unneeded data. The result packed data operands, and the packed data registers, may have the sizes previously mentioned for FIGS. 4-5 including any of the variations and alternatives therefor.

Figure 7:
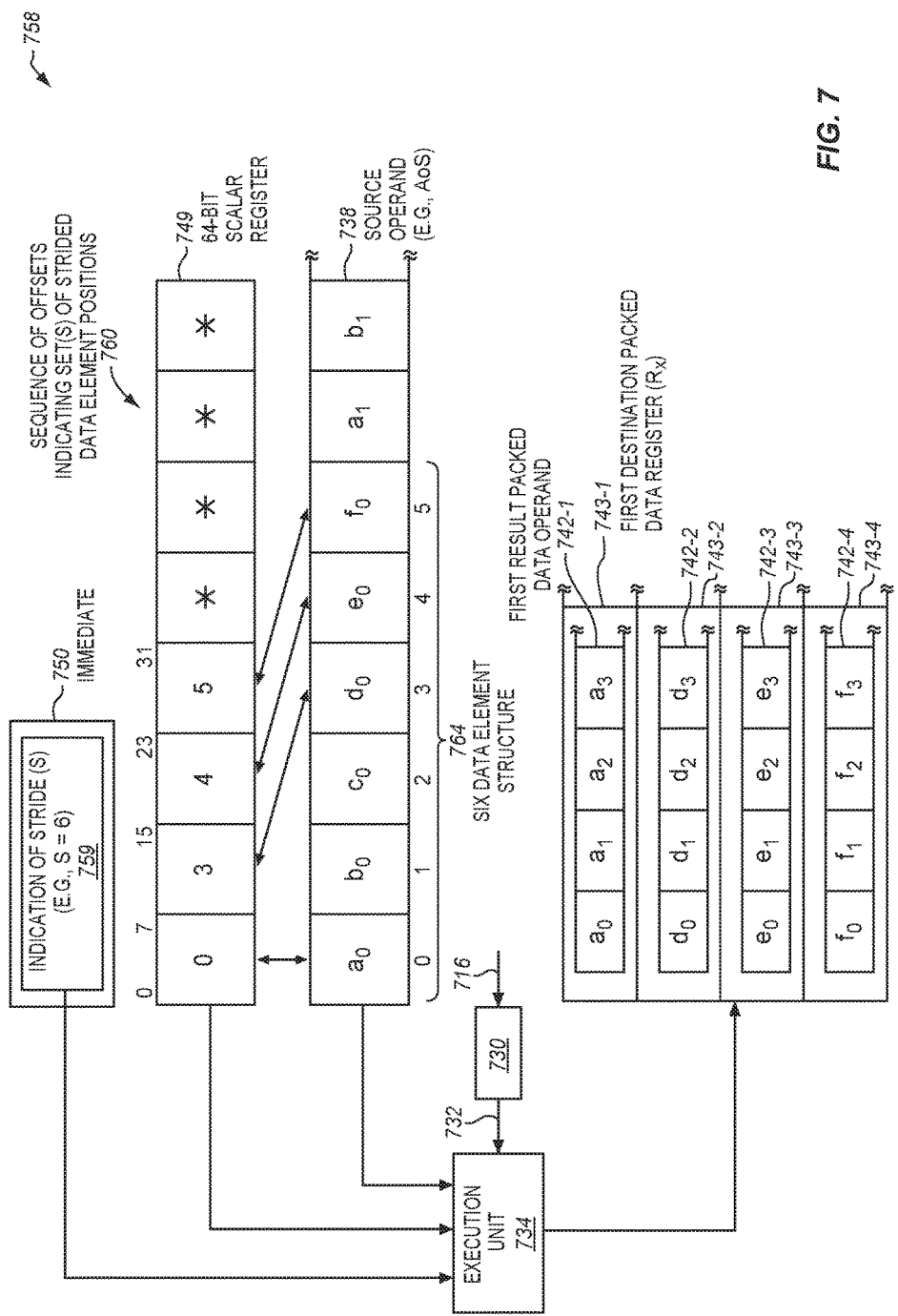
FIG. 7 is a block diagram of a second specific example embodiment of a selective deinterleave strided data elements operation with a sequence of offsets to indicate one or more sets of strided data element positions.

FIG. 7 is a block diagram of a second specific example embodiment of a selective deinterleave strided data elements operation 758 with a sequence of offsets 760 to indicate one or more sets of strided data element positions. The selective deinterleave strided data elements operation may be performed in response to an embodiment of a selective deinterleave strided data elements instruction 716.

A source operand 738 may be indicated by the instruction. In the illustrated example, the source operand includes six data element structures. A first six data element structure 764 includes the data elements $a_0$, $b_0$, $c_0$, $d_0$, $e_0$, and $f_0$. The $a_0$ occupies the zeroth position, $b_0$ occupies the first position, and so on. Alternatively, other AoS and/or other source operands disclosed herein may be used instead. The data elements may have the sizes and types previously mentioned for FIGS. 4-5 including any of the variations and alternatives therefor.

An indication of a stride (S) 759 may also be indicated by the instruction. As shown, the indication of the stride may optionally be provided in an immediate 750 of the instruction, although this is not required. In the illustrated example, the indication of the stride is equal to the stride (e.g., S=6). Alternatively, the stride may be expressed otherwise, as previously described.

A vector or other sequence of one or more offsets 760 indicating or selecting one or more corresponding sets of strided data element positions may also be indicated by the instruction. As shown, the sequence of offsets may optionally be stored in a general-purpose or other scalar register (e.g., a 64-bit scalar register 749) of the processor, although this is not required. The offsets broadly represent integers or other values able to indicate data element offsets or positions (e.g., for any of the data element positions of a single structure of an AoS). In the illustrated example, each offset is stored in a different 8-bit byte. In other embodiments, each offset may optionally be stored in a 4-bit nibble, a 16-bit half word, 32-bit word, or 64-bit doubleword.

In the illustrated example, as shown by a set of arrows, a first offset of value zero "0" (in this example stored in bits[7:0] of the scalar register) indicates the zeroth set of strided data element positions including $a_0$, a second offset of value three "3" (stored in bits[15:8]) indicates the third set of strided data element positions including $d_0$, a third offset of value four "4" (stored in bits[23:16]) indicates the fourth set of strided data element positions including $e_0$, and a fourth offset of value five "5" (stored in bits[31:24]) indicates the fifth set of strided data element positions including $f_0$. These offsets may also be reused for other structures of the AoS. The remaining bytes of the scalar register do not store offsets, and may represent don't care values (*), which may optionally be ignored and/or not used. By way of example, out of range values and/or values greater than the stride may be used for these don't care values. In the illustrated example, an offset of value zero "0" is used to indicate the data element position corresponding to $a_0$, although in other embodiments an offset value of one "1" may indicate this data element position. In the illustrated example, the offsets indicate needed positions, although in other embodiments the offsets may optionally indicate unneeded positions.

The source operand 738, the indication of the stride 759, and the sequence of offsets 760, may be provided to an execution unit 734. One or more decoded control signals 732 decoded by a decode unit 730 from the instruction 716 may also be provided to the execution unit. The execution unit may be operative to perform the embodiment of the operation 758 in response to and/or due to the embodiment of the instruction 716 (e.g., in response to the instruction 716 being decoded and/or in response to one or more control signals 732).

In the particular illustrated example, a first result packed data operand 742-1, having the a-type data elements (e.g., $a_0$, $a_1$, $a_2$, $a_3$, etc.), may be stored in a first destination packed data register 743-1 (e.g., $R_x$), a second result packed data operand 742-2, having the d-type data elements, may be stored in a second destination packed data register 743-2 (e.g., $R_{x+1}$), a third result packed data operand 742-3, having the e-type data elements, may be stored in a third destination packed data register 743-2 (e.g., $R_{x+2}$), and a fourth result packed data operand 742-4, having the f-type data elements, may be stored in a fourth destination packed data register 743-4 (e.g., $R_{x+3}$). Notice that in this example, result data operands are not stored, and destination packed data registers are not used or tied up unnecessarily, for the b-type and c-type data elements. The result packed data operands, and the packed data registers, may have the sizes previously mentioned for FIGS. 4-5 including any of the variations and alternatives therefor.

In some embodiments, any one or more of the selective deinterleave strided data elements operations 558, 658, and 758 of FIGS. 5-7 may optionally be performed by the processor 410 of FIG. 4. Alternatively, the operations may optionally be performed by a similar or different processor. Moreover, the processor 410 may be operative to perform similar or different operations than those of FIGS. 5-7.

In some cases and/or for some algorithms, it may not be necessary to store data elements from all data element positions, of a set of data element positions, into the corresponding result packed data operand. For example, this may be the case when an algorithm conditionally processes data elements only if a condition is satisfied, but otherwise does not process the data elements. By way of example, consider the following loop:

```
for(i=0; i<N; i++){
    if(condition_a) a_local = S[i].a;
    if(condition_b) b_local = S[i].b;
    if(condition_c) c_local = S[i].c;
    computation under condition (a_local, b_local, c_local);
}
```

In this loop, the a-type, b-type, and c-type data elements of three data element structures S[i] of an AoS may or may not be needed for further processing (i.e., the "computation under condition") depending upon the evaluations of condition_a, condition_b, and condition_c, respectively. One way to express the evaluation of such conditions is through a mask. For example, a first mask ($M_a$), a second mask ($M_b$), and a third mask ($M_c$) may respectively be used to represent the evaluation of the conditions (condition_a, condition_b, and condition_c) in different iterations of the above loop, as follows:

$M_a$=condition_a    [iteration0:iteration1:iteration2:iteration3 . . . ]
$M_b$=condition_b    [iteration0:iteration1:iteration2:iteration3 . . . ]
$M_c$=condition_c    [iteration0:iteration1:iteration2:iteration3 . . . ]

In other cases, the same condition may apply to each of the a-type, b-type, and c-type data elements, such that only a single mask may be used to represent the evaluations of the condition (applicable to each of the a-type, b-type, and c-type data elements) for different iterations.

In some embodiments, an instruction as disclosed herein (e.g., a masked full deinterleave strided data elements instruction, a masked selective deinterleave strided data elements instruction, etc.) may use one or more such masks to conditionally store data elements to result packed data operands. Without limitation, in some cases, the use of such masked types of instructions may be used by software (e.g., a compiler) to help promote vectorization of loops (e.g., with loads from arrays of structures) which are done under conditions. The increased vectorization may tend to help increase performance.

Figure 8:
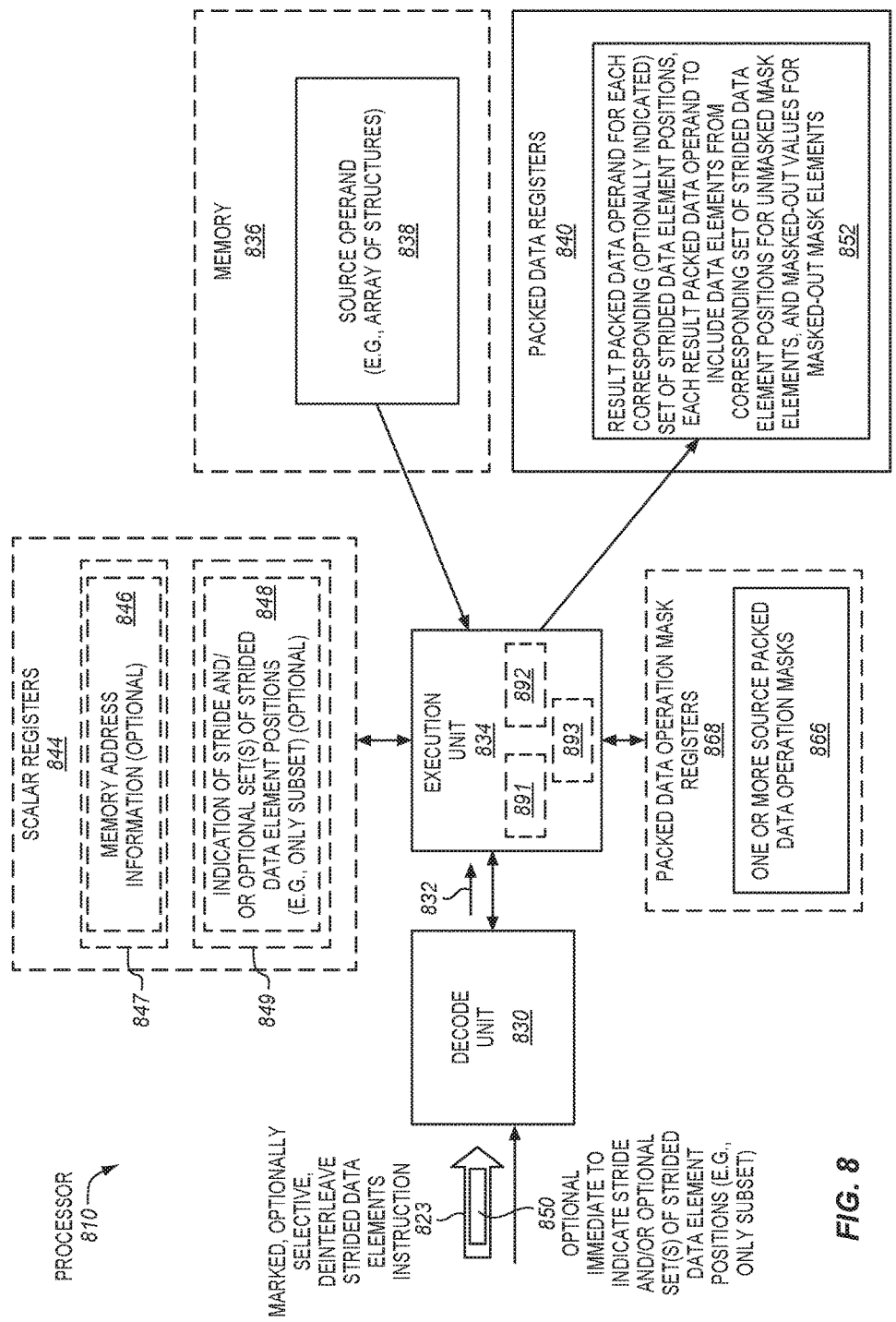
FIG. 8 is a block diagram of an embodiment of a processor that is operative to perform an embodiment of a masked, optionally selective, deinterleave strided data elements instruction.

FIG. 8 is a block diagram of an embodiment of a processor 810 that is operative to perform an embodiment of a masked, optionally selective, deinterleave strided data elements instruction 823. The processor includes a decode unit 830, an execution unit 834, an optional set of scalar registers 844, and a set of packed data registers 840. In some embodiments, execution unit may optionally include an internal temporary register 891 to store data elements of a source operand, data element rearrangement logic 892, as previously described, and mask/predication logic 893. When deployed in a system, the processor may be coupled with a memory 836 (e.g., main memory). However, embodiments pertain to the processor alone, before it is deployed in a system and/or coupled with the memory.

Aside from the masked and optionally selective aspects of the instruction 823, unless specified and/or otherwise clearly apparent, the processor 810 and its components may optionally be the same as, or similar to, the processor 410 of FIG. 4, and its correspondingly named components. Also, the registers and memory location may be indicated in the various ways previously described. To avoid obscuring the description, the different and/or additional characteristics of the embodiments of FIG. 8 will primarily be described, without repeating all the characteristics that may optionally be the same as or similar to those previously described for FIG. 4.

The processor may receive the masked, optionally selective, deinterleave strided data elements instruction 823. The instruction 823 may specify (e.g., explicitly specify) otherwise indicate (e.g., implicitly indicate) a source operand 838. The source operand may be similar to, or the same as, at least a portion of the AoS 100 of FIG. 1 and/or the source operands of any of FIGS. 4-8, including any of the variations and alternatives therefor. As shown, in some embodiments, the source operand may optionally be stored in the memory, although this is not required. When the source operand is optionally stored in the memory, the instruction 823 may specify or otherwise indicate optional memory address information 846. The optional memory address information may be the same as or similar to the memory address information 446 of FIG. 4, including any of the variations and/or alternatives mentioned therefor. As shown, the memory address information may optionally be stored in a first scalar register 847, or may be provided in an immediate, although the scope of the present disclosure is not so limited.

The instruction 823 may specify (e.g., explicitly specify) otherwise indicate (e.g., implicitly indicate) an indication of a stride. In some embodiments, the instruction 823 may optionally specify (e.g., explicitly specify) otherwise indicate (e.g., implicitly indicate) an optional indication of one or more sets of strided data element positions, although this is not required. The indication of the stride, and the optional indication of one or more sets of strided data element positions, may be similar to, or the same as, those of any of FIGS. 4-7, including any of the variations and alternatives therefor. In some embodiments, one or more 848 of the indication of the stride, and the optional indication of one or more sets of strided data element positions, may optionally be stored in an optional second source scalar register 849 indicated by the instruction. In some embodiments, an optional immediate 850 of the instruction may optionally indicate one or more of the indication of the stride, and the optional indication of one or more sets of strided data element positions. Either the second source scalar register, or the immediate, or both, may be used to convey the indication of the stride, and the optional indication of one or more sets of strided data element positions. Alternatively, instead of an "optionally selective" variant, the instruction 823 may optionally be a "full" variant, and may correspondingly not provide the optional indication of one or more sets of strided data element positions.

The instruction 823 may specify (e.g., explicitly specify) otherwise indicate (e.g., implicitly indicate) one or more source packed data operation masks 866. As shown, in some embodiments, the one or more source packed data operation masks may optionally be stored in a set of packed data operation mask registers 868. The packed data operation mask registers may represent another type of architectural registers of the processor. One specific example of a suitable set of packed data operation mask registers are the registers 1615 of FIG. 16 (e.g., a set of eight 64-bit registers, where a least significant 8-bit, 16-bit, or 32-bit portion, or all 64-bits, are used to store a mask), although the scope of the present disclosure is not so limited. Alternatively, the one or more source packed data operation masks 866 may optionally be stored in the scalar registers 844, the packed data registers 840, or another storage location. For example, a most significant bit, least significant bit, or other single bit, or all bits, of each data element in a packed data register may optionally be used as a mask element.

The decode unit 830 may be operative to decode the instruction 823 and output one or more corresponding instructions or other control signals 832. The execution unit 834 may be operative to perform an embodiment of a masked, optionally selective, deinterleave strided data elements operation in response to and/or due to the instruction 823 (e.g., in response to the instruction 823 being decoded and/or in response to the one or more control signals 832).

In some embodiments, the execution unit may be operative to store at least one result packed data operand 852 in at least one corresponding destination packed data register of the set of packed data registers 840. In some embodiments, at least one result packed data operand may be stored for each (optionally indicated) at least one set of strided data element positions (e.g., all sets of strided data element positions in the case of the "full" instruction variant or only the indicated or selected sets in the case of the "selective" instruction variant). In some embodiments, each result packed data operand may be subject to the predication or masking provided by the one or more source packed data operation masks 866. In some embodiments, each result packed data operand may include data elements from unmasked data element positions, of the corresponding set of strided data element positions of the source operand, which correspond to unmasked mask elements of the one or more source packed data operation masks 866. In some embodiments, each result packed data operand may include masked-out values for masked-out data element positions that correspond to masked-out mask elements of the one or more source packed data operation masks 866. In some embodiments, a different corresponding source packed data operation mask may optionally be used for each of the at least one set of strided data element positions and/or each of the at least one result packed data operand. In other embodiments, a single source packed data operation mask may optionally be reused for each of the at least one set of strided data element positions and/or each of the at least one result packed data operand.

FIG. 9 is a block diagram of an example embodiment of a masked full deinterleave strided data elements operation 970. The operation may be performed in response to an embodiment of a masked full deinterleave strided data elements instruction 917.

The masked full deinterleave strided data elements instruction may specify or otherwise indicate an indication of a stride 959 and a source operand 938. The indication of the stride may be similar to, or the same as, those of any of FIGS. 4-8, including any of the variations and alternatives therefor. The source operand may be similar to, or the same as, at least a portion of the AoS 100 of FIG. 1 and/or the source operands of any of FIGS. 4-8, including any of the variations and alternatives therefor.

The instruction may also specify (e.g., explicitly specify) or otherwise indicate (e.g., implicitly indicate) at least one source packed data operation mask. In the illustrated example, the instruction indicates a first source packed data operation mask 966-1, a second source packed data operation mask 966-2, a third source packed data operation mask 966-3, and optionally zero or more other source packed data operation masks 966-4, which correspond respectively to a first result packed data operand 942-1, a second result packed data operand 942-2, a third result packed data operand 942-3, and optionally zero or more other result packed data operands 942-4. Alternatively, the instruction may only indicate a single source packed data operation mask, which may optionally correspond to, and be reused for, each of the result packed data operands, or may optionally correspond to, and be used for, only one of the result packed data operands.

In some embodiments, each of the source packed data operation masks 966-1, 966-2, 966-3, 966-4 may optionally be stored in a different corresponding packed data operation mask register, although this is not required. In some embodiments, the instruction may explicitly specify or implicitly indicate a given one (e.g., one used for 966-1) of the source packed data operation mask registers register ($M_x$), and it may be implicit to the instruction (e.g., its opcode) to use as many sequentially following packed data operation mask registers (e.g., $M_{x+1}$, $M_{x+2}$, etc.) as needed to store all the source packed data operation masks.

Each packed data operation mask may also be referred to herein simply as an operation mask, predicate mask, mask, predicate operand, or conditional control operand. Each mask may be used to predicate, conditionally control, or mask whether or not corresponding operations (e.g., load and deinterleave operations) are to be performed and/or corresponding result data elements are to be stored in the corresponding result packed data operand. In some embodiments, the masking, predication, or conditional control may be at per-data element granularity, so that operations for different result data elements may be predicated or conditionally controlled separately and/or independently of others. Each mask may include multiple mask elements, predicate elements, or conditional control elements. In the illustration, each mask is show to include at least four such elements, labeled $m_0$-$m_3$, and may optionally include others. In one aspect, the mask elements may be included in a one-to-one correspondence with corresponding result data elements of a corresponding result packed data operand. A mask may have a different corresponding mask element for each result data element of a corresponding result packed data operand.

It is often convenient, for the corresponding mask and result elements to be in same relative positions within the operands (e.g., for the least significant mask and result elements to correspond, the most significant mask and result elements to correspond, and so on), although this is not required. In the illustrated example, the corresponding mask and result elements are in vertical alignment. Specifically, the four mask elements $m_0$-$m_3$ of the first mask 966-1 respectively correspond to the four vertically aligned result data elements of the first result packed data operand 942-1 (e.g., $m_2$ corresponds to $a_2$, $m_3$ corresponds to $a_3$, etc.), the four mask elements $m_0$-$m_3$ of the second mask 966-2 respectively correspond to the four vertically aligned result data elements of the second result packed data operand 942-2, and so on.

A value of each mask element may control whether or not a corresponding operation is to be performed and/or a corresponding result data element is to be stored. Each mask element may have a first "unmasked" value to indicate that the operation is to be performed, and the corresponding result data element is to be stored in the corresponding result packed data operand, or may have a second different "masked-out" value to indicate that the operation is not to be performed and/or the corresponding result data element is not to be stored in the corresponding result packed data operand. In some embodiments where data is being loaded from memory, the execution unit and/or the processor, in response to the instruction, may optionally suppress and/or not raise possible faults or other exceptional conditions (e.g., page faults, memory access faults, memory access type violation faults, etc.) for data element positions, of an indicated at least one set of strided data element positions, that correspond to masked-out mask elements. In some cases, this may tend to help to increase vectorization. For example, in a case where memory accesses may happen or potentially happen outside of the boundaries of an array, if masking wasn't supported, then a compiler may tend to behave conservatively and decide not to vectorize the loop. However, if masking is supported, then the compiler may mask accesses that happen or potentially happen outside of the boundaries of the array, and decide to vectorize the loop while masking those accesses that happen or potentially happen outside of the boundaries of the array.

In some embodiments, each mask element may optionally be a single mask bit that is used to provide the unmasked or masked-out value. According to one possible convention, as shown in the illustration, a single mask bit cleared to binary zero (i.e., 0) may represent a masked-out mask element or value, whereas a single mask bit set to binary one (i.e., 1) may represent an unmasked mask element or value. The opposite convention is also possible. Alternatively, two or more bits may optionally be used for each mask element (e.g., each mask element may have a same number of bits as each corresponding result data element), and one or more bits (e.g., either a most or least significant bit or all bits) of the mask element may be used to provide the unmasked or masked-out value. In the illustrated example, for the first mask 966-1 $m_0$ and $m_1$ are masked-out whereas $m_2$ and $m_3$ are unmasked, for the second mask 966-2 $m_0$ and $m_1$ are unmasked whereas $m_2$ and $m_3$ are masked-out, and for the third mask 966-3 $m_1$ and $m_3$ are masked-out whereas $m_0$ and $m_2$ are unmasked.

The indication of the stride 959, the source operand 938, and the one or more masks (e.g., 966-1, 966-2, 966-3, 966-4), may each be provided to an execution unit 934. One or more decoded instructions or control signals 932 decoded by a decode unit 930 from the instruction 917 may also be provided to the execution unit. The execution unit may be operative to perform the embodiment of the masked full deinterleave strided data elements operation 970 in response to and/or due to the embodiment of the instruction 917 (e.g., in response to the instruction 917 being decoded and/or in response to the control signals 932).

In some embodiments, in the case of the "full" deinterleave operation, the execution unit may be operative to generate and store a corresponding result packed data operand for each of all sets of strided data element positions. In some embodiments, in the case of the "masked" operation, the execution unit may be operative to store data elements from the sets of strided data element positions into the corresponding result packed data operands subject to the predication or masking provided by one or more corresponding source packed data operation masks. In the particular illustrated example embodiment, a different corresponding source packed data operation mask is used for each of all sets of strided data element positions and/or each of the corresponding result packed data operands. Alternatively, a single packed data operation mask (e.g., the mask 966-1) may optionally be reused for each of all sets of strided data element positions and/or each of the corresponding result packed data operands.

As shown, in the particular illustrated example embodiment, for the first result packed data operand 942-1, masked-out values (#) may be stored in the first two data element positions corresponding to the masked-out mask elements $m_0$ and $m_1$ of the first mask 966-1, whereas the a-type data elements $a_2$ and $a_3$ may be stored in the next two data element positions corresponding to the unmasked mask elements $m_2$ and $m_3$ of 966-1. Analogously, for the second result packed data operand 942-2, the b-type data elements $b_0$ and $b_1$ may be stored in the first two data element positions corresponding to the unmasked mask elements $m_0$ and $m_1$ of the second mask 966-2, whereas masked-out values (#) may be stored in the next two data element positions corresponding to the masked-out mask elements $m_2$ and $m_3$ of 966-2. For the third result packed data operand 942-3, the c-type data elements $c_0$ and $c_2$ may be stored in the zeroth and second data element positions corresponding to the unmasked mask elements $m_0$ and $m_2$ of the third mask 966-3, whereas masked-out values (#) may be stored in the first and third data element positions corresponding to the masked-out mask elements $m_1$ and $m_3$ of 966-3. An analogous approach may be used for the zero or more other result packed data operands 942-4.

The masked-out values (#) may be determined in different ways in different embodiments. In some embodiments, a first type of masking, known as zeroing type masking, may optionally be used. In zeroing type masking, the masked-out result data elements may be zeroed out (e.g., be forced to have a value of zero) and/or have zero values. For example, all sixteen bits of a masked-out 16-bit result data element may be cleared to binary zero. In other embodiments, a second type of masking, known as merging type masking, may optionally be used. In merging type masking, the values initially stored in the corresponding data element positions of the destination packed data register or other destination storage location immediately prior to the instruction being performed may be retained or preserved as the masked-out values. For example, $a_2$ and $a_3$ may be "merged" into the destination packed data register used to store the first result packed data operand 942-1 while the bits used for the first two masked-out values (#) may retain or keep their same bit values that they had in that packed data register prior to the performance of the instruction. Alternatively, other types of predetermined values may optionally be used for the masked-out values (#). In some embodiments, multiple different types of masking (e.g., zeroing masking and merging masking) may optionally be supported by the processor and/or the instruction. In some embodiments, the instruction may also include an optional type of masking operation specification field to flexibly indicate a type of masking (e.g., the field may have a first value to indicate merging-masking, or a second value to indicate zeroing-masking). Alternatively, the type of masking may optionally be indicated in a control register of the processor.

In some embodiments, each of the result packed data operands 942 may be stored in a different destination packed data register or other destination storage location (e.g., a memory location) indicated by the instruction. In some embodiments, it may be implicit to the instruction (e.g., its opcode) to use as many sequential destination packed data registers starting with a given indicated destination packed data register as needed to store all the result packed data operands and/or for all sets of strided data element positions. The result packed data operands, and the packed data registers, may have the sizes previously mentioned for FIGS. 4-8 including any of the variations and alternatives therefor.

FIG. 10 is a block diagram of an example embodiment of a masked selective deinterleave strided data elements operation 1072. The operation may be performed in response to an embodiment of a masked selective deinterleave strided data elements instruction 1018.

The masked "selective" deinterleave strided data elements operation 1072 and instruction 1018 of FIG. 10 are similar to the masked "full" deinterleave strided data elements operation 970 and instruction 917 of FIG. 9. To avoid obscuring the description, the different and/or additional characteristics for the "selective" operation and instruction of FIG. 10 will primarily be described. However, it is to be appreciated that, the previously described characteristics and details of the "full" operation and instruction of FIG. 9 may also optionally apply to the "selective" operation and instruction of FIG. 10, unless stated otherwise or otherwise clearly apparent (e.g., if they pertain to the "full" aspect of using all sets of strided data element positions).

The masked selective deinterleave strided data elements instruction 1018 may specify or otherwise indicate an indication of a stride 1059 and an indication of one or more sets of strided data element positions 1060, which may optionally be in one or more 1061 of an immediate and a scalar register. The instruction 1018 may also specify or otherwise indicate a source operand 1038, a first source packed data operation mask 1066-1, a second source packed data operation mask 1066-2, and optionally zero or more others 1066-3. Each of these different types of items may be similar to or the same as those previously described including any of the variations and/or alternatives mentioned therefor.

The indication of the stride 1059, the indication of the one or more sets of strided data element positions, the source operand 1038, and the one or more masks (e.g., 1066-1, 1066-2, 1066-3), may each be provided to an execution unit 1034. One or more decoded instructions or control signals 1032 decoded by a decode unit 1030 from the instruction 1018 may also be provided to the execution unit. The execution unit may be operative to perform the embodiment of the masked selective deinterleave strided data elements operation 1072 in response to and/or due to the embodiment of the instruction 1018.

In this case of the "selective" type operation, in some embodiments, the execution unit may be operative to generate and store a corresponding result packed data operand for each of only the one or more sets of strided data element positions that are selected/indicated as being needed by the indication 1060. In the particular illustrated example, as shown by the "X", the indication 1060 indicates that no result packed data operand 1062 needs to be stored for the set of strided data element positions corresponding to the c-type data elements, although this is just one illustrative example. Advantageously, this may avoid unnecessarily tying up a packed data register with unneeded data, which may tend to help to improve performance. For this example, as shown by the "X", no source packed data operation mask 1053 is needed for the set of strided data element positions corresponding to the c-type data elements. In other embodiments, a single source packed data operation mask may be indicated by the instruction and reused for each of the sets of strided data element positions indicated as being needed, but may not be used for those sets of strided data positions not indicated as being needed.

In some embodiments, any one or more of the operations 970 and 1072 of FIGS. 9-10 may optionally be performed by the processor 810 of FIG. 8. Alternatively, the operation may optionally be performed by a similar or different processor. Moreover, the processor 810 may be operative to perform operations similar to or different than those of FIGS. 9-10.

Instead of using the deinterleave strided data elements instructions as disclosed herein, another possible approach would be to use multiple gather instructions with respective sets of strided gather indices that are offset from one another. By way of example, in the case of an AoS that includes three-data element structures that include a-type, b-type, and c-type data elements (e.g., $a_0$, $b_0$, $c_0$, $a_1$, $b_1$, $c_1$, and so on), first, second, and third gather instructions with the same gather indices [0, 3, 6, 9, . . . ], but offset by one data element position from each other, may be used to gather the a-type, b-type, and c-type data elements, respectively, into first, second, and third destination packed data registers. However, one potential drawback with such an approach is that multiple gather instructions may need to be performed (e.g., one for each set of strided data element positions) instead of only a single selective deinterleave strided data elements instruction.

Another potential drawback is that the indices may not be known or available in the general case and/or may need to be generated by performing additional instructions. In contrast, the selective deinterleave strided data elements instruction does not need to use such gather indices, but rather may indicate a single stride value (e.g., a single integer value in a scalar register or immediate) and indicate a set of one or more data element positions that are to be reused for different strided positions (e.g., different structures of an AoS based on the stride). Yet another potential drawback is that locality of the data elements of the structure, which often reside in the same cache line, is not taken into consideration. Rather, often a gather instruction may be implemented through separate sequential load operations for each of the gather indices. In addition to the sequential load operations generally taking more time to implement, they may potentially encounter multiple sequential page faults, memory access faults, or the like. In contrast, the implementation of the selective deinterleave strided data elements instruction may better utilize spatial locality by concurrently loading multiple adjacent data elements and/or multiple adjacent structures, if they reside within the same cache line, which may help to improve performance.

As discussed above in conjunction with FIG. 2, in some embodiments, the instruction set 212 may optionally include an embodiment of an interleave data elements with stride instruction 220. For example, the instruction set may optionally include one or more of a full interleave data elements with stride instruction 221, a selective interleave data elements with stride instruction 222, a masked full interleave data elements with stride instruction 223, and a masked selective interleave data elements with stride instruction 224. These instructions and operations may be performed with processors, decode units, execution units, and registers similar to those previously described (e.g., those of FIG. 4 and/or FIG. 8). Alternatively, these instructions and operations may optionally be performed by similar or different processors.

In some embodiments, the full, selective, masked full, and masked selective variants of the interleave data elements with stride instruction may be similar to the full, selective, masked full, and masked selective variants of the deinterleave strided data elements instruction, respectively, except that the direction of the operation may be generally reversed. For example, in some embodiments, an operand like the source operand (e.g., an AoS) of the deinterleave instruction(s) 214 may instead serve the role of a result operand (e.g., an AoS) of the interleave instruction(s) 220, and packed data registers like the destination packed data registers of the deinterleave instruction(s) 214 may instead serve the role of source packed data registers of the interleave instruction(s) 220. In addition, an interleave operation may be performed for the interleave instruction(s) 220, instead of the deinterleave operation for the deinterleave instruction(s) 214.

However, aside from such differences, the interleave instruction(s) 220 and operations may have indications of strides, indications of one or more sets of strided data element positions (in the case of selective variants), and packed data operation masks (in the case of masked variants), that may be the same as or similar to those previously described, including any of the variations and/or alternatives mentioned therefor. Also, the same or similar approaches may be used to specify or indicate registers and memory locations, including any of the variations and/or alternatives mentioned therefor. To avoid obscuring the description, the different and/or additional characteristics of the interleave instruction(s) 220 and operations will primarily be described.

FIG. 11 is a block diagram of an example embodiment of a selective interleave data elements with stride operation 1198. The operation may be performed in response to an embodiment of a selective interleave data elements with stride instruction 1122. The instruction 1122 may specify or otherwise indicate an indication of a stride 1159 and an indication of one or more sets of strided data element positions 1160, which may optionally be in one or more 1161 of an immediate and a scalar register. The indications 1159 and 1160 may be similar to or the same as those previously described, including any of the variations and/or alternatives mentioned therefor.

The instruction 1122 may also specify or otherwise indicate one or more source packed data operands and/or one or more corresponding source packed data registers. In some embodiments, the instruction may indicate a different corresponding source packed data operand and/or source packed data register for each of the one or more sets of strided data element positions indicated by the indication 1160. In the illustrated example embodiment, these include a first source packed data operand 1142-1 in a first source packed data register 1143-1 (e.g., $R_x$), a second source packed data operand 1142-2 in a second source packed data register 1143-2 (e.g., $R_{x+1}$), and optionally zero or more other source packed data operands 1142-3 in zero or more corresponding source packed data registers 1143-3 (e.g., $R_{x+2}$, $R_{x+3}$, etc.). In the illustrated example, the first operand 1142-1 includes the a-type data elements $a_0^*$, $a_1^*$, $a_2^*$, and $a_3^*$, and optionally others, and the second operand 1142-2 includes the c-type data elements $c_0^*$, $c_1^*$, $c_2^*$, and $c_3^*$, and optionally others. These operands and registers may have the same sizes previously described and may include data elements of the same sizes and types previously described. In this example, as shown by the "X", the b-type data elements are not among the indicated sets of strided data element positions, so no source packed data operand and/or no source packed data register are used for the b-type data elements ($b_0$, $b_1$, $b_2$, $b_3$, and optionally others).

The indication of the stride 1159, the indication of the one or more sets of strided data element positions 1160, and the one or more source packed data operands (e.g., 1142-1, 1142-2, 1142-3), may each be provided to an execution unit 1134. One or more decoded instructions or control signals 1132 decoded by a decode unit 1130 from the instruction 1122 may also be provided to the execution unit. The execution unit may be operative to perform the embodiment of the selective interleave data elements with stride operation in response to and/or due to the embodiment of the instruction 1122. The execution unit may store a result operand 1138. In some embodiments, the result operand may represent a partially updated set of strided data (e.g., at least a portion of the AoS 100 of FIG. 1). In some embodiments, the result operand may optionally be stored in memory (e.g., main memory). Alternatively, the result operand may optionally be stored in a plurality of packed data registers.

In some embodiments, the execution unit may be operative to interleave the data elements from the different source packed data operands, with one another and/or with existing data elements in the memory or other storage location used for the result operand, at strided data element positions. As shown, $a_0^*$, $a_1^*$, and so on, may be stored at strided data element positions in the result operand. Likewise, $c_0^*$, $c_1^*$, and so on, may be stored at strided data element positions in the result operand. However, in this case of the "selective" type operation, since the b-type data elements are not indicated or selected by the indication 1160, the b-type data elements (e.g., $b_0$, $b_1$, etc.) initially stored in the storage location used for the result operand may be skipped over. For example, the bit values of the data elements $b_0$ and $b_1$ initially stored in the memory location or other storage location used for the result operand before the instruction/operation may be retained after the instruction/operation.

FIG. 12 is a block diagram of an example embodiment of a masked selective interleave data elements with stride operation 1299. The operation may be performed in response to an embodiment of a masked selective interleave data elements with stride instruction 1224. The instruction 1224 may specify or otherwise indicate an indication of a stride 1259 and an indication of one or more sets of strided data element positions 1260, which may optionally be in one or more 1261 of an immediate and a scalar register. The indications 1259 and 1260 may be similar to or the same as those previously described, including any of the variations and/or alternatives mentioned therefor.

The instruction 1224 may also specify or otherwise indicate one or more source packed data operands and/or one or more corresponding source packed data registers. In some embodiments, the instruction may indicate a different corresponding source packed data operand and/or source packed data register for each of the one or more sets of strided data element positions indicated by the indication 1260. In the illustrated example embodiment, these include a first source packed data operand 1242-1 (e.g., stored in a first source packed data register (e.g., $R_x$)), a second source packed data operand 1242-2 (e.g., stored in a second source packed data register (e.g., $R_{x+1}$)), and optionally zero or more other source packed data operands 1242-3 (e.g., stored in zero or more other source packed data registers (e.g., $R_{x+2}$, $R_{x+3}$, etc.)). In the illustrated example, the first operand 1242-1 includes the a-type data elements $a_0^*$, $a_1^*$, $a_2^*$, and $a_3^*$, and optionally others, and the second operand 1242-2 includes the b-type data elements $b_0^*$, $b_1^*$, $b_2^*$, and $b_3^*$, and optionally others. These operands and registers may have the same sizes previously described and may include data elements of the same sizes and types previously described. In this example, as shown by the "X", the c-type data elements are not among the sets of strided data element positions for the indication 1260, so no source packed data operand 1262 and/or no source packed data register are used for the c-type data elements.

The instruction 1224 may also specify or otherwise indicate one or more source packed data operation masks and/or one or more corresponding source packed data operation mask registers. As shown, in some embodiments, the instruction may indicate a different corresponding source packed data operation mask for each of the one or more sets of strided data element positions indicated by the indication 1260 and/or for each of the source packed data operands. In the illustrated example embodiment, these include a first source packed data operation mask 1266-1 (e.g., stored in a first source packed data operation mask register (e.g., $M_x$)), a second source packed data operation mask 1266-2 (e.g., stored in a second source packed data operation mask register (e.g., $M_{x+1}$)), and optionally zero or more other source packed data operation masks 1266-3 (e.g., stored in zero or more other source packed data operation mask register (e.g., $M_{x+2}$, $M_{x+3}$, etc.)). In the illustrated example, mask elements m0 and m1 of the first mask 1266-1 are masked-out whereas mask elements $m_2$ and $m_3$ are unmasked, and mask elements $m_0$ and $m_1$ of the second mask 1266-2 are unmasked whereas mask elements $m_2$ and $m_3$ are masked-out, although this is only one example. These masks and mask elements may optionally be similar to or the same as those previously described including any of the variations and alternatives mentioned therefor. In this example, as shown by the "X", no mask is needed 1253 for the c-type data elements. In other embodiments, instead of using different corresponding masks for the different source packed data operands, a single mask may optionally be reused for each of the different source packed data operands, as previously described.

The indication of the stride 1259, the indication of the one or more sets of strided data element positions 1260, the one or more source packed data operands (e.g., 1242-1, 1242-2, 1242-3), and the one or more source packed data operation masks (e.g., 1266-1, 1266-2, 1266-3) may each be provided to an execution unit 1234. One or more decoded instructions or control signals 1232 decoded by a decode unit 1230 from the instruction 1224 may also be provided to the execution unit. The execution unit may be operative to perform the embodiment of the masked selective interleave data elements with stride operation in response to and/or due to the embodiment of the instruction 1224. The execution unit may store a result operand 1238. In some embodiments, the result operand may represent a partially updated set of strided data (e.g., at least a portion of the AoS 100 of FIG. 1). In some embodiments, the result operand may optionally be stored in memory (e.g., main memory). Alternatively, the result operand may optionally be stored in a plurality of packed data registers.

In some embodiments, the execution unit may be operative to interleave the data elements from the different source packed data operands, with one another and/or with existing data elements in the memory or other storage location used for the result operand, at strided data element positions, subject to the masking or predication provided by the one or more source packed data operation masks (e.g., 1266-1, 1266-2, 1266-3). In some embodiments, data elements from unmasked data element positions of the source operands, which correspond to unmasked mask elements of the corresponding source packed data operation mask, may be stored to the strided data element positions of the result operand. For example, as shown, $b_0^*$ and $b_1^*$, which correspond to unmasked mask elements $m_0$ and $m_1$ of the second mask 1266-2, may be stored to the corresponding strided data element positions of the result operand.

In contrast, in some embodiments, data elements from masked-out data element positions of the source operands, which correspond to masked-out mask elements of the corresponding source packed data operation mask, may not be stored to the strided data element positions of the result operand. For example, as shown, $a_0^*$ and $a_1^*$, which correspond to masked-out mask elements $m_0$ and $m_1$ of the first mask 1266-1, may not be stored to the corresponding strided data element positions of the result operand. Rather, in some embodiments, the bit values of the data elements $a_0$ and $a_1$ initially stored in the memory location or other storage location used for the result operand before the instruction/operation may be retained after the instruction/operation. Likewise, this may also be the case for the c-type data elements for this example, which are not indicated/selected by the indication 1260. Alternatively, zeroing masking, in which the masked-out result data elements are zeroed, may optionally be used.

It is to be appreciated that these are just a few illustrative examples. Other embodiments pertain to full and full masked instruction/operation variants. The masking and selection aspects may be used separately or together.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 13A illustrates an exemplary AVX instruction format including a VEX prefix 1302, real opcode field 1330, Mod R/M byte 1340, SIB byte 1350, displacement field 1362, and IMM8 1372. FIG. 13B illustrates which fields from FIG. 13A make up a full opcode field 1374 and a base operation field 1342. FIG. 13C illustrates which fields from FIG. 13A make up a register index field 1344.

VEX Prefix (Bytes 0-2) 1302 is encoded in a three-byte form. The first byte is the Format Field 1340 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1305 (VEX Byte 1, bits [7-5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1315 (VEX byte 1, bits [4:0]—mmmmm) includes content to encode an implied leading opcode byte. W Field 1364 (VEX byte 2, bit [7]—W)—is represented by the notation VEX.W, and provides different functions depending on the instruction. The role of VEX.vvvv 1320 (VEX Byte 2, bits [6:3]—vvvv) may include the following: 1) VEX.vvvv encodes the first source register operand, specified in inverted (is complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 1368 Size field (VEX byte 2, bit [2]—L)=0, it indicates 128 bit vector; if VEX.L=1, it indicates 256 bit vector. Prefix encoding field 1325 (VEX byte 2, bits [1:0]—pp) provides additional bits for the base operation field.

Real Opcode Field 1330 (Byte 3) is also known as the opcode byte. Part of the opcode is specified in this field.

MOD R/M Field 1340 (Byte 4) includes MOD field 1342 (bits [7-6]), Reg field 1344 (bits [5-3]), and R/M field 1346 (bits [2-0]). The role of Reg field 1344 may include the following: encoding either the destination register operand or a source register operand (the rrr of Rrrr), or be treated as an opcode extension and not used to encode any instruction operand. The role of R/M field 1346 may include the following: encoding the instruction operand that references a memory address, or encoding either the destination register operand or a source register operand.

Scale, Index, Base (SIB)—The content of Scale field 1350 (Byte 5) includes SS1352 (bits [7-6]), which is used for memory address generation. The contents of SIB.xxx 1354 (bits [5-3]) and SIB.bbb 1356 (bits [2-0]) have been previously referred to with regard to the register indexes Xxxx and Bbbb.

The Displacement Field 1362 and the immediate field (IMM8) 1372 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 14A:
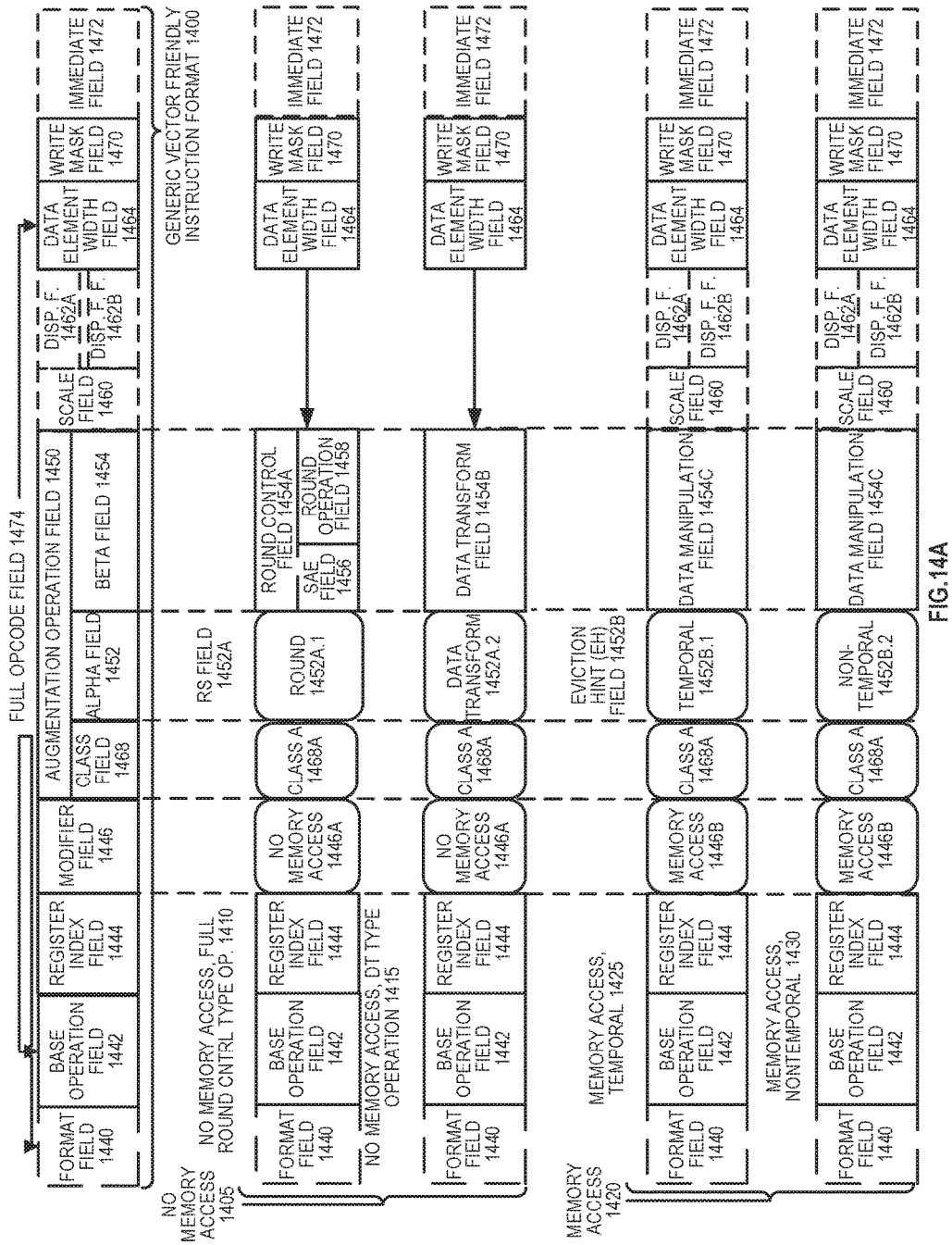
FIG. 14A is a block diagram illustrating an example embodiment of a generic vector friendly instruction format and class A instruction templates thereof.
Figure 14B:
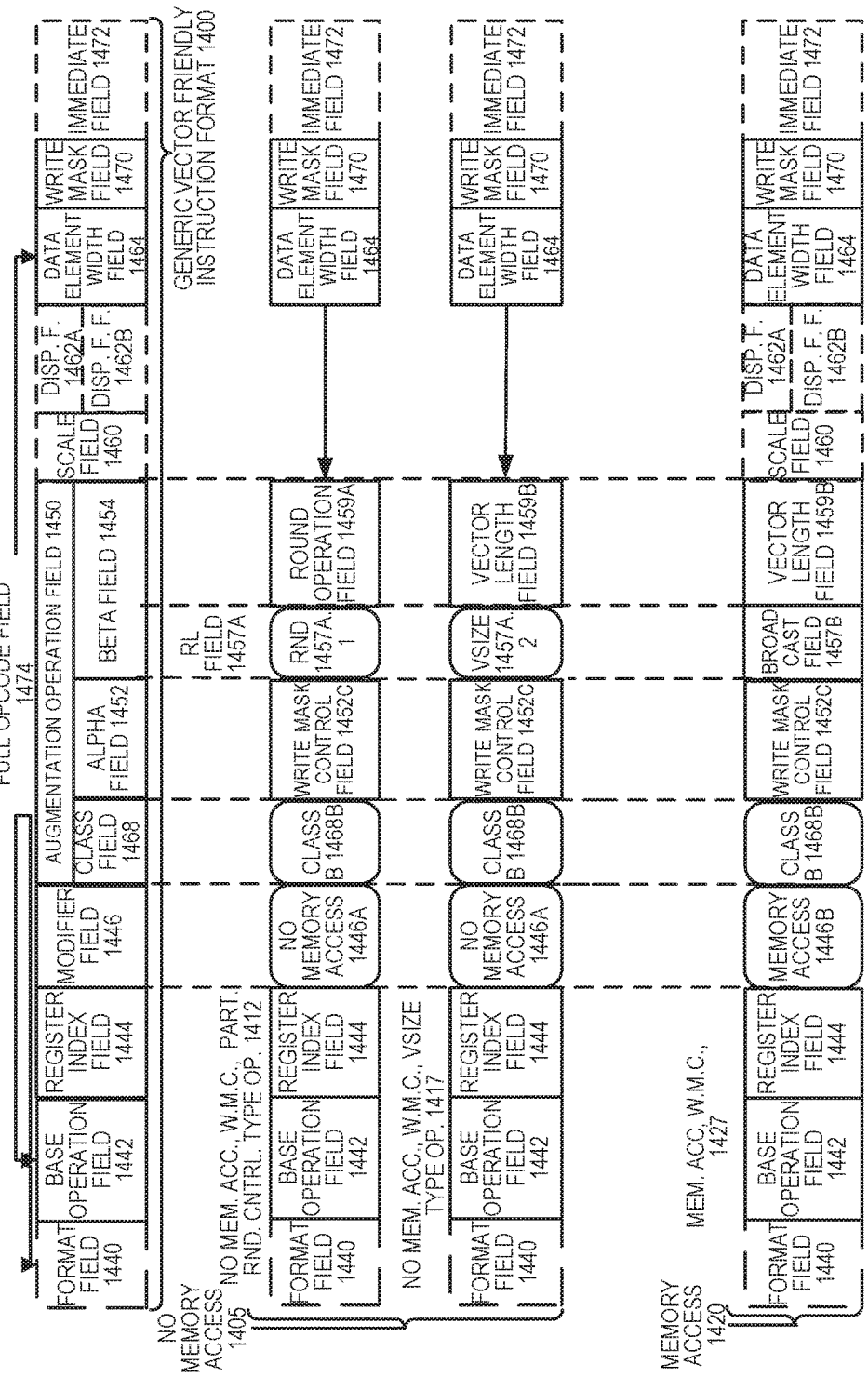
FIG. 14B is a block diagram illustrating the generic vector friendly instruction format and class B instruction templates thereof, according to embodiments of the present disclosure.

FIGS. 14A-14B are block diagrams illustrating a generic vector friendly instruction format and instruction templates thereof according to embodiments of the present disclosure. FIG. 14A is a block diagram illustrating a generic vector friendly instruction format and class A instruction templates thereof according to embodiments of the present disclosure; while FIG. 14B is a block diagram illustrating the generic vector friendly instruction format and class B instruction templates thereof according to embodiments of the present disclosure. Specifically, a generic vector friendly instruction format 1400 for which are defined class A and class B instruction templates, both of which include no memory access 1405 instruction templates and memory access 1420 instruction templates. The term generic in the context of the vector friendly instruction format refers to the instruction format not being tied to any specific instruction set.

While embodiments of the present disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 14A include: 1) within the no memory access 1405 instruction templates there is shown a no memory access, full round control type operation 1410 instruction template and a no memory access, data transform type operation 1415 instruction template; and 2) within the memory access 1420 instruction templates there is shown a memory access, temporal 1425 instruction template and a memory access, non-temporal 1430 instruction template. The class B instruction templates in FIG. 14B include: 1) within the no memory access 1405 instruction templates there is shown a no memory access, write mask control, partial round control type operation 1412 instruction template and a no memory access, write mask control, vsize type operation 1417 instruction template; and 2) within the memory access 1420 instruction templates there is shown a memory access, write mask control 1427 instruction template.

The generic vector friendly instruction format 1400 includes the following fields listed below in the order illustrated in FIGS. 14A-14B.

Format field 1440—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1442—its content distinguishes different base operations.

Register index field 1444—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1446—its content distinguishes occurrences of instructions in the generic vector instruction format that specify memory access from those that do not; that is, between no memory access 1405 instruction templates and memory access 1420 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1450—its content distinguishes which one of a variety of different operations to be performed in addition to the base operation. This field is context specific. In one embodiment of the present disclosure, this field is divided into a class field 1468, an alpha field 1452, and a beta field 1454. The augmentation operation field 1450 allows common groups of operations to be performed in a single instruction rather than 2, 3, or 4 instructions.

Scale field 1460—its content allows for the scaling of the index field's content for memory address generation (e.g., for address generation that uses $2^{scale}$*index+base).

Displacement Field 1462A—its content is used as part of memory address generation (e.g., for address generation that uses $2^{scale}$*index+base+displacement).

Displacement Factor Field 1462B (note that the juxtaposition of displacement field 1462A directly over displacement factor field 1462B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1474 (described later herein) and the data manipulation field 1454C. The displacement field 1462A and the displacement factor field 1462B are optional in the sense that they are not used for the no memory access 1405 instruction templates and/or different embodiments may implement only one or none of the two.

Data element width field 1464—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1470—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1470 allows for partial vector operations, including loads, stores, arithmetic, logical, etc. While embodiments of the present disclosure are described in which the write mask field's 1470 content selects one of a number of write mask registers that contains the write mask to be used (and thus the write mask field's 1470 content indirectly identifies that masking to be performed), alternative embodiments instead or additional allow the mask write field's 1470 content to directly specify the masking to be performed.

Immediate field 1472—its content allows for the specification of an immediate. This field is optional in the sense that is it not present in an implementation of the generic vector friendly format that does not support immediate and it is not present in instructions that do not use an immediate.

Class field 1468—its content distinguishes between different classes of instructions. With reference to FIGS. 14A-B, the contents of this field select between class A and class B instructions. In FIGS. 14A-B, rounded corner squares are used to indicate a specific value is present in a field (e.g., class A 1468A and class B 1468B for the class field 1468 respectively in FIGS. 14A-B).

Instruction Templates of Class A

In the case of the non-memory access 1405 instruction templates of class A, the alpha field 1452 is interpreted as an RS field 1452A, whose content distinguishes which one of the different augmentation operation types are to be performed (e.g., round 1452A.1 and data transform 1452A.2 are respectively specified for the no memory access, round type operation 1410 and the no memory access, data transform type operation 1415 instruction templates), while the beta field 1454 distinguishes which of the operations of the specified type is to be performed. In the no memory access 1405 instruction templates, the scale field 1460, the displacement field 1462A, and the displacement scale filed 1462B are not present.

No-Memory Access Instruction Templates—Full Round Control Type Operation

In the no memory access full round control type operation 1410 instruction template, the beta field 1454 is interpreted as a round control field 1454A, whose content(s) provide static rounding. While in the described embodiments of the present disclosure the round control field 1454A includes a suppress all floating point exceptions (SAE) field 1456 and a round operation control field 1458, alternative embodiments may support may encode both these concepts into the same field or only have one or the other of these concepts/fields (e.g., may have only the round operation control field 1458).

SAE field 1456—its content distinguishes whether or not to disable the exception event reporting; when the SAE field's 1456 content indicates suppression is enabled, a given instruction does not report any kind of floating-point exception flag and does not raise any floating point exception handler.

Round operation control field 1458—its content distinguishes which one of a group of rounding operations to perform (e.g., Round-up, Round-down, Round-towards-zero and Round-to-nearest). Thus, the round operation control field 1458 allows for the changing of the rounding mode on a per instruction basis. In one embodiment of the present disclosure where a processor includes a control register for specifying rounding modes, the round operation control field's 1450 content overrides that register value.

No Memory Access Instruction Templates—Data Transform Type Operation

In the no memory access data transform type operation 1415 instruction template, the beta field 1454 is interpreted as a data transform field 1454B, whose content distinguishes which one of a number of data transforms is to be performed (e.g., no data transform, swizzle, broadcast).

In the case of a memory access 1420 instruction template of class A, the alpha field 1452 is interpreted as an eviction hint field 1452B, whose content distinguishes which one of the eviction hints is to be used (in FIG. 14A, temporal 1452B.1 and non-temporal 1452B.2 are respectively specified for the memory access, temporal 1425 instruction template and the memory access, non-temporal 1430 instruction template), while the beta field 1454 is interpreted as a data manipulation field 1454C, whose content distinguishes which one of a number of data manipulation operations (also known as primitives) is to be performed (e.g., no manipulation; broadcast; up conversion of a source; and down conversion of a destination). The memory access 1420 instruction templates include the scale field 1460, and optionally the displacement field 1462A or the displacement scale field 1462B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1452 is interpreted as a write mask control (Z) field 1452C, whose content distinguishes whether the write masking controlled by the write mask field 1470 should be a merging or a zeroing.

In the case of the non-memory access 1405 instruction templates of class B, part of the beta field 1454 is interpreted as an RL field 1457A, whose content distinguishes which one of the different augmentation operation types are to be performed (e.g., round 1457A.1 and vector length (VSIZE) 1457A.2 are respectively specified for the no memory access, write mask control, partial round control type operation 1412 instruction template and the no memory access, write mask control, VSIZE type operation 1417 instruction template), while the rest of the beta field 1454 distinguishes which of the operations of the specified type is to be performed. In the no memory access 1405 instruction templates, the scale field 1460, the displacement field 1462A, and the displacement scale filed 1462B are not present.

In the no memory access, write mask control, partial round control type operation 1410 instruction template, the rest of the beta field 1454 is interpreted as a round operation field 1459A and exception event reporting is disabled (a given instruction does not report any kind of floating-point exception flag and does not raise any floating point exception handler).

Round operation control field 1459A—just as round operation control field 1458, its content distinguishes which one of a group of rounding operations to perform (e.g., Round-up, Round-down, Round-towards-zero and Round-to-nearest). Thus, the round operation control field 1459A allows for the changing of the rounding mode on a per instruction basis. In one embodiment of the present disclosure where a processor includes a control register for specifying rounding modes, the round operation control field's 1450 content overrides that register value.

In the no memory access, write mask control, VSIZE type operation 1417 instruction template, the rest of the beta field 1454 is interpreted as a vector length field 1459B, whose content distinguishes which one of a number of data vector lengths is to be performed on (e.g., 128, 256, or 512 byte).

In the case of a memory access 1420 instruction template of class B, part of the beta field 1454 is interpreted as a broadcast field 1457B, whose content distinguishes whether or not the broadcast type data manipulation operation is to be performed, while the rest of the beta field 1454 is interpreted the vector length field 1459B. The memory access 1420 instruction templates include the scale field 1460, and optionally the displacement field 1462A or the displacement scale field 1462B.

With regard to the generic vector friendly instruction format 1400, a full opcode field 1474 is shown including the format field 1440, the base operation field 1442, and the data element width field 1464. While one embodiment is shown where the full opcode field 1474 includes all of these fields, the full opcode field 1474 includes less than all of these fields in embodiments that do not support all of them. The full opcode field 1474 provides the operation code (opcode).

The augmentation operation field 1450, the data element width field 1464, and the write mask field 1470 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the present disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the present disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the present disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 15A is a block diagram illustrating an exemplary specific vector friendly instruction format according to embodiments of the present disclosure. FIG. 15A shows a specific vector friendly instruction format 1500 that is specific in the sense that it specifies the location, size, interpretation, and order of the fields, as well as values for some of those fields. The specific vector friendly instruction format 1500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 14 into which the fields from FIG. 15A map are illustrated.

It should be understood that, although embodiments of the present disclosure are described with reference to the specific vector friendly instruction format 1500 in the context of the generic vector friendly instruction format 1400 for illustrative purposes, the present disclosure is not limited to the specific vector friendly instruction format 1500 except where claimed. For example, the generic vector friendly instruction format 1400 contemplates a variety of possible sizes for the various fields, while the specific vector friendly instruction format 1500 is shown as having fields of specific sizes. By way of specific example, while the data element width field 1464 is illustrated as a one bit field in the specific vector friendly instruction format 1500, the present disclosure is not so limited (that is, the generic vector friendly instruction format 1400 contemplates other sizes of the data element width field 1464).

The generic vector friendly instruction format 1400 includes the following fields listed below in the order illustrated in FIG. 15A.

EVEX Prefix (Bytes 0-3) 1502—is encoded in a four-byte form.

Format Field 1440 (EVEX Byte 0, bits [7:0])—the first byte (EVEX Byte 0) is the format field 1440 and it contains 0x62 (the unique value used for distinguishing the vector friendly instruction format in one embodiment of the present disclosure).

The second-fourth bytes (EVEX Bytes 1-3) include a number of bit fields providing specific capability.

REX field 1505 (EVEX Byte 1, bits [7-5])—consists of a EVEX.R bit field (EVEX Byte 1, bit [7]—R), EVEX.X bit field (EVEX byte 1, bit [6]—X), and 1457BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1410—this is the first part of the REX' field 1410 and is the EVEX.R' bit field (EVEX Byte 1, bit [4]—R') that is used to encode either the upper 16 or lower 16 of the extended 32 register set. In one embodiment of the present disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the present disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1515 (EVEX byte 1, bits [3:0]—mmmm)—its content encodes an implied leading opcode byte (0F, 0F 38, or 0F 3).

Data element width field 1464 (EVEX byte 2, bit [7]—W)—is represented by the notation EVEX.W. EVEX.W is used to define the granularity (size) of the datatype (either 32-bit data elements or 64-bit data elements).

EVEX.vvvv 1520 (EVEX Byte 2, bits [6:3]—vvvv)—the role of EVEX.vvvv may include the following: 1) EVEX.vvvv encodes the first source register operand, specified in inverted (Is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1520 encodes the 4 low-order bits of the first source register specifier stored in inverted (is complement) form. Depending on the instruction, an extra different EVEX bit field is used to extend the specifier size to 32 registers.

EVEX.U 1468 Class field (EVEX byte 2, bit [2]—U)—If EVEX.U=0, it indicates class A or EVEX.U0; if EVEX.U=1, it indicates class B or EVEX.U1.

Prefix encoding field 1525 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1452 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1454 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1410—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1470 (EVEX byte 3, bits [2:0]—kkk)—its content specifies the index of a register in the write mask registers as previously described. In one embodiment of the present disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1530 (Byte 4) is also known as the opcode byte. Part of the opcode is specified in this field.

MOD R/M Field 1540 (Byte 5) includes MOD field 1542, Reg field 1544, and R/M field 1546. As previously described, the MOD field's 1542 content distinguishes between memory access and non-memory access operations. The role of Reg field 1544 can be summarized to two situations: encoding either the destination register operand or a source register operand, or be treated as an opcode extension and not used to encode any instruction operand. The role of R/M field 1546 may include the following: encoding the instruction operand that references a memory address, or encoding either the destination register operand or a source register operand.

Scale, Index, Base (SIB) Byte (Byte 6)—As previously described, the scale field's 1450 content is used for memory address generation. SIB.xxx 1554 and SIB.bbb 1556—the contents of these fields have been previously referred to with regard to the register indexes Xxxx and Bbbb.

Displacement field 1462A (Bytes 7-10)—when MOD field 1542 contains 10, bytes 7-10 are the displacement field 1462A, and it works the same as the legacy 32-bit displacement (disp32) and works at byte granularity.

Displacement factor field 1462B (Byte 7)—when MOD field 1542 contains 01, byte 7 is the displacement factor field 1462B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1462B is a reinterpretation of disp8; when using displacement factor field 1462B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1462B substitutes the legacy x86 instruction set 8-bit displacement. Thus, the displacement factor field 1462B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1472 operates as previously described.

Full Opcode Field

FIG. 15B is a block diagram illustrating the fields of the specific vector friendly instruction format 1500 that make up the full opcode field 1474 according to one embodiment of the present disclosure. Specifically, the full opcode field 1474 includes the format field 1440, the base operation field 1442, and the data element width (W) field 1464. The base operation field 1442 includes the prefix encoding field 1525, the opcode map field 1515, and the real opcode field 1530.

Register Index Field

FIG. 15C is a block diagram illustrating the fields of the specific vector friendly instruction format 1500 that make up the register index field 1444 according to one embodiment of the present disclosure. Specifically, the register index field 1444 includes the REX field 1505, the REX' field 1510, the MODR/M.reg field 1544, the MODR/M.r/m field 1546, the VVVV field 1520, xxx field 1554, and the bbb field 1556.

Augmentation Operation Field

Figure 15D:
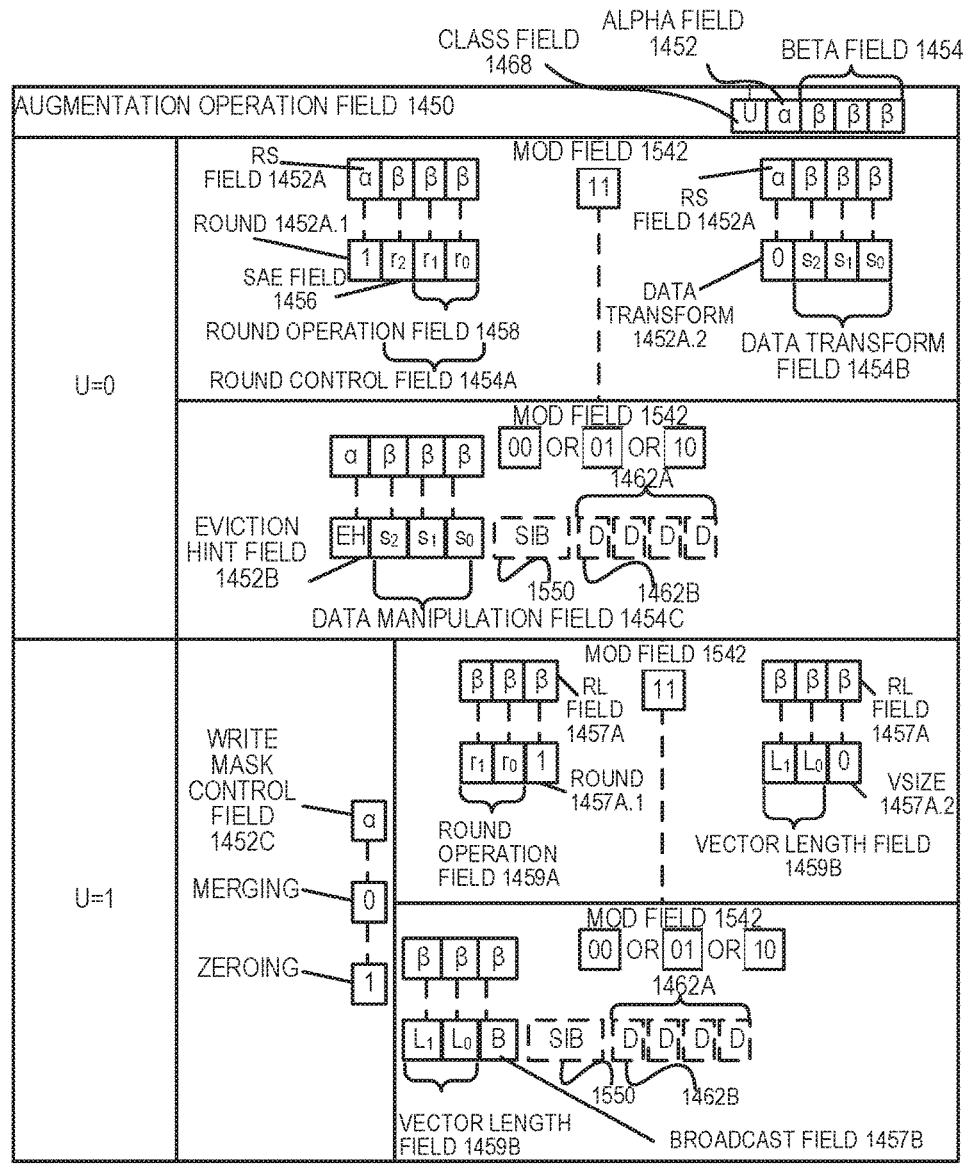
FIG. 15D is a block diagram illustrating the fields of the specific vector friendly instruction format that make up the augmentation operation field, according to one embodiment of the present disclosure.

FIG. 15D is a block diagram illustrating the fields of the specific vector friendly instruction format 1500 that make up the augmentation operation field 1450 according to one embodiment of the present disclosure. When the class (U) field 1468 contains 0, it signifies EVEX.U0 (class A 1468A); when it contains 1, it signifies EVEX.U1 (class B 1468B). When U=0 and the MOD field 1542 contains 11 (signifying a no memory access operation), the alpha field 1452 (EVEX byte 3, bit [7]—EH) is interpreted as the rs field 1452A. When the rs field 1452A contains a 1 (round 1452A.1), the beta field 1454 (EVEX byte 3, bits [6:4]—SSS) is interpreted as the round control field 1454A. The round control field 1454A includes a one bit SAE field 1456 and a two bit round operation field 1458. When the rs field 1452A contains a 0 (data transform 1452A.2), the beta field 1454 (EVEX byte 3, bits [6:4]—SSS) is interpreted as a three bit data transform field 1454B. When U=0 and the MOD field 1542 contains 00, 01, or 10 (signifying a memory access operation), the alpha field 1452 (EVEX byte 3, bit [7]—EH) is interpreted as the eviction hint (EH) field 1452B and the beta field 1454 (EVEX byte 3, bits [6:4]—SSS) is interpreted as a three bit data manipulation field 1454C.

When U=1, the alpha field 1452 (EVEX byte 3, bit [7]—EH) is interpreted as the write mask control (Z) field 1452C. When U=1 and the MOD field 1542 contains 11 (signifying a no memory access operation), part of the beta field 1454 (EVEX byte 3, bit [4]—$S_0$) is interpreted as the RL field 1457A; when it contains a 1 (round 1457A.1) the rest of the beta field 1454 (EVEX byte 3, bit [6-5]—$S_{2-1}$) is interpreted as the round operation field 1459A, while when the RL field 1457A contains a 0 (VSIZE 1457.A2) the rest of the beta field 1454 (EVEX byte 3, bit [6-5]—$S_{2-1}$) is interpreted as the vector length field 1459B (EVEX byte 3, bit [6-5]—$L_{1-0}$). When U=1 and the MOD field 1542 contains 00, 01, or 10 (signifying a memory access operation), the beta field 1454 (EVEX byte 3, bits [6:4]—SSS) is interpreted as the vector length field 1459B (EVEX byte 3, bit [6-5]—$L_{1-0}$) and the broadcast field 1457B (EVEX byte 3, bit [4]—B).

Exemplary Register Architecture

Figure 16:
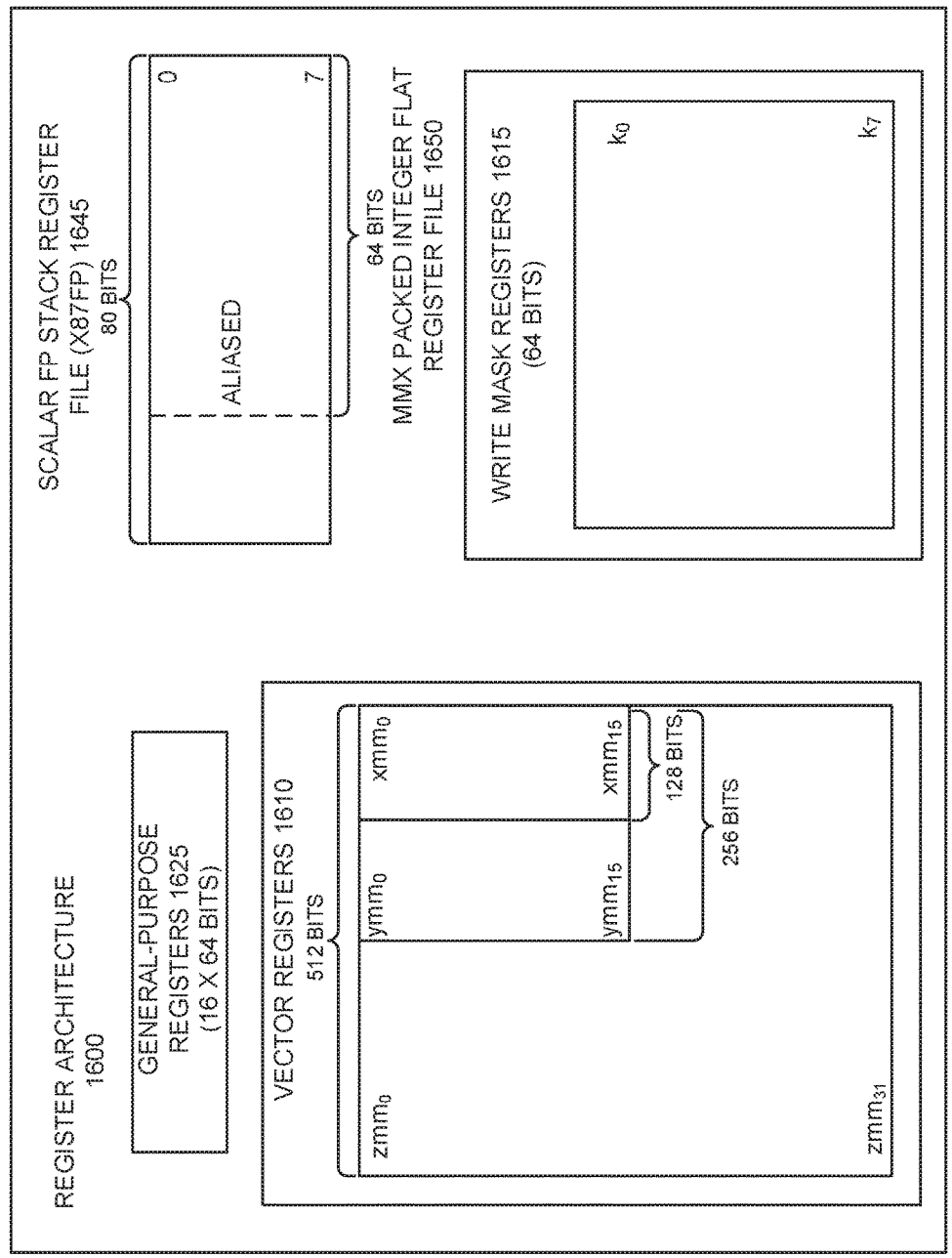
FIG. 16 is a block diagram of a register architecture, in an embodiment of the present disclosure.

FIG. 16 is a block diagram of a register architecture 1600 according to one embodiment of the present disclosure. In the embodiment illustrated, there are 32 vector registers 1610 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1500 operates on these overlaid register file as illustrated in the below tables.

| Adjustable Vector Length | Class | Operations | Registers |
|---|---|---|---|
| Instruction Templates that do not include the vector length field 1459B | A (FIG. 14A; U = 0) | 1410, 1415, 1425, 1430 | zmm registers (the vector length is 64 byte) |
| | B (FIG. 14B; U = 1) | 1412 | zmm registers (the vector length is 64 byte) |
| Instruction templates that do include the vector length field 1459B | B (FIG. 14B; U = 1) | 1417, 1427 | zmm, ymm, or xmm registers (the vector length is 64 byte, 32 byte, or 16 byte) depending on the vector length field 1459B |

In other words, the vector length field 1459B selects between a maximum length and one or more other shorter lengths, where each such shorter length is half the length of the preceding length; and instructions templates without the vector length field 1459B operate on the maximum vector length. Further, in one embodiment, the class B instruction templates of the specific vector friendly instruction format 1500 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1615—in the embodiment illustrated, there are 8 write mask registers (k0 through k7), each 64 bits in size. In an alternate embodiment, the write mask registers 1615 are 16 bits in size. As previously described, in one embodiment of the present disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1645, on which is aliased the MMX packed integer flat register file 1650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the present disclosure may use wider or narrower registers. Additionally, alternative embodiments of the present disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 17A is a block diagram illustrating both an exemplary in-order pipeline and an exemplary register renaming, out-of-order issue/execution pipeline according to embodiments of the present disclosure. FIG. 17B is a block diagram illustrating both an exemplary embodiment of an in-order architecture core and an exemplary register renaming, out-of-order issue/execution architecture core to be included in a processor according to embodiments of the present disclosure. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end unit 1730 coupled to an execution engine unit 1750, and both are coupled to a memory unit 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end unit 1730 includes a branch prediction unit 1732 coupled to an instruction cache unit 1734, which is coupled to an instruction translation lookaside buffer (TLB) 1736, which is coupled to an instruction fetch unit 1738, which is coupled to a decode unit 1740. The decode unit 1740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode unit 1740 or otherwise within the front end unit 1730). The decode unit 1740 is coupled to a rename/allocator unit 1752 in the execution engine unit 1750.

The execution engine unit 1750 includes the rename/allocator unit 1752 coupled to a retirement unit 1754 and a set of one or more scheduler unit(s) 1756. The scheduler unit(s) 1756 represents any number of different schedulers, including reservations stations, central instruction window, etc. The scheduler unit(s) 1756 is coupled to the physical register file(s) unit(s) 1758. Each of the physical register file(s) units 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1758 comprises a vector registers unit, a write mask registers unit, and a scalar registers unit. These register units may provide architectural vector registers, vector mask registers, and general purpose registers. The physical register file(s) unit(s) 1758 is overlapped by the retirement unit 1754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1754 and the physical register file(s) unit(s) 1758 are coupled to the execution cluster(s) 1760. The execution cluster(s) 1760 includes a set of one or more execution units 1762 and a set of one or more memory access units 1764. The execution units 1762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1756, physical register file(s) unit(s) 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1764). It should also be understood that where separate pipelines are used, one or more of these pipelines may be out-of-order issue/execution and the rest in-order.

The set of memory access units 1764 is coupled to the memory unit 1770, which includes a data TLB unit 1772 coupled to a data cache unit 1774 coupled to a level 2 (L2) cache unit 1776. In one exemplary embodiment, the memory access units 1764 may include a load unit, a store address unit, and a store data unit, each of which is coupled to the data TLB unit 1772 in the memory unit 1770. The instruction cache unit 1734 is further coupled to a level 2 (L2) cache unit 1776 in the memory unit 1770. The L2 cache unit 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode unit 1740 performs the decode stage 1706; 3) the rename/allocator unit 1752 performs the allocation stage 1708 and renaming stage 1710; 4) the scheduler unit(s) 1756 performs the schedule stage 1712; 5) the physical register file(s) unit(s) 1758 and the memory unit 1770 perform the register read/memory read stage 1714; the execution cluster 1760 perform the execute stage 1716; 6) the memory unit 1770 and the physical register file(s) unit(s) 1758 perform the write back/memory write stage 1718; 7) various units may be involved in the exception handling stage 1722; and 8) the retirement unit 1754 and the physical register file(s) unit(s) 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1734/1774 and a shared L2 cache unit 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 18B:
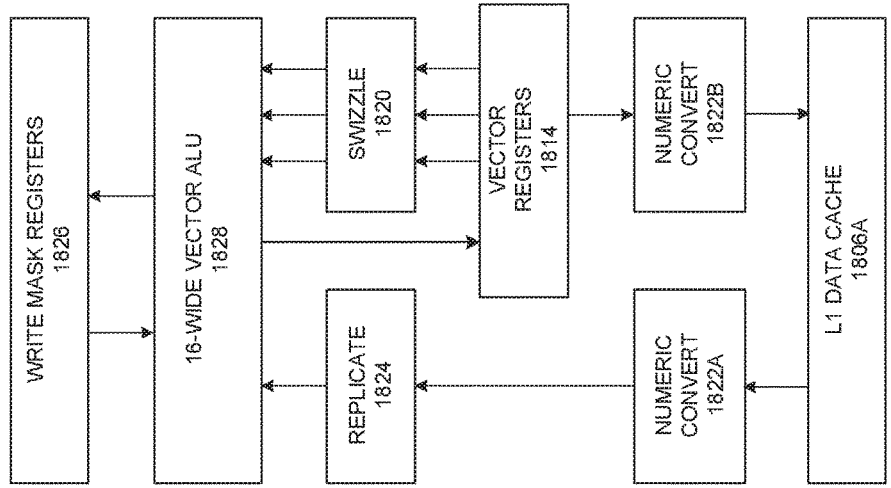
FIG. 18B is an expanded view of part of the processor core in FIG. 18A according to embodiments of the present disclosure.
Figure 18A:
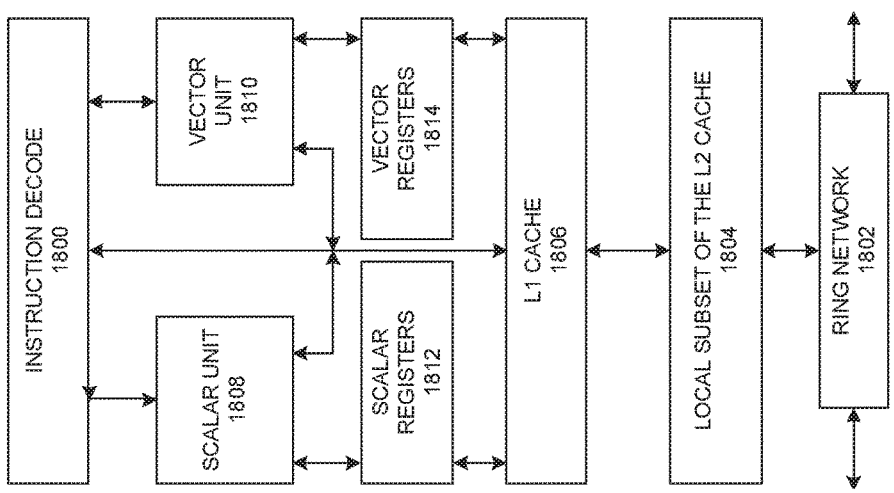
FIG. 18A is a block diagram of a single processor core, along with its connection to the on-die interconnect network, and with its local subset of the Level 2 (L2) cache, according to embodiments of the present disclosure.

FIGS. 18A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 18A is a block diagram of a single processor core, along with its connection to the on-die interconnect network 1802 and with its local subset of the Level 2 (L2) cache 1804, according to embodiments of the present disclosure. In one embodiment, an instruction decoder 1800 supports the x86 instruction set with a packed data instruction set extension. An L1 cache 1806 allows low-latency accesses to cache memory into the scalar and vector units. While in one embodiment (to simplify the design), a scalar unit 1808 and a vector unit 1810 use separate register sets (respectively, scalar registers 1812 and vector registers 1814) and data transferred between them is written to memory and then read back in from a level 1 (L1) cache 1806, alternative embodiments of the present disclosure may use a different approach (e.g., use a single register set or include a communication path that allow data to be transferred between the two register files without being written and read back).

The local subset of the L2 cache 1804 is part of a global L2 cache that is divided into separate local subsets, one per processor core. Each processor core has a direct access path to its own local subset of the L2 cache 1804. Data read by a processor core is stored in its L2 cache subset 1804 and can be accessed quickly, in parallel with other processor cores accessing their own local L2 cache subsets. Data written by a processor core is stored in its own L2 cache subset 1804 and is flushed from other subsets, if necessary. The ring network ensures coherency for shared data. The ring network is b₁-directional to allow agents such as processor cores, L2 caches and other logic blocks to communicate with each other within the chip. Each ring data-path is 1012-bits wide per direction.

FIG. 18B is an expanded view of part of the processor core in FIG. 18A according to embodiments of the present disclosure. FIG. 18B includes an L1 data cache 1806A part of the L1 cache 1804, as well as more detail regarding the vector unit 1810 and the vector registers 1814. Specifically, the vector unit 1810 is a 16-wide vector processing unit (VPU) (see the 16-wide ALU 1828), which executes one or more of integer, single-precision float, and double-precision float instructions. The VPU supports swizzling the register inputs with swizzle unit 1820, numeric conversion with numeric convert units 1822A-B, and replication with replication unit 1824 on the memory input. Write mask registers 1826 allow predicating resulting vector writes.

Processor with Integrated Memory Controller and Graphics

Figure 19:
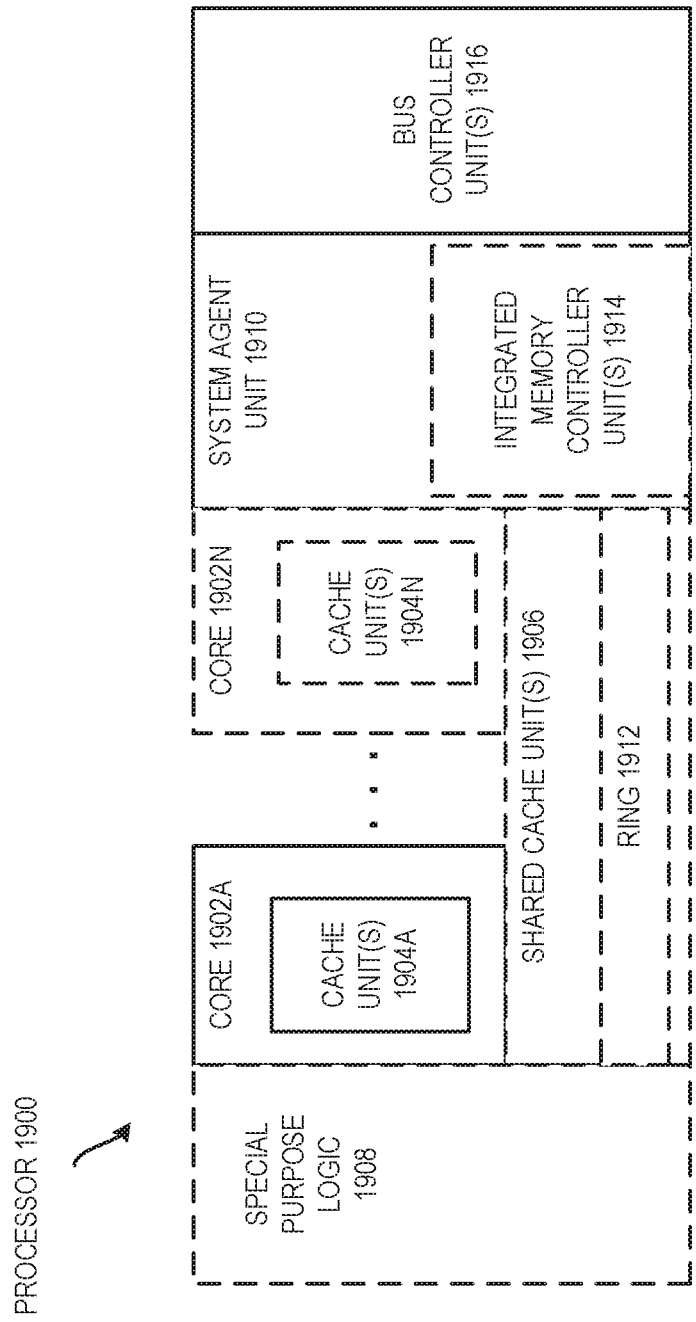
FIG. 19 is a block diagram of a processor that may have more than one core, an integrated memory controller, and integrated graphics, according to embodiments of the present disclosure.

FIG. 19 is a block diagram of a processor 1900 that may have more than one core, may have an integrated memory controller, and may have integrated graphics according to embodiments of the present disclosure. The solid lined boxes in FIG. 19 illustrate a processor 1900 with a single core 1902A, a system agent 1910, a set of one or more bus controller units 1916, while the optional addition of the dashed lined boxes illustrates an alternative processor 1900 with multiple cores 1902A-N, a set of one or more integrated memory controller unit(s) 1914 in the system agent unit 1910, and special purpose logic 1908.

Thus, different implementations of the processor 1900 may include: 1) a CPU with the special purpose logic 1908 being integrated graphics and/or scientific (throughput) logic (which may include one or more cores), and the cores 1902A-N being one or more general purpose cores (e.g., general purpose in-order cores, general purpose out-of-order cores, a combination of the two); 2) a coprocessor with the cores 1902A-N being a large number of special purpose cores intended primarily for graphics and/or scientific (throughput); and 3) a coprocessor with the cores 1902A-N being a large number of general purpose in-order cores. Thus, the processor 1900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1906, and external memory (not shown) coupled to the set of integrated memory controller units 1914. The set of shared cache units 1906 may include one or more mid-level caches, such as level 2 (L2), level 3 (L3), level 4 (L4), or other levels of cache, a last level cache (LLC), and/or combinations thereof. While in one embodiment a ring based interconnect unit 1912 interconnects the integrated graphics logic 1908, the set of shared cache units 1906, and the system agent unit 1910/integrated memory controller unit(s) 1914, alternative embodiments may use any number of well-known techniques for interconnecting such units. In one embodiment, coherency is maintained between one or more cache units 1906 and cores 1902-A-N.

In some embodiments, one or more of the cores 1902A-N are capable of multi-threading. The system agent 1910 includes those components coordinating and operating cores 1902A-N. The system agent unit 1910 may include for example a power control unit (PCU) and a display unit. The PCU may be or include logic and components needed for regulating the power state of the cores 1902A-N and the integrated graphics logic 1908. The display unit is for driving one or more externally connected displays.

The cores 1902A-N may be homogenous or heterogeneous in terms of architecture instruction set; that is, two or more of the cores 1902A-N may be capable of execution the same instruction set, while others may be capable of executing only a subset of that instruction set or a different instruction set.

Exemplary Computer Architectures

FIGS. 20-23 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 20:
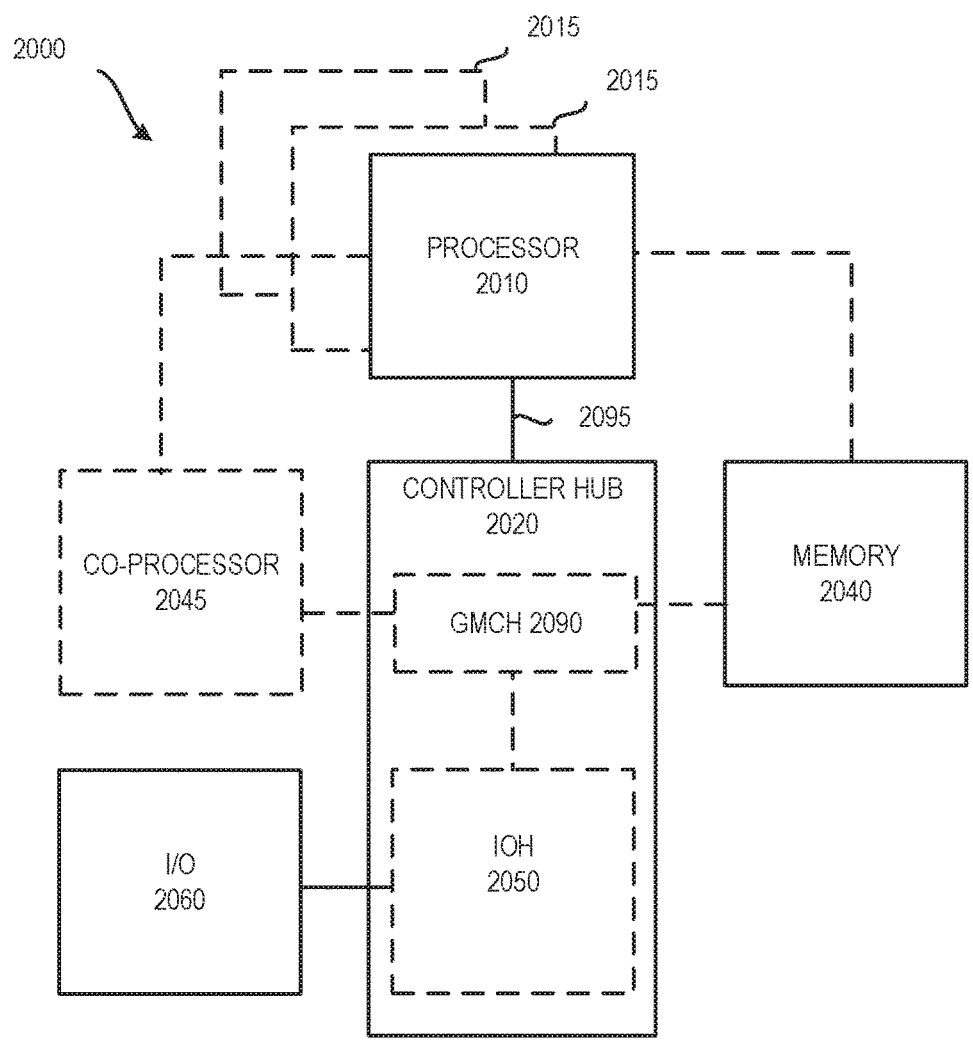
FIG. 20 is a block diagram of an example embodiment of a system.

Referring now to FIG. 20, shown is a block diagram of a system 2000 in accordance with one embodiment of the present disclosure. The system 2000 may include one or more processors 2010, 2015, which are coupled to a controller hub 2020. In one embodiment the controller hub 2020 includes a graphics memory controller hub (GMCH) 2090 and an Input/Output Hub (IOH) 2050 (which may be on separate chips); the GMCH 2090 includes memory and graphics controllers to which are coupled memory 2040 and a coprocessor 2045; the IOH 2050 is couples input/output (I/O) devices 2060 to the GMCH 2090. Alternatively, one or both of the memory and graphics controllers are integrated within the processor (as described herein), the memory 2040 and the coprocessor 2045 are coupled directly to the processor 2010, and the controller hub 2020 in a single chip with the IOH 2050.

The optional nature of additional processors 2015 is denoted in FIG. 20 with broken lines. Each processor 2010, 2015 may include one or more of the processing cores described herein and may be some version of the processor 1900.

The memory 2040 may be, for example, dynamic random access memory (DRAM), phase change memory (PCM), or a combination of the two. For at least one embodiment, the controller hub 2020 communicates with the processor(s) 2010, 2015 via a multi-drop bus, such as a frontside bus (FSB), point-to-point interface such as QuickPath Interconnect (QPI), or similar connection 2095.

In one embodiment, the coprocessor 2045 is a special-purpose processor, such as, for example, a high-throughput MIC processor, a network or communication processor, compression engine, graphics processor, GPGPU, embedded processor, or the like. In one embodiment, controller hub 2020 may include an integrated graphics accelerator.

There can be a variety of differences between the physical resources 2010, 2015 in terms of a spectrum of metrics of merit including architectural, microarchitectural, thermal, power consumption characteristics, and the like.

In one embodiment, the processor 2010 executes instructions that control data processing operations of a general type. Embedded within the instructions may be coprocessor instructions. The processor 2010 recognizes these coprocessor instructions as being of a type that should be executed by the attached coprocessor 2045. Accordingly, the processor 2010 issues these coprocessor instructions (or control signals representing coprocessor instructions) on a coprocessor bus or other interconnect, to coprocessor 2045. Coprocessor(s) 2045 accept and execute the received coprocessor instructions.

Figure 21:
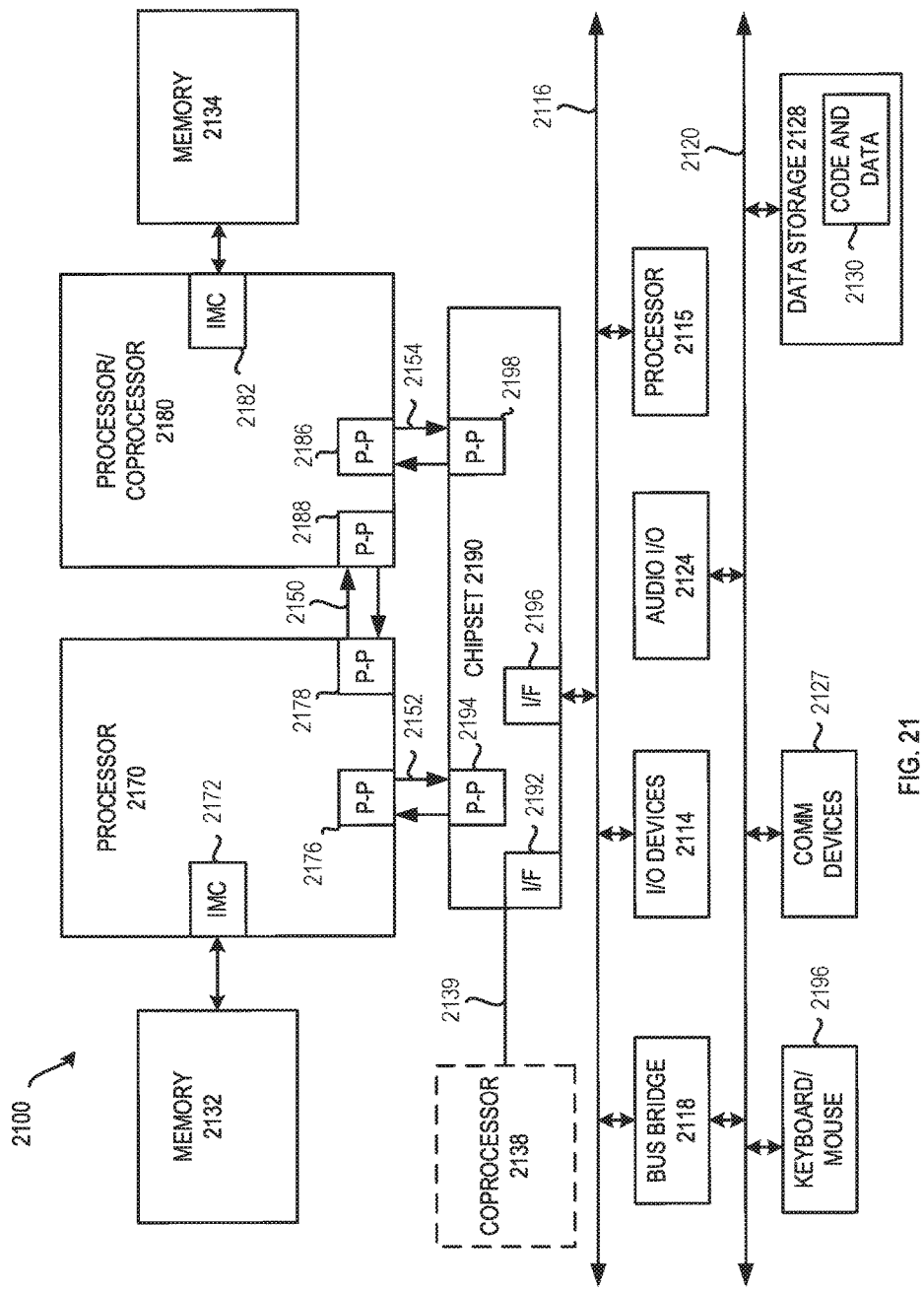
FIG. 21 is a block diagram of a first more specific example embodiment of a system.

Referring now to FIG. 21, shown is a block diagram of a first more specific exemplary system 2100 in accordance with an embodiment of the present disclosure. As shown in FIG. 21, multiprocessor system 2100 is a point-to-point interconnect system, and includes a first processor 2170 and a second processor 2180 coupled via a point-to-point interconnect 2150. Each of processors 2170 and 2180 may be some version of the processor 1900. In one embodiment of the present disclosure, processors 2170 and 2180 are respectively processors 2010 and 2015, while coprocessor 2138 is coprocessor 2045. In another embodiment, processors 2170 and 2180 are respectively processor 2010 coprocessor 2045.

Processors 2170 and 2180 are shown including integrated memory controller (IMC) units 2172 and 2182, respectively. Processor 2170 also includes as part of its bus controller units point-to-point (P-P) interfaces 2176 and 2178; similarly, second processor 2180 includes P-P interfaces 2186 and 2188. Processors 2170, 2180 may exchange information via a point-to-point (P-P) interface 2150 using P-P interface circuits 2178, 2188. As shown in FIG. 21, IMCs 2172 and 2182 couple the processors to respective memories, namely a memory 2132 and a memory 2134, which may be portions of main memory locally attached to the respective processors.

Processors 2170, 2180 may each exchange information with a chipset 2190 via individual P-P interfaces 2152, 2154 using point to point interface circuits 2176, 2194, 2186, 2198. Chipset 2190 may optionally exchange information with the coprocessor 2138 via a high-performance interface 2139. In one embodiment, the coprocessor 2138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2190 may be coupled to a first bus 2116 via an interface 2196. In one embodiment, first bus 2116 may be a Peripheral Component Interconnect (PCI) bus, or a bus such as a PCI Express bus or another third generation I/O interconnect bus, although the scope of the present disclosure is not so limited.

As shown in FIG. 21, various I/O devices 2114 may be coupled to first bus 2116, along with a bus bridge 2118 which couples first bus 2116 to a second bus 2120. In one embodiment, one or more additional processor(s) 2115, such as coprocessors, high-throughput MIC processors, GPGPU's, accelerators (such as, e.g., graphics accelerators or digital signal processing (DSP) units), field programmable gate arrays, or any other processor, are coupled to first bus 2116. In one embodiment, second bus 2120 may be a low pin count (LPC) bus. Various devices may be coupled to a second bus 2120 including, for example, a keyboard and/or mouse 2122, communication devices 2127 and a storage unit 2128 such as a disk drive or other mass storage device which may include instructions/code and data 2130, in one embodiment. Further, an audio I/O 2124 may be coupled to the second bus 2120. Note that other architectures are possible. For example, instead of the point-to-point architecture of FIG. 21, a system may implement a multi-drop bus or other such architecture.

Figure 22:
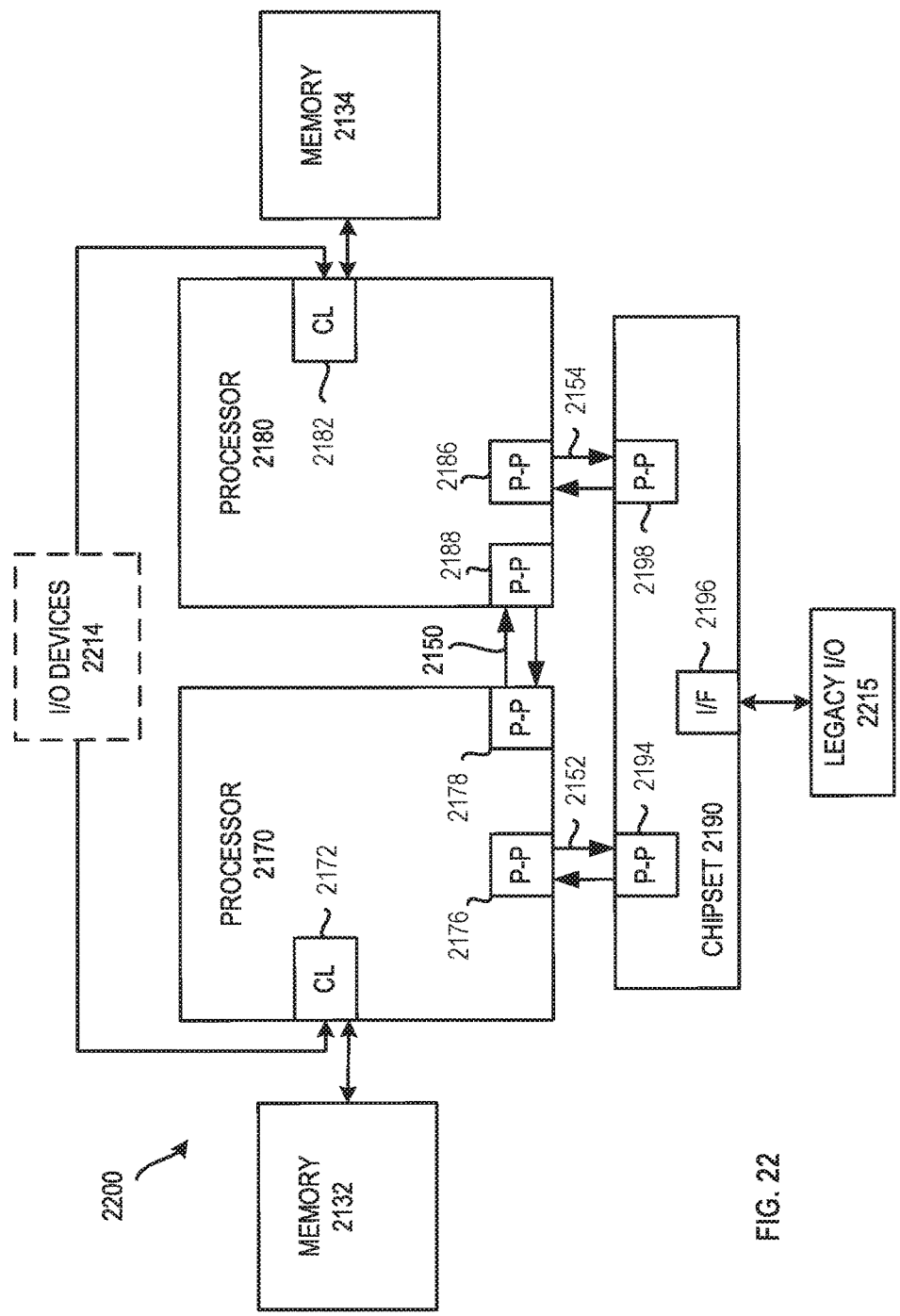
FIG. 22 is a block diagram of a second more specific example embodiment of a system.

Referring now to FIG. 22, shown is a block diagram of a second more specific exemplary system 2200 in accordance with an embodiment of the present disclosure. Like elements in FIGS. 21 and 22 bear like reference numerals, and certain aspects of FIG. 21 have been omitted from FIG. 22 in order to avoid obscuring other aspects of FIG. 22.

FIG. 22 illustrates that the processors 2170, 2180 may include integrated memory and I/O control logic ("CL") 2172 and 2182, respectively. Thus, the CL 2172, 2182 include integrated memory controller units and include I/O control logic. FIG. 22 illustrates that not only are the memories 2132, 2134 coupled to the CL 2172, 2182, but also that I/O devices 2214 are also coupled to the control logic 2172, 2182. Legacy I/O devices 2215 are coupled to the chipset 2190.

Figure 23:
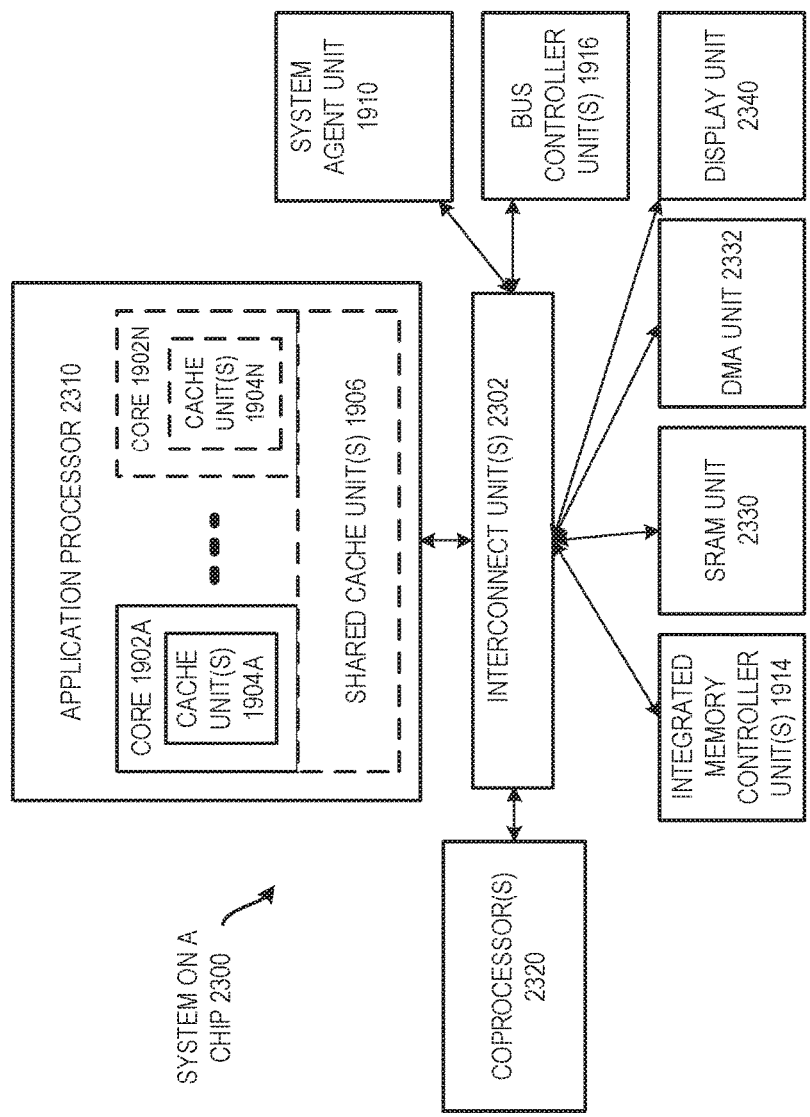
FIG. 23 is a block diagram of an example embodiment of a system-on-chip.

Referring now to FIG. 23, shown is a block diagram of a SoC 2300 in accordance with an embodiment of the present disclosure. Similar elements in FIG. 19 bear like reference numerals. Also, dashed lined boxes are optional features on more advanced SoCs. In FIG. 23, an interconnect unit(s) 2302 is coupled to: an application processor 2310 which includes a set of one or more cores 202A-N and shared cache unit(s) 1906; a system agent unit 1910; a bus controller unit(s) 1916; an integrated memory controller unit(s) 1914; a set or one or more coprocessors 2320 which may include integrated graphics logic, an image processor, an audio processor, and a video processor; an static random access memory (SRAM) unit 2330; a direct memory access (DMA) unit 2332; and a display unit 2340 for coupling to one or more external displays. In one embodiment, the coprocessor(s) 2320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the present disclosure may be implemented as computer programs or program code executing on programmable systems comprising at least one processor, a storage system (including volatile and non-volatile memory and/or storage elements), at least one input device, and at least one output device.

Program code, such as code 2130 illustrated in FIG. 21, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 24:
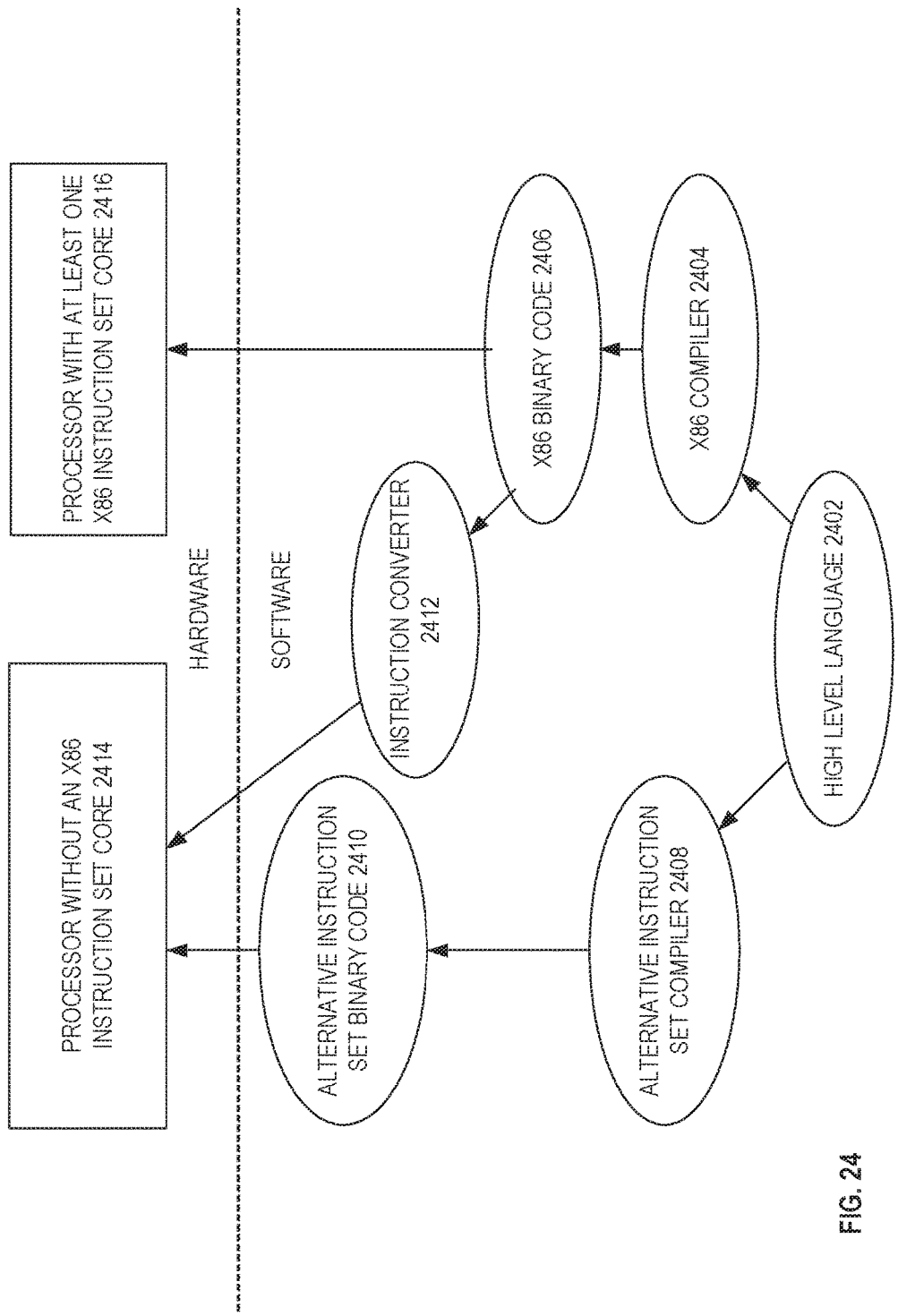
FIG. 24 is a block diagram contrasting the use of a software instruction converter to convert binary instructions in a source instruction set to binary instructions in a target instruction set, according to embodiments of the present disclosure.

FIG. 24 is a block diagram contrasting the use of a software instruction converter to convert binary instructions in a source instruction set to binary instructions in a target instruction set according to embodiments of the present disclosure. In the illustrated embodiment, the instruction converter is a software instruction converter, although alternatively the instruction converter may be implemented in software, firmware, hardware, or various combinations thereof. FIG. 24 shows a program in a high level language 2402 may be compiled using an x86 compiler 2404 to generate x86 binary code 2406 that may be natively executed by a processor with at least one x86 instruction set core 2416. The processor with at least one x86 instruction set core 2416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2404 represents a compiler that is operable to generate x86 binary code 2406 (e.g., object code) that can, with or without additional linkage processing, be executed on the processor with at least one x86 instruction set core 2416. Similarly, FIG. 24 shows the program in the high level language 2402 may be compiled using an alternative instruction set compiler 2408 to generate alternative instruction set binary code 2410 that may be natively executed by a processor without at least one x86 instruction set core 2414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2412 is used to convert the x86 binary code 2406 into code that may be natively executed by the processor without an x86 instruction set core 2414. This converted code is not likely to be the same as the alternative instruction set binary code 2410 because an instruction converter capable of this is difficult to make; however, the converted code will accomplish the general operation and be made up of instructions from the alternative instruction set. Thus, the instruction converter 2412 represents software, firmware, hardware, or a combination thereof that, through emulation, simulation or any other process, allows a processor or other electronic device that does not have an x86 instruction set processor or core to execute the x86 binary code 2406.

Components, features, and details described for any of FIGS. 1 and 5-7 may also optionally apply to any of FIGS. 3-4. Components, features, and details described for any of FIGS. 1 and 9-10 may also optionally apply to FIG. 8. Components, features, and details described for the processors disclosed herein (e.g., processors 410, 810) may optionally apply to the methods disclosed herein, which in embodiments may optionally be performed by and/or with such processors. The processors described herein (e.g., processors 410, 810) in some embodiments may optionally be included in the systems disclosed herein (e.g., any of those of FIGS. 20-23). The processors disclosed herein (e.g., processors 410, 810) may optionally, in some embodiments, have the microarchitectural features/components shown herein (e.g., one or more features/components of FIGS. 17B and/or 18A-B). In some embodiments, the instructions disclosed herein may optionally, in some embodiments, optionally have any of the features or details of the instruction formats shown herein (e.g., those of FIGS. 13-15).

Processor components disclosed herein may be said and/or claimed to perform an operation, or to be operative, operable, capable, able, configured adapted, or otherwise to perform an operation. For example, a decode unit may be said and/or claimed to decode an instruction, an execution unit may be said and/or claimed to store a result, or the like. As used herein, these expressions refer to the characteristics, properties, or attributes of the components when in a powered-off state, and do not imply that the components, or the device or apparatus in which they are included, is currently powered on or operating. For clarity, it is to be understood that the processors and apparatus claimed herein are not claimed to be powered on or operating.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the present disclosure is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides (e.g., stores) information in a form that is readable by the machine. The machine-readable medium may provide (e.g., have stored thereon) an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the present disclosure but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the present disclosure requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the present disclosure.

Example Embodiments

The following examples pertain to further embodiments. Specifics in the examples may be used anywhere in one or more embodiments.

Example 1 is a processor including a plurality of packed data registers, and a decode unit to decode an instruction. The instruction to indicate a source operand, to indicate a stride, to indicate at least one set of strided data element positions out of all sets of strided data element positions for the indicated stride, and to indicate at least one destination packed data register of the plurality of packed data registers. The processor also includes an execution unit coupled with the plurality of packed data registers, and coupled with the decode unit. The execution unit, in response to the instruction, for each of the indicated at least one set of strided data element positions, to store a corresponding result packed data operand, in a corresponding destination packed data register of the plurality of packed data registers. Each result packed data operand to include a plurality of data elements, which are to be from the corresponding indicated set of strided data element positions of the source operand. Strided data element positions of the set are to be separated from one another by integer multiples of the indicated stride.

Example 2 includes the processor of Example 1, in which the decode unit is to decode the instruction that is able to indicate only a subset of said all sets of strided data element positions.

Example 3 includes the processor of any one of Examples 1 to 2, in which the decode unit is to decode the instruction that is able to indicate different subsets of said all sets of strided data element positions.

Example 4 includes the processor of any one of Examples 1 to 3, in which the execution unit, in response to the instruction, is to store less result packed data operands than said all sets of strided data element positions.

Example 5 includes the processor of any one of Examples 1 to 4, in which the decode unit is to decode the instruction that is to indicate a corresponding value for each of the indicated at least one set of strided data element positions, and optionally in which each value is to be indicative of the corresponding set of strided data element positions.

Example 6 includes the processor of any one of Examples 1 to 5, in which the decode unit is to decode the instruction that is to indicate a corresponding value that is one of an offset and an index for each of the indicated at least one set of strided data element positions.

Example 7 includes the processor of any one of Examples 1 to 4, in which the decode unit is to decode the instruction that is to indicate a mask that is to have a different corresponding portion for each of said all sets of strided data element positions, and optionally in which each different portion of the mask is to have one of a first value to include the corresponding set of strided data element positions in the at least one set of strided data element positions and a second value to not include the corresponding set of strided data element positions in the at least one set of strided data element positions.

Example 8 includes the processor of any one of Examples 1 to 4 and 7, in which the decode unit is to decode the instruction that is to indicate a bitmask that is to indicate the at least one set of strided data element positions.

Example 9 includes the processor of any one of Examples 1 to 8, in which the decode unit is to decode the instruction that is to indicate the stride that is able to encompass at least five data element positions.

Example 10 includes the processor of any one of Examples 1 to 9, in which the decode unit is to decode the instruction that is able to indicate different strides and that is optionally to indicate the stride through one of:

a value of an immediate of the instruction; and a value that is to be stored in a register that is to be indicated by the instruction.

Example 11 includes the processor of any one of Examples 1 to 10, in which the decode unit is to decode the instruction that is to indicate at least one packed data operation mask.

Example 12 includes the processor of Example 11, in which the execution unit, in response to the instruction, for each of the indicated at least one set of strided data element positions, is to store the corresponding result packed data operand, in which each result packed data operand is to include the plurality of data elements, which are to be from unmasked data element positions of the corresponding indicated set of strided data element positions of the source operand that are to correspond to unmasked mask elements of the at least one packed data operation mask.

Example 13 includes the processor of any one of Examples 1 to 10, in which the decode unit is to decode the instruction that is to indicate a different corresponding packed data operation mask for each of the result packed data operands.

Example 14 includes the processor of Example 13, in which the execution unit, in response to the instruction, for each of the indicated at least one set of strided data element positions, is to store the corresponding result packed data operand, in which each result packed data operand is to include the plurality of data elements, which are to be from unmasked data element positions of the corresponding indicated set of strided data element positions of the source operand that are to correspond to unmasked mask elements of the corresponding packed data operation mask.

Example 15 includes the processor of any one of Examples 13 to 14, in which the decode unit is to decode the instruction that is to explicitly specify a given packed data operation mask, and optionally in which it is to be implicit to use one or more sequential packed data operation masks following the given packed data operation mask for one or more corresponding the result packed data operands.

Example 16 includes the processor of any one of Examples 1 to 15, in which the decode unit is to decode the instruction that is to indicate the source operand that is to be in memory, and optionally in which the execution unit, in response to the instruction, is not to raise page faults and is not to raise memory access faults for data element positions, of the indicated at least one set of strided data element positions, that correspond to masked-out mask elements.

Example 17 is a method performed by a processor that includes receiving an instruction indicating a source operand, indicating a stride, indicating at least one set of strided data element positions out of all sets of strided data element positions for the indicated stride, and indicating at least one destination packed data register of the processor. The method also includes storing, in response to the instruction, for each of the indicated at least one set of strided data element positions, a corresponding result packed data operand, in a corresponding destination packed data register of the processor. Each result packed data operand including a plurality of data elements, which are from the corresponding indicated set of strided data element positions of the source operand. Strided data element positions of the set are separated from one another by integer multiples of the indicated stride.

Example 18 includes the method of Example 17, in which said receiving includes receiving the instruction indicating only a subset of said all sets of strided data element positions.

Example 19 includes the method of any one of Examples 17 to 18, optionally in which said receiving includes receiving the instruction indicating the stride that encompasses at least five data element positions, and optionally in which the stride is to be indicated through one of: a value of an immediate of the instruction; and a value stored in a register that is indicated by the instruction.

Example 20 includes the method of any one of Examples 17 to 19, in which said receiving includes receiving the instruction indicating at least one packed data operation mask.

Example 21 includes the method of any one of Examples 17 to 20, in which said receiving includes receiving the instruction indicating a different corresponding packed data operation mask for each result packed data operand.

Example 22 is a system to process instructions including an interconnect, a dynamic random access memory (DRAM) coupled with the interconnect, and a processor coupled with the interconnect. The processor to receive an instruction that is to indicate a source operand, to indicate a stride, to indicate at least one set of strided data element positions out of all sets of strided data element positions for the indicated stride, and to indicate at least one destination packed data register of the plurality of packed data registers. The processor, in response to the instruction, for each of the indicated at least one set of strided data element positions, to store a corresponding result packed data operand, in a corresponding destination packed data register of the plurality of packed data registers. Each result packed data operand to include a plurality of data elements, which are to be from the corresponding indicated set of strided data element positions of the source operand, in which strided data element positions of the set are to be separated from one another by integer multiples of the indicated stride.

Example 23 includes the system of Example 22, optionally in which the instruction is able to indicate only a subset of said all sets of strided data element positions, and optionally in which the instruction is to indicate at least one packed data operation mask.

Example 24 is an article of manufacture including a non-transitory machine-readable storage medium. The non-transitory machine-readable storage medium storing a plurality of instructions including a first instruction. The first instruction, if executed by a machine, is to cause the machine to perform operations including to access a source operand that is to be indicated by the first instruction. The operations also include to store, for each of at least one set of strided data element positions, out of all sets of strided data element positions to be indicated by the first instruction, for a stride that is to be indicated by the first instruction, a corresponding result packed data operand, in a corresponding destination packed data register. Each result packed data operand to include a plurality of data elements, which are to be from the corresponding set of strided data element positions of the source operand. Strided data element positions of the set to be separated from one another by integer multiples of the indicated stride.

Example 25 includes the article of manufacture of Example 24, in which the non-transitory machine-readable storage medium optionally includes one of a dynamic random access memory (DRAM), a flash memory, a phase-change memory, an optical disc, and a magnetic disk, and optionally in which the first instruction is to indicate at least one packed data operation mask.

Example 26 is a processor or other apparatus that includes means for decoding an instruction. The instruction to indicate a source operand, to indicate a stride, to indicate at least one set of strided data element positions out of all sets of strided data element positions for the indicated stride, and to indicate at least one destination packed data register of a plurality of packed data registers of the processor or apparatus. The processor or other apparatus also includes means for storing, in response to the instruction, for each of the indicated at least one set of strided data element positions, a corresponding result packed data operand, in a corresponding destination packed data register of the plurality of packed data registers. Each result packed data operand to include a plurality of data elements, which are to be from the corresponding indicated set of strided data element positions of the source operand, in which strided data element positions of the set are to be separated from one another by integer multiples of the indicated stride.

Example 27 is a computer system or other electronic device that includes a processor having a decode unit operative to decode instructions of a first instruction set, and having execution units to perform the decoded instructions of the first instruction set. The electronic device also includes a storage device coupled with the processor. The storage device is operative to store a first instruction, which is to be of a second different instruction set. The first instruction to indicate a source operand, to indicate a stride, to indicate at least one set of strided data element positions out of all sets of strided data element positions for the indicated stride, and to indicate at least one destination packed data register. The storage device is also operative to store instructions to convert the first instruction into one or more instructions of the first instruction set. The one or more instructions of the first instruction set, when performed by the processor, are operative to cause the processor to store, for each of the indicated at least one set of strided data element positions, a corresponding result packed data operand, in a corresponding destination packed data register. Each result packed data operand is to include a plurality of data elements, which are to be from the corresponding indicated set of strided data element positions of the source operand, in which strided data element positions of the set are to be separated from one another by integer multiples of the indicated stride.

Example 28 includes the processor of any one of Examples 1 to 16, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, optional scheduler to schedule one or more operations that have been decoded from the instruction for execution, and an optional commit unit to commit execution results of the instruction.

Example 29 includes a system-on-chip that includes at least one interconnect, the processor of any one of Examples 1 to 16 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 30 is a processor or other apparatus operative to perform the method of any one of Examples 17 to 21.

Example 31 is a processor or other apparatus that includes means for performing the method of any one of Examples 17 to 21.

Example 32 is a processor or other apparatus that includes any combination of modules and/or units and/or logic and/or means operative to perform the method of any one of Examples 17 to 21.

Example 33 is an optionally non-transitory and/or tangible machine-readable medium, which optionally stores or otherwise provides instructions including a first instruction, the first instruction if and/or when performed by a processor, computer system, electronic device, or other machine, is operative to cause the machine to perform the method of any one of Examples 17 to 21.

What is claimed is:

1. A processor comprising:
a plurality of packed data registers;
a decode unit to decode an instruction, the instruction to indicate a source operand, to indicate a stride, to indicate at least one set of strided data element positions out of all sets of strided data element positions for the indicated stride, and to indicate at least one destination packed data register of the plurality of packed data registers; and
an execution unit coupled with the plurality of packed data registers, and coupled with the decode unit, the execution unit, in response to the instruction, for each of the indicated at least one set of strided data element positions, to store a corresponding result packed data operand, in a corresponding destination packed data register of the plurality of packed data registers, each result packed data operand to include a plurality of data elements, which are to be from the corresponding indicated set of strided data element positions of the source operand, in which strided data element positions of the set are to be separated from one another by integer multiples of the indicated stride.

2. The processor of claim 1, wherein the decode unit is to decode the instruction that is able to indicate only a subset of said all sets of strided data element positions.

3. The processor of claim 1, wherein the decode unit is to decode the instruction that is able to indicate different subsets of said all sets of strided data element positions.

4. The processor of claim 1, wherein the execution unit, in response to the instruction, is to store less result packed data operands than said all sets of strided data element positions.

5. The processor of claim 1, wherein the decode unit is to decode the instruction that is to indicate a corresponding value for each of the indicated at least one set of strided data element positions, and wherein each value is to be indicative of the corresponding set of strided data element positions.

6. The processor of claim 1, wherein the decode unit is to decode the instruction that is to indicate a corresponding value that is one of an offset and an index for each of the indicated at least one set of strided data element positions.

7. The processor of claim 1, wherein the decode unit is to decode the instruction that is to indicate a mask that is to have a different corresponding portion for each of said all sets of strided data element positions, and wherein each different portion of the mask is to have one of a first value to include the corresponding set of strided data element positions in the at least one set of strided data element positions and a second value to not include the corresponding set of strided data element positions in the at least one set of strided data element positions.

8. The processor of claim 1, wherein the decode unit is to decode the instruction that is to indicate a bitmask that is to indicate the at least one set of strided data element positions.

9. The processor of claim 1, wherein the decode unit is to decode the instruction that is to indicate the stride that is able to encompass at least five data element positions.

10. The processor of claim 1, wherein the decode unit is to decode the instruction that is able to indicate different strides and that is to indicate the stride through one of:
a value of an immediate of the instruction; and
a value that is to be stored in a register that is to be indicated by the instruction.

11. The processor of claim 1, wherein the decode unit is to decode the instruction that is to indicate at least one packed data operation mask.

12. The processor of claim 11, wherein the execution unit, in response to the instruction, for each of the indicated at least one set of strided data element positions, is to store the corresponding result packed data operand, in which each result packed data operand is to include the plurality of data elements, which are to be from unmasked data element positions of the corresponding indicated set of strided data element positions of the source operand that are to correspond to unmasked mask elements of the at least one packed data operation mask.

13. The processor of claim 1, wherein the decode unit is to decode the instruction that is to indicate a different corresponding packed data operation mask for each of the result packed data operands.

14. The processor of claim 13, wherein the execution unit, in response to the instruction, for each of the indicated at least one set of strided data element positions, is to store the corresponding result packed data operand, in which each result packed data operand is to include the plurality of data elements, which are to be from unmasked data element positions of the corresponding indicated set of strided data element positions of the source operand that are to correspond to unmasked mask elements of the corresponding packed data operation mask.

15. The processor of claim 13, wherein the decode unit is to decode the instruction that is to explicitly specify a given packed data operation mask, and wherein it is to be implicit to use one or more sequential packed data operation masks following the given packed data operation mask for one or more corresponding the result packed data operands.

16. The processor of claim 1, wherein the decode unit is to decode the instruction that is to indicate the source operand that is to be in memory, and wherein the execution unit, in response to the instruction, is not to raise page faults and is not to raise memory access faults for data element positions, of the indicated at least one set of strided data element positions, that correspond to masked-out mask elements.

17. A method performed by a processor comprising:
receiving an instruction indicating a source operand, indicating a stride, indicating at least one set of strided data element positions out of all sets of strided data element positions for the indicated stride, and indicating at least one destination packed data register of the processor; and
storing, in response to the instruction, for each of the indicated at least one set of strided data element positions, a corresponding result packed data operand, in a corresponding destination packed data register of the processor, each result packed data operand including a plurality of data elements, which are from the corresponding indicated set of strided data element positions of the source operand, in which strided data element positions of the set are separated from one another by integer multiples of the indicated stride.

18. The method of claim 17, wherein said receiving comprises receiving the instruction indicating only a subset of said all sets of strided data element positions.

19. The method of claim 17, wherein said receiving comprises receiving the instruction indicating the stride that encompasses at least five data element positions, and wherein the stride is to be indicated through one of:
a value of an immediate of the instruction; and
a value stored in a register that is indicated by the instruction.

20. The method of claim 17, wherein said receiving comprises receiving the instruction indicating at least one packed data operation mask.

21. The method of claim 17, wherein said receiving comprises receiving the instruction indicating a different corresponding packed data operation mask for each result packed data operand.

22. A system to process instructions comprising:
an interconnect;
a dynamic random access memory (DRAM) coupled with the interconnect;
a processor coupled with the interconnect, the processor to receive an instruction that is to indicate a source operand, to indicate a stride, to indicate at least one set of strided data element positions out of all sets of strided data element positions for the indicated stride, and to indicate at least one destination packed data register of the plurality of packed data registers, the processor, in response to the instruction, for each of the indicated at least one set of strided data element positions, to store a corresponding result packed data operand, in a corresponding destination packed data register of the plurality of packed data registers, each result packed data operand to include a plurality of data elements, which are to be from the corresponding indicated set of strided data element positions of the source operand, in which strided data element positions of the set are to be separated from one another by integer multiples of the indicated stride.

23. The system of claim 22, wherein the instruction is able to indicate only a subset of said all sets of strided data element positions, and wherein the instruction is to indicate at least one packed data operation mask.

24. An article of manufacture comprising a non-transitory machine-readable storage medium, the non-transitory machine-readable storage medium storing a plurality of instructions including a first instruction, the first instruction, if executed by a machine, is to cause the machine to perform operations comprising to:
access a source operand that is to be indicated by the first instruction; and
store, for each of at least one set of strided data element positions, out of all sets of strided data element positions to be indicated by the first instruction, for a stride that is to be indicated by the first instruction, a corresponding result packed data operand, in a corresponding destination packed data register, each result packed data operand to include a plurality of data elements, which are to be from the corresponding set of strided data element positions of the source operand, strided data element positions of the set to be separated from one another by integer multiples of the indicated stride.

25. The article of manufacture of claim 24, wherein the non-transitory machine-readable storage medium comprises one of a dynamic random access memory (DRAM), a flash memory, a phase-change memory, an optical disc, and a magnetic disk, and the first instruction is to indicate at least one packed data operation mask.

* * * * *